United States Patent
Zhang et al.

(10) Patent No.: US 12,200,218 B2
(45) Date of Patent: **\*Jan. 14, 2025**

(54) SINGLE-LINE CROSS COMPONENT LINEAR MODEL PREDICTION MODE

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,512

(22) Filed: Sep. 26, 2023

(65) Prior Publication Data
US 2024/0015298 A1 Jan. 11, 2024

Related U.S. Application Data

(63) Continuation of application No. 17/512,488, filed on Oct. 27, 2021, now Pat. No. 11,812,026, which is a
(Continued)

(30) Foreign Application Priority Data

Sep. 12, 2018 (WO) ................ PCT/CN2018/105182
Sep. 29, 2018 (WO) ................ PCT/CN2018/108681
May 22, 2019 (WO) ................ PCT/CN2019/088005

(51) Int. Cl.
*H04N 19/105* (2014.01)
*H04N 19/117* (2014.01)
(Continued)

(52) U.S. Cl.
CPC ......... *H04N 19/132* (2014.11); *H04N 19/105* (2014.11); *H04N 19/117* (2014.11);
(Continued)

(58) Field of Classification Search
CPC ............... H04N 19/105; H04N 19/117; H04N 19/132
See application file for complete search history.

(56) References Cited

U.S. PATENT DOCUMENTS 6,259,738 B1 7/2001 Yamaguchi
9,565,428 B2 2/2017 Guo
(Continued)

FOREIGN PATENT DOCUMENTS

CN 104380741 A 2/2015
CN 104718759 A 6/2015
(Continued)

OTHER PUBLICATIONS

Enhanced cross component linear model intra prediction; Zhang—Oct. 2016. (Year: 2017).*
(Continued)

*Primary Examiner* — Luis Perez-Fuentes
(74) *Attorney, Agent, or Firm* — Conley Rose, P.C.

(57) ABSTRACT

Devices, systems, and methods for digital video coding that include cross-component prediction are described. In a representative aspect, a method for video coding includes receiving a bitstream representation of a current block of video data comprising a luma component and a chroma component, determining parameters of a linear model based on a first set of samples that are generated by down-sampling a second set of samples of the luma component, and processing, based on the parameters of the linear model, the bitstream representation to generate the current block.

20 Claims, 30 Drawing Sheets

Related U.S. Application Data continuation of application No. 17/115,388, filed on Dec. 8, 2020, now Pat. No. 11,172,202, which is a continuation of application No. PCT/IB2019/057699, filed on Sep. 12, 2019.

(51) Int. Cl.
  *H04N 19/132* (2014.01)
  *H04N 19/176* (2014.01)
  *H04N 19/186* (2014.01)
  *H04N 19/30* (2014.01)
  *H04N 19/80* (2014.01)

(52) U.S. Cl.
  CPC ......... *H04N 19/176* (2014.11); *H04N 19/186* (2014.11); *H04N 19/30* (2014.11); *H04N 19/80* (2014.11)

(56) References Cited

U.S. PATENT DOCUMENTS

| | | | |
|---|---|---|---|
| 10,045,023 B2 | 8/2018 | Pettersson | |
| 10,200,700 B2 | 2/2019 | Zhang | |
| 10,368,094 B2 | 7/2019 | Budagavi | |
| 10,390,015 B2 | 8/2019 | Hu | |
| 10,419,757 B2 | 9/2019 | Chen | |
| 10,469,847 B2 | 11/2019 | Xiu | |
| 10,609,402 B2 | 3/2020 | Zhao | |
| 10,939,128 B2 | 3/2021 | Zhang | |
| 10,979,717 B2 | 4/2021 | Zhang | |
| 11,172,202 B2 * | 11/2021 | Zhang | H04N 19/80 |
| 11,218,702 B2 * | 1/2022 | Zhang | H04N 19/59 |
| 11,463,713 B2 | 10/2022 | Deng | |
| 11,616,965 B2 | 3/2023 | Deng | |
| 11,638,039 B2 | 4/2023 | Zhao | |
| 11,677,956 B2 * | 6/2023 | Zhang | H04N 19/132 |
| | | | 375/240.02 |
| 11,812,026 B2 * | 11/2023 | Zhang | H04N 19/105 |
| 2012/0287995 A1 | 11/2012 | Budagavi | |
| 2012/0328013 A1 | 12/2012 | Budagavi | |
| 2013/0128966 A1 | 5/2013 | Gao | |
| 2013/0136174 A1 | 5/2013 | Xu | |
| 2013/0188703 A1 | 7/2013 | Liu | |
| 2013/0188705 A1 | 7/2013 | Liu | |
| 2014/0233650 A1 | 8/2014 | Zhang | |
| 2015/0036745 A1 | 2/2015 | Hsu | |
| 2015/0098510 A1 | 4/2015 | Ye | |
| 2015/0365684 A1 | 12/2015 | Chen | |
| 2016/0198190 A1 | 7/2016 | Budagavi | |
| 2016/0219283 A1 | 7/2016 | Chen | |
| 2016/0277762 A1 | 9/2016 | Zhang | |
| 2017/0150186 A1 | 5/2017 | Zhang | |
| 2017/0244975 A1 | 8/2017 | Huang | |
| 2017/0359595 A1 | 12/2017 | Zhang | |
| 2017/0359597 A1 | 12/2017 | Budagavi | |
| 2017/0366818 A1 | 12/2017 | Zhang | |
| 2018/0048889 A1 | 2/2018 | Zhang | |
| 2018/0063527 A1 | 3/2018 | Chen | |
| 2018/0063531 A1 | 3/2018 | Hu | |
| 2018/0063553 A1 | 3/2018 | Zhang | |
| 2018/0077426 A1 | 3/2018 | Zhang | |
| 2018/0131962 A1 | 5/2018 | Chen | |
| 2018/0176594 A1 | 6/2018 | Zhang | |
| 2018/0205946 A1 | 7/2018 | Zhang | |
| 2018/0316918 A1 | 11/2018 | Drugeon | |
| 2019/0014316 A1 | 1/2019 | Panusopone | |
| 2019/0045184 A1 | 2/2019 | Zhang | |
| 2019/0110045 A1 | 4/2019 | Zhao | |
| 2019/0166382 A1 | 5/2019 | He | |
| 2019/0306516 A1 | 10/2019 | Misra | |
| 2019/0342546 A1 | 11/2019 | Lin | |
| 2020/0068203 A1 | 2/2020 | Zhang | |
| 2020/0120359 A1 | 4/2020 | Hanhart | |
| 2020/0128272 A1 | 4/2020 | Jangwon | |
| 2020/0177878 A1 | 6/2020 | Choi | |
| 2020/0195930 A1 | 6/2020 | Choi | |
| 2020/0195970 A1 | 6/2020 | Ikai | |
| 2020/0195976 A1 | 6/2020 | Zhao | |
| 2020/0252619 A1 | 8/2020 | Zhang | |
| 2020/0288135 A1 | 9/2020 | Laroche | |
| 2020/0296380 A1 | 9/2020 | Aono | |
| 2020/0359051 A1 | 11/2020 | Zhang | |
| 2020/0366896 A1 | 11/2020 | Zhang | |
| 2020/0366910 A1 | 11/2020 | Zhang | |
| 2020/0366933 A1 | 11/2020 | Zhang | |
| 2020/0382769 A1 | 12/2020 | Zhang | |
| 2020/0382800 A1 | 12/2020 | Zhang | |
| 2020/0389650 A1 | 12/2020 | Laroche | |
| 2020/0413049 A1 | 12/2020 | Biatek | |
| 2021/0092395 A1 | 3/2021 | Zhang | |
| 2021/0092396 A1 | 3/2021 | Zhang | |

FOREIGN PATENT DOCUMENTS

| | | |
|---|---|---|
| CN | 106664425 A | 5/2017 |
| CN | 107079166 A | 8/2017 |
| CN | 107409209 A | 11/2017 |
| CN | 108293130 A | 7/2018 |
| CN | 110896478 A | 3/2020 |
| EP | 3799428 A1 | 3/2021 |
| GB | 2495942 A | 5/2013 |
| GB | 201716538 | 11/2017 |
| WO | 2017139937 A1 | 8/2017 |
| WO | 2017214420 A1 | 12/2017 |
| WO | 2018053293 A1 | 3/2018 |
| WO | 2018064948 A1 | 4/2018 |
| WO | 2018140587 A1 | 8/2018 |

OTHER PUBLICATIONS

Reduced No. of reference samples for CCLM parameter; Choi—Oct. 2017. (Year: 2017).*

CCLM prediction with single-line neighboring luma samples; Zhang—Oct. 2018. (Year: 2018).*

Enhanced cross component linear model for chroma intra prediction; Zhang—Aug. 2018. (Year: 2018).*

Ma et al. "CE3: Multi-directional LM (MDLM) (Test 5.4.1 and 5.4.2)" Joint Video Experts Team (JVET) of ITU-T SG 16 WP 3 and ISO/IEC JTC 1/SC 29/VVG 11, 12th Meeting: Macao, CN, Oct. 3-12, 2018, document JVET-L0338, 2018.

Wang et al. "CE3-1.5: CCLM Derived with Four Neighbouring Samples," Joint Video Experts Team (JVET) of ITU-T SG 16 WP 3 and ISO/IEC JTC 1/SC 29/VVG 11, 14th Meeting: Geneva, CH, Mar. 1-27, 2019, document JVET-N0271 2019.

Flynn et al. Overview of the Range Extensions for the HEVC Standard: Tools, Profiles, and Performance, IEEE Transactions on Circuits and Systems for Video Technology, Institute of Electrical and Electronic Engineers, US, Jan. 2016, 26(1):4-19.

Chen et al. "Description of SOR, HOR and 360 degree Video Coding Technology Proposal by Huawei, GoPro, HiSilicon, and Samsung," Joint Video Exploration Team (JVET) of ITU-T SG 16 WP 3 and ISO/IEC JTC 1/SC 29/VVG 1, 10th Meeting, San Diego, US, Apr. 10-20, 2018, document JVET-J0025, 2018.

Van Der Auwera et al. "Description of Core Experiment 3: Intra Prediction and Mode Coding," Joint Video Experts Team (JVET) of ITU-T SG 16 WP 3 and ISO/IEC JTC 1/SC 29/VVG 11, 10th Meeting, San Diego, USA, Apr. 10-20, 2018, document JVET-J1023, 2018.

Zhang et al. "New Modes for Chroma Intra Prediction," Joint Collaborative Team on Video Coding (JCT-VC) of ITU-T SG16 WP3 and ISO/IEC JTC1/SC29/VVG11, 7th Meeting, Geneva, CH, Nov. 21-30, 2011, document JCTVC-G358, 2011.

Zhang et al. "CE3-Related: CCLM Prediction with Single-Line Neighbouring Luma Samples," Joint Video Experts Team (JVET) of ITU-T SG 16 WP 3 and ISO/IEC JTC 1/SC 29/VVG 11, 12th Meeting, Macao, CN, Oct. 3-12, 2018, document JVET-L329, 2018.

Misra et al. "Description of SOR and HOR Video Coding Technology Proposal by Sharp and Foxconn," Joint Video Exploration Team

(56) References Cited

OTHER PUBLICATIONS (JVET) of ITU-T SG 16 WP 3 and ISO/IEC JTC 1/SC 29/WG 11, 10th Meeting, San Diego, US, 10-20, Apr. 2018, document JVET-J0026, 2018.
Ramasubramonian et al. CE3: Combined Test of CE3.2.1 and CE3.2.2 (Test 3.2.2.1), Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0098, 2019.
Chen et al. "Chroma Intra Prediction by Reconstructed Luma Samples," Joint Collaborative Team on Video Coding (JCT-VC) of ITU-T SG 16 WP3 and ISO/IEC JTC1/SC29/WG11, 3rd Meeting, Guangzhou, CN, Oct. 7-15, 2010, JCTVC-C206, 2010.
Chen et al. "CE6.a: Chroma Intra Prediction by Reconstructed Luma Samples," Joint Collaborative Team on Video Coding (JCT-VG) of ITU-T SG 16 WP 3 and ISO/IEC JTC1/SC29/WG11, 4th Meeting: Daegu, KR, Jan. 20-28, 2011, document JCTVC-D350, 2011.
Choi et al. "CE3-Related: Reduced No. of Reference Samples for CCLM Parameter Calculation," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0138, 2018.
Zhang et al. "Enhanced Cross-Component Linear Model Intra Prediction," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0110, 2018.
Zhang et al. "Enhanced Cross-Component Linear Model for Chroma Intra-Prediction in Video Coding," IEEE Transactions on Image Processing, Aug. 2018, 27(8): 3983-3997.
Van Der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K1023, 2018.
Van Der Auwera et al. "Extension of Simplified PDPC to Diagonal Intra Modes," Joint Video Experts Team (JVET) pf ITU-T SG 16 WP 3 and ISO/IEC JTC 1/SC 29/WG 11 10th Meeting: San Diego, USA, Apr. 10-20, 2018, document UVET-J0069, 2018.
Chen et al. "CE6.a.4: Chroma Intra Prediction by Reconstructed Luma Samples," Joint Collaborative Team on Video Coding (JCT-VC) of ITU-T SG16 WP3 and ISO/IEC JTC1/SC29/WG11 5th Meeting: Geneva, Mar. 16-23, 2011, document JCTVC-E266, 2011.
Document: JVET-K0204-v1, Laroche, G., "Non-CE3: On cross-component linear model simplification," Joint Video Experts Team (JVET) of ITU-T SG 16 WP 3 and ISO/IEC JTC 1/SC 29/WG 11 11th Meeting: Ljubljana, SI, Jul. 10-18, 2018, 3 pages.
Bross et al. "CE3: Multiple Reference Line Intra Prediction (Test 1.1.1, 1.1.2, 1.1.3 and 1.1.4)," Joint Video Experts Team (JVET) of ITU-T SG 16 WP 3 and ISO/IEC JTC 1/SC 29/WG 11, 12th Meeting, Macao, CN 3-12, Oct. 2018, document JVET-L0283, 2018.
Notice of Allowance from U.S. Appl. No. 17/646,196 dated Jan. 25, 2023.
Examination Report from Patent Application No. GB2102253.8 dated Apr. 20, 2022 (3 pages).
International Search Report and Written Opinion from International Patent Application No. PCT/IB2019/056967 dated Feb. 4, 2020 (24 pages).
International Search Report and Written Opinion from International Patent Application No. PCT/CN2020/071659 dated Mar. 27, 2020 (12 pages).
Non-Final Office Action from U.S. Appl. No. 17/115,290 dated Feb. 4, 2021.
Non-Final Office Action from U.S. Appl. No. 17/115,290 dated Jun. 4, 2021.
International Search Report and Written Opinion from International Patent Application No. PCT/IB2019/057698 dated Feb. 4, 2020 (22 pages).
International Search Report and Written Opinion from International Patent Application No. PCT/IB2019/057699 dated Dec. 11, 2019 (17 pages).
International Search Report and Written Opinion from International Patent Application No. PCT/IB2019/057700 dated Dec. 11, 2019 (17 pages).
International Search Report and Written Opinion from International Patent Application No. PCT/CN2020/091830 dated Aug. 24, 2020 (10 pages).
Non-Final Office Action from U.S. Appl. No. 17/115,388 dated Feb. 9, 2021.
Notice of Allowance from U.S. Appl. No. 17/115,388 dated Sep. 28, 2021.
Notice of Allowance from U.S. Appl. No. 17/115,290 dated Oct. 14, 2021.
Notice of Allowance from U.S. Appl. No. 17/512,488 dated Jul. 7, 2023, 13 pages.
Non-Final Office Action from U.S. Appl. No. 17/512,488 dated Feb. 15, 2023, 22 pages.
Document: JVET-M0097-v1, Ramasubramonian, A., et al., "CE3: On MMLM (Test 2.1)," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.

* cited by examiner

Left neighboring samples

Left-bottom/lower left neighboring samples

SINGLE-LINE CROSS COMPONENT LINEAR MODEL PREDICTION MODE

CROSS-REFERENCE TO RELATED APPLICATIONS

This application is a continuation of U.S. application Ser. No. 17/512,488, filed on Oct. 27, 2021, which is a continuation of U.S. application Ser. No. 17/115,388, filed on Dec. 8, 2020, now U.S. Pat. No. 11,172,202, which is a continuation of International Application No. PCT/IB2019/057699, filed on Sep. 12, 2019, which claims the priority to and benefits of International Patent Application No. PCT/CN2018/105182, filed on Sep. 12, 2018, PCT/CN2018/108681, filed on Sep. 29, 2018, and PCT/CN2019/088005, filed on May 22, 2019. All the aforementioned patent applications are hereby incorporated by reference in their entireties.

TECHNICAL FIELD

The present disclosure relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, low complexity implementations for the cross-component linear model (CCLM) prediction mode in video coding are described. The described methods may be applied to both the existing video coding standards (e.g., High Efficiency Video Coding (HEVC)) and future video coding standards (e.g., Versatile Video Coding (VVC)) or codecs.

In an example aspect, a method of video processing is disclosed. The method includes determining, for a conversion between a video and a coded representation of the video, at least using down-sampled luma samples outside a luma block, a linear model used for predicting a first chroma block of the video that is co-located with the luma block, determining, using down-sampled luma samples inside the luma block and the linear model, predicted values of samples of the first chroma block, and performing the conversion based on the predicted values of samples of the first chroma block; wherein the down-sampled luma samples outside the luma block are obtained by applying an outside filter to luma samples outside the luma block; and wherein the down-sampled luma samples inside the luma block are obtained by applying an inside filter to luma samples inside the luma block.

In another example aspect, a method of video processing is disclosed. The method includes determining, for a conversion between a video and a coded representation of the video, one or more cross-component linear models (CCLMs) used for prediction of a first component block from a second component block during the conversion based on a rule that uses a number of available neighboring samples or a size of the first component block; and performing the conversion using the cross-component linear model, wherein the cross-component linear model is one of: a CCLM derived from above and/or right-above neighboring values of the first component block (CCLM-A); a CCLM derived from left and/or left-below neighboring values of the first component block (CCLM-T); or a CCLM derived from only left and top neighboring values of the first component block (CCLM-TL).

In another example aspect, a method of video processing is disclosed. The method includes generating downsampled outside luma samples corresponding to chroma samples outside a chroma block of a video using a first downsampling scheme; generating downsampled inside luma samples with corresponding to chroma samples inside the chroma block using a second downsampling scheme; at least using the downsampled outside luma samples to derive a linear model for cross-component prediction; determining predicted samples for the chroma block using the linear model and the downsampled inside luma samples; and performing a conversion between the video and a coded representation of the video using the predicted samples for the chroma block.

In another example aspect, a method of video processing is disclosed. The method includes determining, for a conversion between a chroma block of a video and a coded representation of the video, a linear model; generating prediction values of the chroma block from a luma block that corresponds to the chroma block based on the linear model; and performing the conversion using the linear model; wherein the predicting the chroma block from the luma block includes downsampling luma samples above the luma block by a first filtering method and downsampling luma samples to left of the luma block by a second filtering method, and wherein the linear model is determined at least based on the downsampled luma samples.

In another example aspect, a method of video processing is disclosed. The method includes determining, for a conversion between a video and a bitstream representation of the video and based on a height (H) or a width (W) of a chroma block of the video, parameters of a linear model, wherein the parameters of the linear model are based on downsampled luma samples corresponding to chroma samples outside the chroma block, and wherein H and W are positive integers; generating a set of samples of the chroma block based on the parameters of the linear model and a set of downsampled luma samples inside a luma block corresponding to the chroma block; and performing, based on the generating, the conversion between the video and the bitstream representation.

In another example aspect, a method of video processing is disclosed. The method includes determining, for a conversion between a video and a bitstream representation of the video and based on a height (H) or a width (W) of a chroma block of the video, parameters of a linear model, wherein the parameters of the linear model are based on a first set of luma samples that are generated by downsampling a second set of luma samples corresponding to chroma samples outside the chroma block, and wherein a number of the first set of luma samples is based on the height or the width, and wherein H and W are positive integers; generating a set of samples of the chroma block based on the parameters of the linear model and a set of downsampled luma samples inside a luma block corresponding to the chroma block; and performing, based on the generating, the conversion between the video and the bitstream representation.

In one representative aspect, the disclosed technology may be used to provide a method for cross-component prediction. This exemplary method for video coding includes receiving a bitstream representation of a current block of video data comprising a luma component and a chroma component, determining parameters of a linear model based on a first set of samples that are generated by down-sampling a second set of samples of the luma component, and processing, based on the parameters of the linear model, the bitstream representation to generate the current block.

In another representative aspect, a method of video coding is disclosed. The method includes using, during a conversion between a current block of video and a bitstream representation of the current block, parameters of a linear model based on a first set of samples that are generated by down-sampling a second set of samples of the luma component; and performing, based on the parameters of the linear model, the conversion between the bitstream representation and the current block.

In another representative aspect, a method of video processing is disclosed. The method includes performing a conversion between a current video block and a bitstream representation of the current video block using a cross-component linear model in which multiple lines of luma samples, at least one being non-adjacent to the current video block are used for the conversion using the cross-component linear model.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 1:
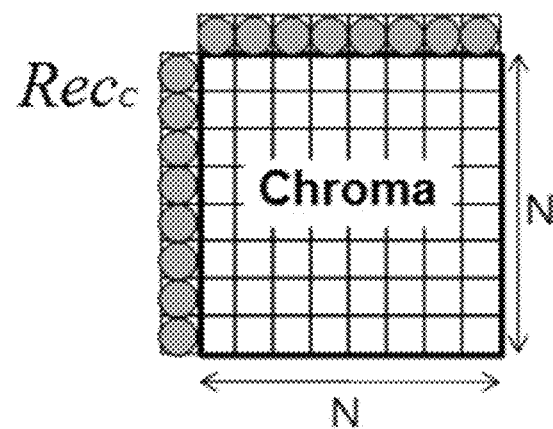
FIG. 1 shows an example of locations of samples used for the derivation of the weights of the linear model used for cross-component prediction.
Figure 1:
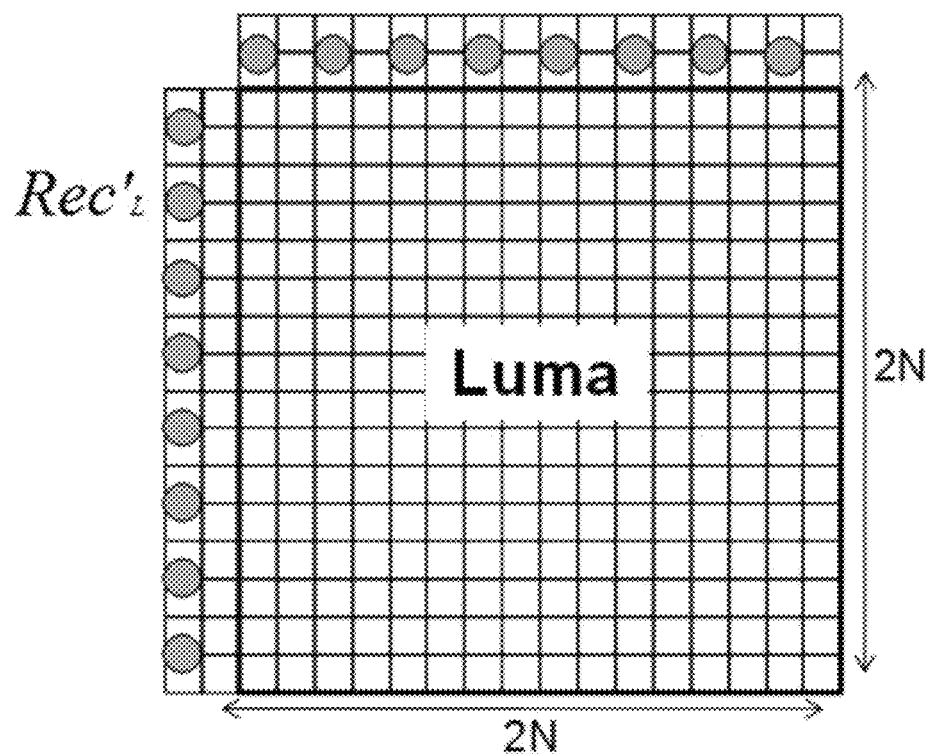

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present disclosure to improve readability of the description and do not in any way limit the discussion or the embodiments (and/or implementations) to the respective sections only.

1 Embodiments of Cross-Component Prediction

Cross-component prediction is a form of the chroma-to-luma prediction approach that has a well-balanced trade-off between complexity and compression efficiency improvement.

1.1 Examples of the Cross-Component Linear Model (CCLM)

In some embodiments, and to reduce the cross-component redundancy, a cross-component linear model (CCLM) prediction mode (also referred to as LM), is used in the JEM, for which the chroma samples are predicted based on the reconstructed luma samples of the same CU by using a linear model as follows:

$$\text{pred}_C(i,j) = \alpha \cdot \text{rec}_L'(i,j) + \beta \quad (1)$$

Here, $\text{pred}_C(i,j)$ represents the predicted chroma samples in a CU and $\text{rec}_L(i,j)$ represents the downsampled reconstructed luma samples of the same CU for color formats 4:2:0 or 4:2:2 while $\text{rec}_L'(i,j)$ represents the reconstructed luma samples of the same CU for color format 4:4:4. CCLM parameters $\alpha$ and $\beta$ are derived by minimizing the regression error between the neighboring reconstructed luma and chroma samples around the current block as follows:

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \quad (2)$$

$$\text{and } \beta = \frac{\Sigma C(n) - \alpha \cdot \Sigma L(n)}{N}. \quad (3)$$

Here, L(n) represents the down-sampled (for color formats 4:2:0 or 4:2:2) or original (for color format 4:4:4) top and left neighboring reconstructed luma samples, C(n) represents the top and left neighboring reconstructed chroma samples, and value of N is equal to twice of the minimum of width and height of the current chroma coding block.

In some embodiments, and for a coding block with a square shape, the above two equations are applied directly. In other embodiments, and for a non-square coding block, the neighboring samples of the longer boundary are first subsampled to have the same number of samples as for the shorter boundary. FIG. 1 shows the location of the left and above reconstructed samples and the sample of the current block involved in the CCLM mode.

In some embodiments, this regression error minimization computation is performed as part of the decoding process, not just as an encoder search operation, so no syntax is used to convey the $\alpha$ and $\mu$ values.

In some embodiments, the CCLM prediction mode also includes prediction between the two chroma components, e.g., the Cr (red-difference) component is predicted from the Cb (blue-difference) component. Instead of using the reconstructed sample signal, the CCLM Cb-to-Cr prediction is applied in residual domain. This is implemented by adding a weighted reconstructed Cb residual to the original Cr intra prediction to form the final Cr prediction:

$$\text{pred}^*_{Cr}(i,j) = \text{pred}_{Cr}(i,j) + \alpha \cdot \text{resi}_{Cb}'(i,j) \quad (4)$$

Here, $\text{resi}_{Cb}'(i, j)$ presents the reconstructed Cb residue sample at position (i,j).

In some embodiments, the scaling factor $\alpha$ may be derived in a similar way as in the CCLM luma-to-chroma prediction. The only difference is an addition of a regression cost relative to a default $\alpha$ value in the error function so that the derived scaling factor is biased towards a default value of −0.5 as follows:

$$\alpha = \frac{N \cdot \Sigma(Cb(n) \cdot Cr(n)) - \Sigma Cb(n) \cdot \Sigma Cr(n) + \lambda \cdot (-0.5)}{N \cdot \Sigma(Cb(n) \cdot Cb(n)) - \Sigma Cb(n) \cdot \Sigma Cb(n) + \lambda} \quad (5)$$

Here, Cb(n) represents the neighboring reconstructed Cb samples, Cr(n) represents the neighboring reconstructed Cr samples, and $\lambda$ is equal to $\Sigma(Cb(n) \cdot Cb(n)) >> 9$.

In some embodiments, the CCLM luma-to-chroma prediction mode is added as one additional chroma intra prediction mode. At the encoder side, one more RD cost check for the chroma components is added for selecting the chroma intra prediction mode. When intra prediction modes other than the CCLM luma-to-chroma prediction mode is used for the chroma components of a CU, CCLM Cb-to-Cr prediction is used for Cr component prediction.

In JEM and VTM-2.0, the total number of training sample in CCLM must be in a form of 2N. Suppose the current block size is W×H. If W is not equal to H, then the down-sampled luma sample set with more samples are decimated to match the number of samples in the down-sampled luma sample set with less samples.

1.2 Examples of Multiple Model CCLM

In the JEM, there are two CCLM modes: the single model CCLM mode and the multiple model CCLM mode (MMLM). As indicated by the name, the single model CCLM mode employs one linear model for predicting the chroma samples from the luma samples for the whole CU, while in MMLM, there can be two models.

In MMLM, neighboring luma samples and neighboring chroma samples of the current block are classified into two groups, each group is used as a training set to derive a linear model (i.e., a particular $\alpha$ and $\beta$ are derived for a particular group). Furthermore, the samples of the current luma block are also classified based on the same rule for the classification of neighboring luma samples.

Figure 2:
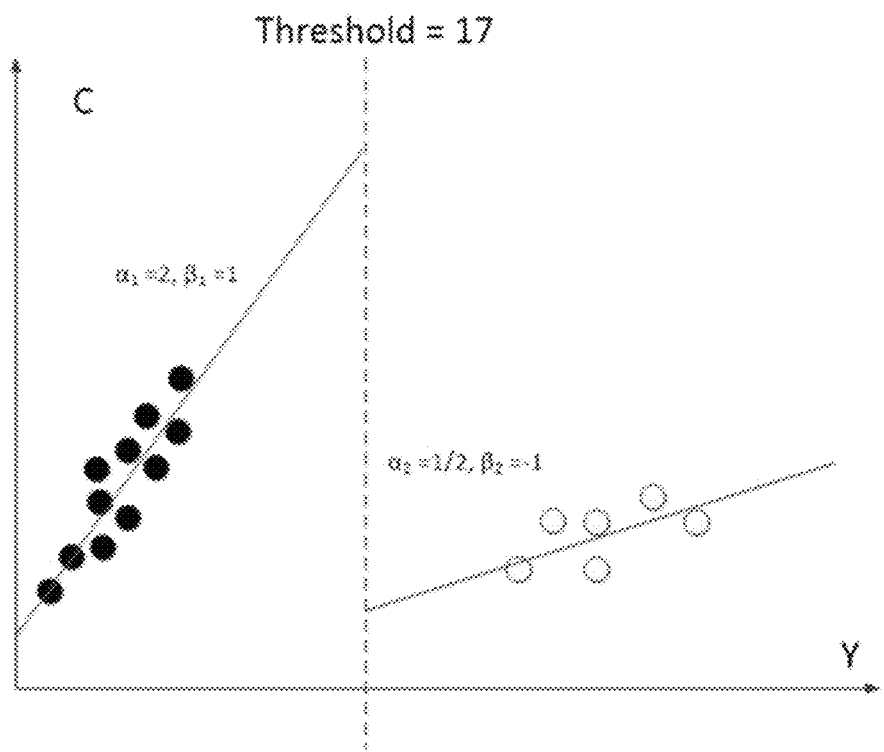
FIG. 2 shows an example of classifying neighboring samples into two groups.

FIG. 2 shows an example of classifying the neighboring samples into two groups. Threshold is calculated as the average value of the neighboring reconstructed luma samples. A neighboring sample with $\text{Rec}'_L[x,y] <= \text{Threshold}$ is classified into group 1; while a neighboring sample with $\text{Rec}'_L[x,y] > \text{Threshold}$ is classified into group 2.

$$\begin{cases} Pred_c[x, y] = \alpha_1 \times Rec'_L[x, y] + \beta_1 & \text{if } Rec'_L[x, y] \leq \text{Threshold} \\ Pred_c[x, y] = \alpha_2 \times Rec'_L[x, y] + \beta_2 & \text{if } Rec'_L[x, y] > \text{Threshold} \end{cases} \quad (6)$$

1.3 Examples of Downsampling Filters in CCLM

In some embodiments, and to perform cross-component prediction, for the 4:2:0 chroma format, where 4 luma samples corresponds to 1 chroma samples, the reconstructed luma block needs to be downsampled to match the size of the chroma signal. The default downsampling filter used in CCLM mode is as follows:

$$\text{Rec}'_L[x,y] = \{2 \times \text{Rec}_L[2x,2y] + 2 \times \text{Rec}_L[2x,2y+1] + \text{Rec}_L[2x-1,2y] + \text{Rec}_L[2x+1,2y] + \text{Rec}_L[2x-1,2y+1] + \text{Rec}_L[2x+1,2y+1] + 4\} >> 3 \quad (7)$$

Figure 3A:
FIG. 3A shows an example of a chroma sample and its corresponding luma samples.
Figure 3A:
Figure 3A:
Figure 3A:
Figure 3A:

Here, the downsampling assumes the "type 0" phase relationship as shown in FIG. 3A for the positions of the chroma samples relative to the positions of the luma samples, e.g., collocated sampling horizontally and interstitial sampling vertically.

The exemplary 6-tap downsampling filter defined in (6) is used as the default filter for both the single model CCLM mode and the multiple model CCLM mode.

Figure 3B:
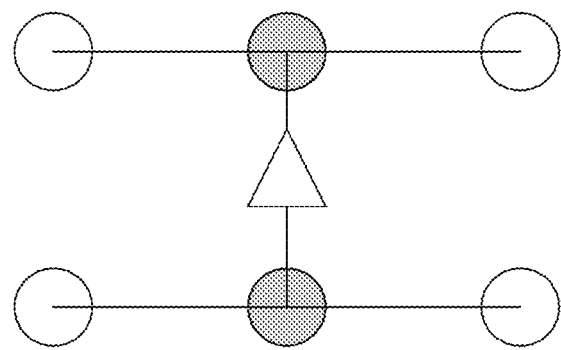
FIG. 3B shows an example of down filtering for the cross-component linear model (CCLM) in the Joint Exploration Model (JEM).

In some embodiments, and for the MMLM mode, the encoder can alternatively select one of four additional luma downsampling filters to be applied for prediction in a CU, and send a filter index to indicate which of these is used. The four selectable luma downsampling filters for the MMLM mode, as shown in FIG. 3B, are as follows:

$$\text{Rec}'_L[x,y]=(\text{Rec}_L[2x,2y]+\text{Rec}_L[2x+1,2y]+1)>>1 \quad (8)$$

$$\text{Rec}'_L[x,y]=(\text{Rec}_L[2x+1,2y]+\text{Rec}_L[2x+1,2y+1]+1)>>1 \quad (9)$$

$$\text{Rec}'_L[x,y]=(\text{Rec}_L[2x,2y+1]+\text{Rec}_L[2x+1,2y+1]+1)>>1 \quad (10)$$

$$\text{Rec}'_L[x,y]=(\text{Rec}_L[2x,2y]+\text{Rec}_L[2x,2y+1]+\text{Rec}_L[2x+1,2y]+\text{Rec}_L[2x+1,2y+1]+2)>>2 \quad (11)$$

1.4 Exemplary Embodiments Related to Cross-Component Prediction

Previously proposed CCLM methods include, but are not limited to:
- Only requiring neighboring luma samples used in normal intra-prediction; and
- Not needing to downsample the luma samples, or downsampling is performed by a simple two-sample averaging.

Figure 4:
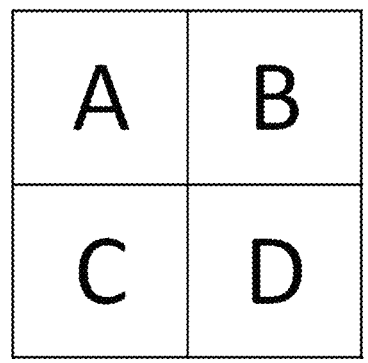
FIG. 4 shows an exemplary arrangement of the four luma samples corresponding to a single chroma sample.
Figures 5A, 5B:
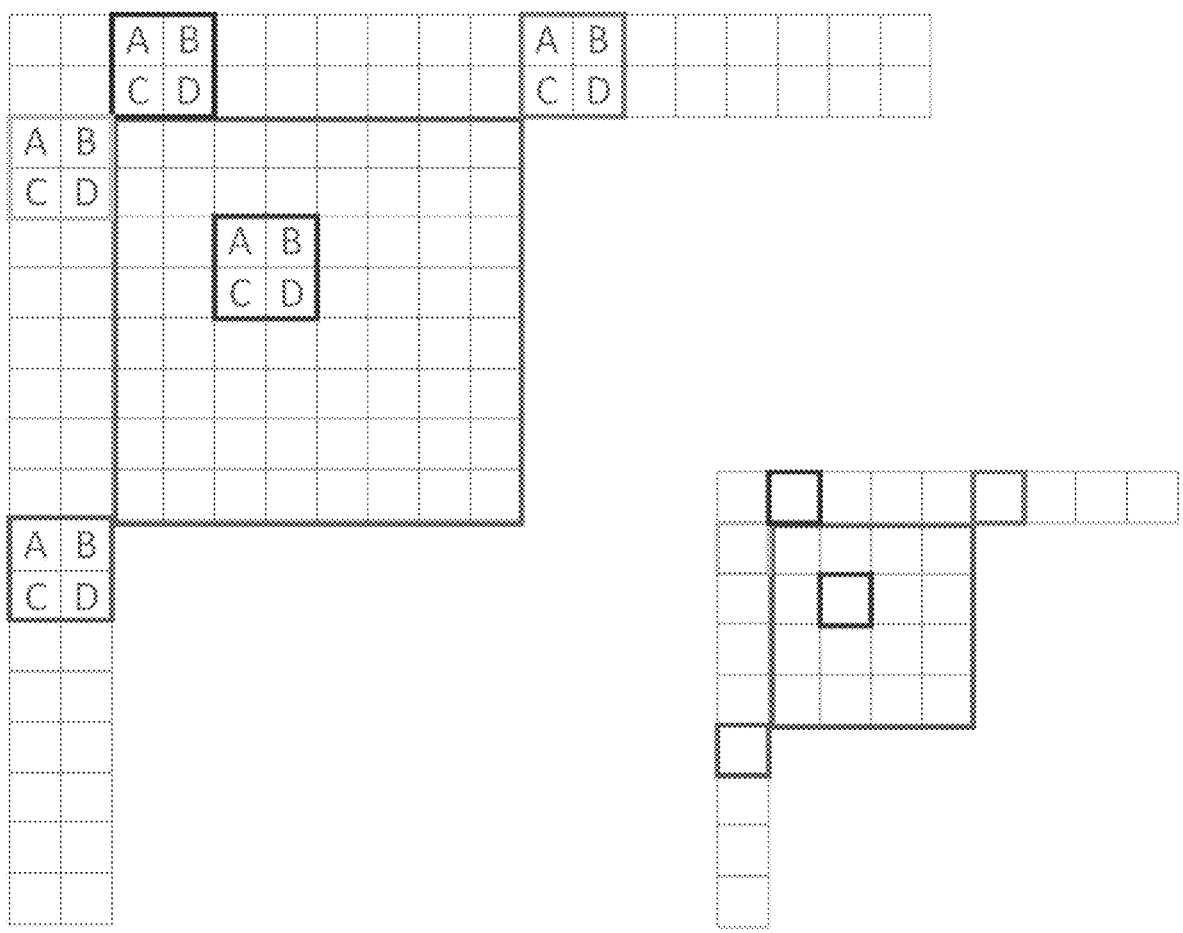
FIGS. 5A and 5B shows an example of samples of a 4×4 chroma block with the neighboring samples, and the corresponding luma samples.

The previously proposed examples described below assume that the color format is 4:2:0. As shown in FIG. 3A, one chroma (Cb or Cr) sample (represented by a triangle) corresponds to four luma (Y) samples (represented by circles): A, B, C and D as shown in FIG. 4. FIG. 5 shows an example of samples of a 4×4 chroma block with neighboring samples, and the corresponding luma samples.

Example 1

Figure 6A:
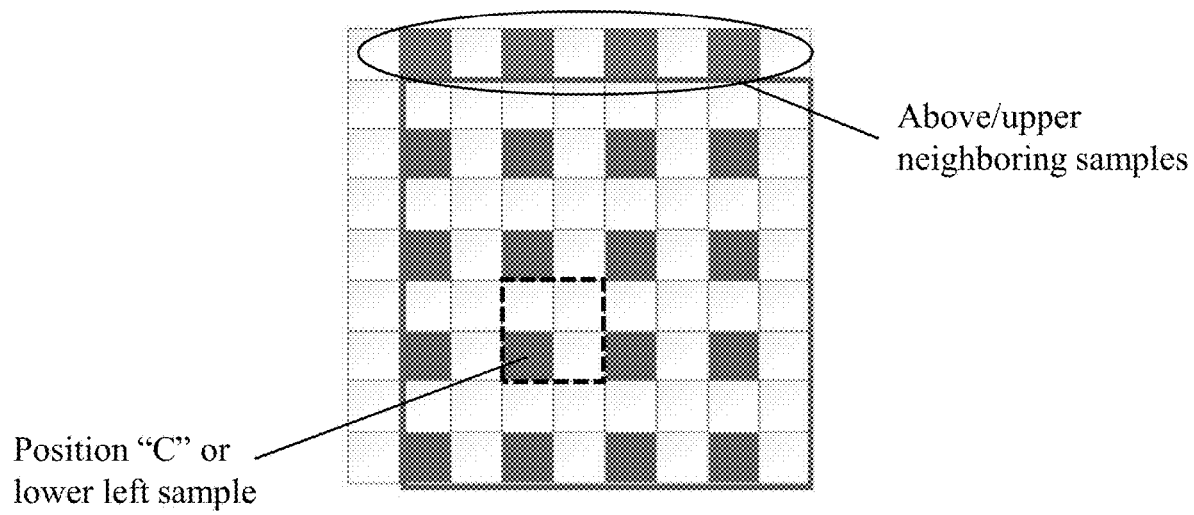
FIGS. 6A-6J show examples of CCLM without luma sample down filtering.
Figure 6B:
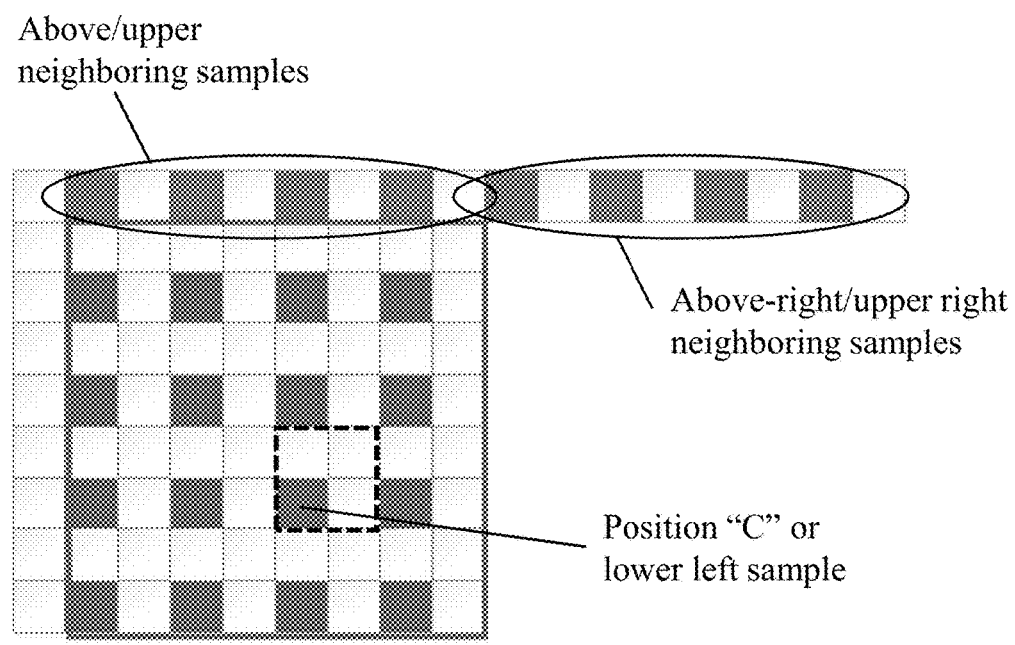
Figure 6C:
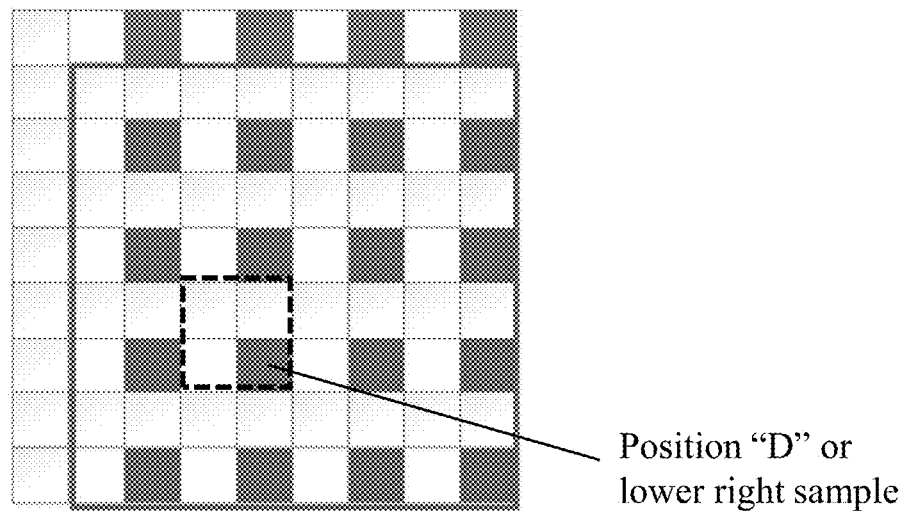
Figure 6D:
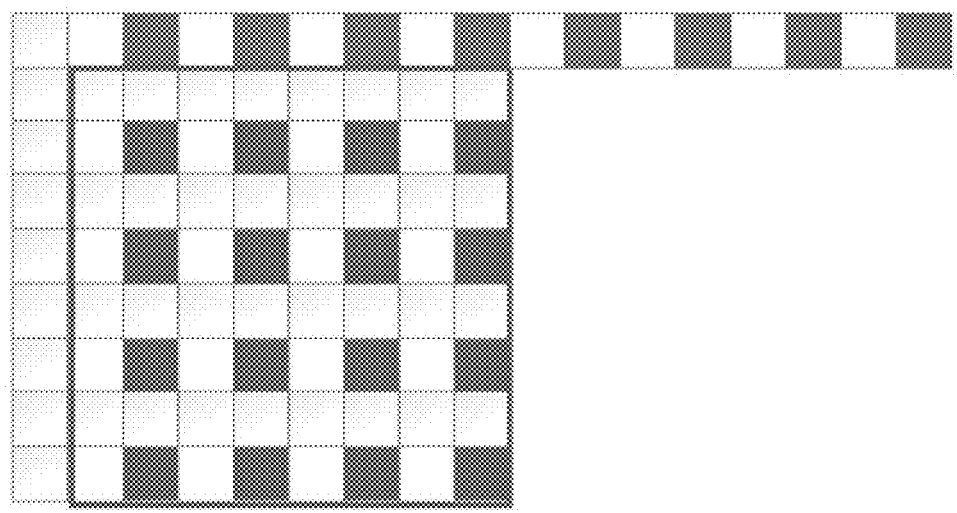
Figure 6E:
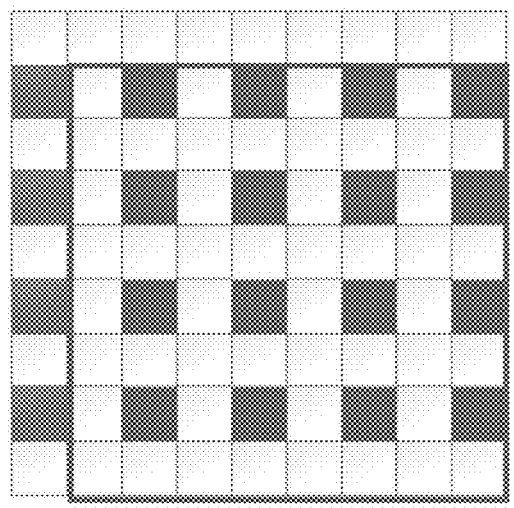
Figure 6F:
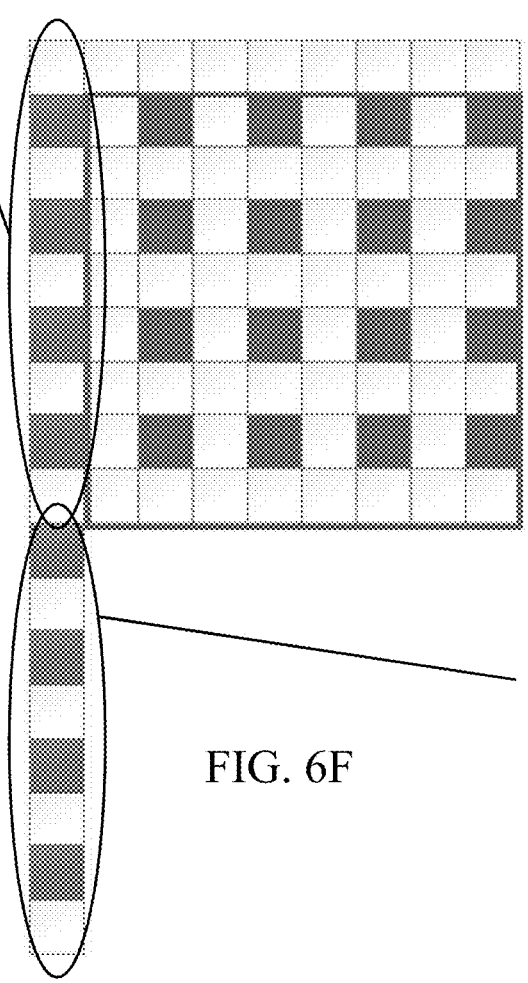
Figure 6G:
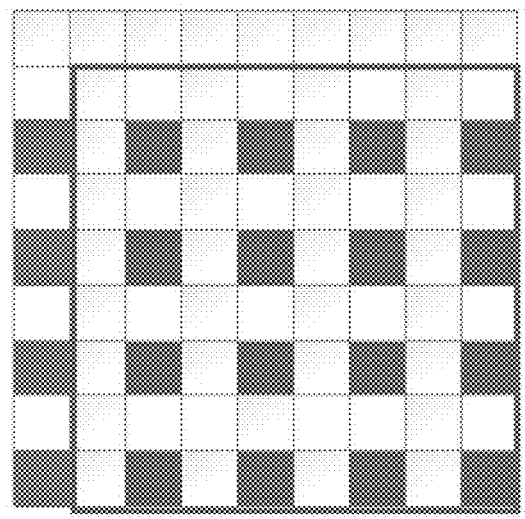
Figure 6H:
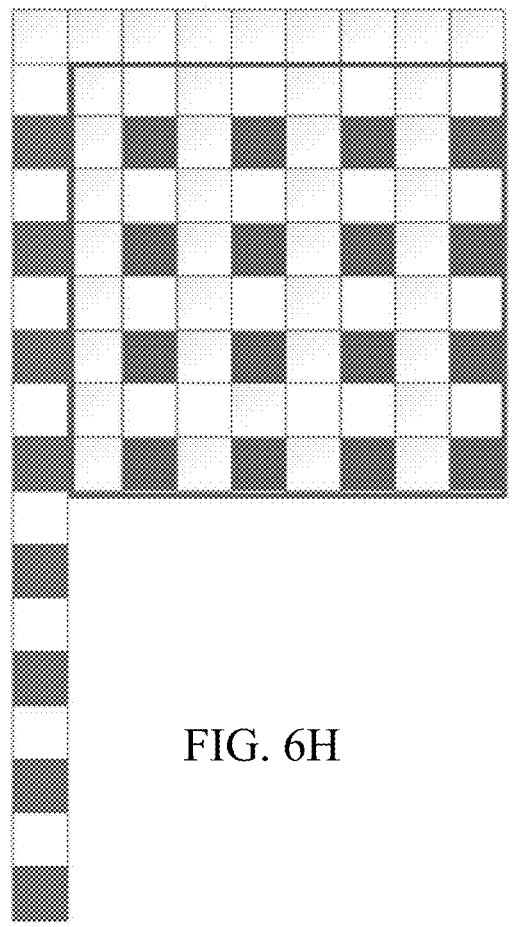
Figure 6I:
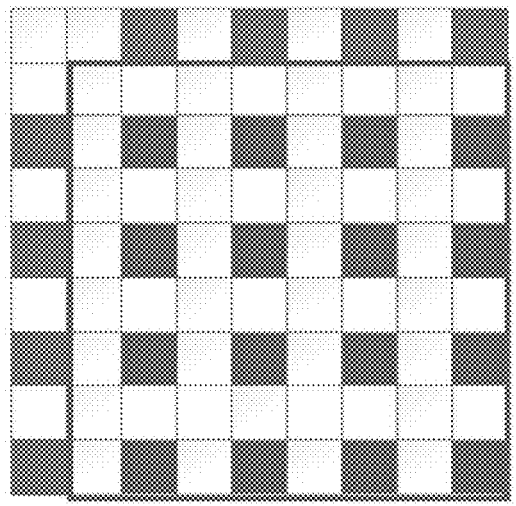
Figure 6J:
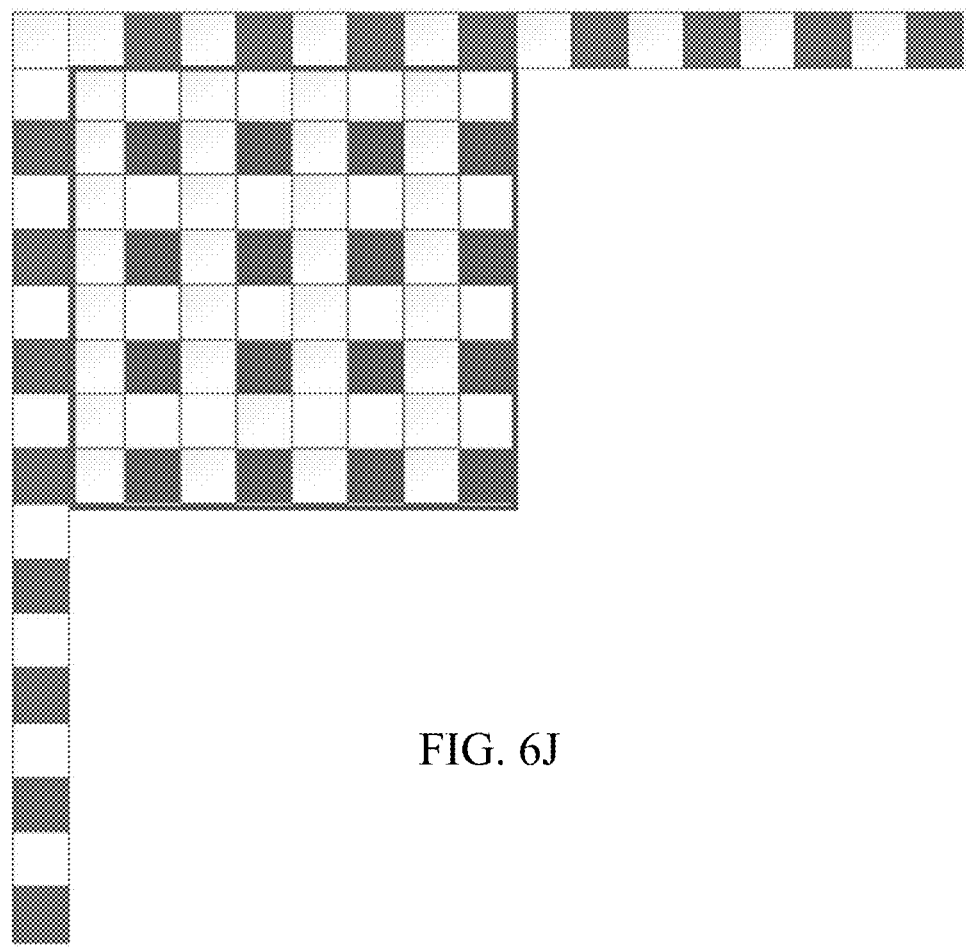

In one example, it is proposed that CCLM is done without down-sampling filtering on luma samples.
- (a) In one example, down-sampling process of neighboring luma samples is removed in the CCLM parameter (e.g., α and β) derivation process. Instead, the down-sampling process is replaced by sub-sampling process wherein non-consecutive luma samples are utilized.
- (b) In one example, down-sampling process of samples in the co-located luma block is removed in the CCLM chroma prediction process. Instead, only partial luma samples in the co-located luma block is used to derive the prediction block of chroma samples.
- (c) FIGS. 6A-6J show examples on an 8×8 luma block corresponding to a 4×4 chroma block.
- (d) In one example as shown in FIG. 6A, Luma sample at position "C" in FIG. 4 is used to correspond to the chroma sample. The above neighboring samples are used in the training process to derive the linear model.
- (e) In one example as shown in FIG. 6B, luma sample at position "C" in FIG. 4 is used to correspond to the chroma sample. The above neighboring samples and above-right neighboring samples are used in the training process to derive the linear model.
- (f) In one example as shown in FIG. 6C, luma sample at position "D" in FIG. 4 is used to correspond to the chroma sample. The above neighboring samples are used in the training process to derive the linear model.
- (g) In one example as shown in FIG. 6D, luma sample at position "D" in FIG. 4 is used to correspond to the chroma sample. The above neighboring samples and above-right neighboring samples are used in the training process to derive the linear model.
- (h) In one example as shown in FIG. 6E, luma sample at position "B" in FIG. 4 is used to correspond to the chroma sample. The left neighboring samples are used in the training process to derive the linear model.
- (i) In one example as shown in FIG. 6F, luma sample at position "B" in FIG. 4 is used to correspond to the chroma sample. The left neighboring samples and left-bottom neighboring samples are used in the training process to derive the linear model.
- (j) In one example as shown in FIG. 6G, luma sample at position "D" in FIG. 4 is used to correspond to the chroma sample. The left neighboring samples are used in the training process to derive the linear model.
- (k) In one example as shown in FIG. 6H, luma sample at position "D" in FIG. 4 is used to correspond to the chroma sample. The left neighboring samples and left-bottom neighboring samples are used in the training process to derive the linear model.
- (l) In one example as shown in FIG. 6I, luma sample at position "D" in FIG. 4 is used to correspond to the chroma sample. The above neighboring samples and left neighboring samples are used in the training process to derive the linear model.
- (m) In one example as shown in FIG. 6J, luma sample at position "D" in FIG. 4 is used to correspond to the chroma sample. The above neighboring samples, left neighboring samples, above-right neighboring samples and left-bottom neighboring samples are used in the training process to derive the linear model.

Example 2

Figure 7A:
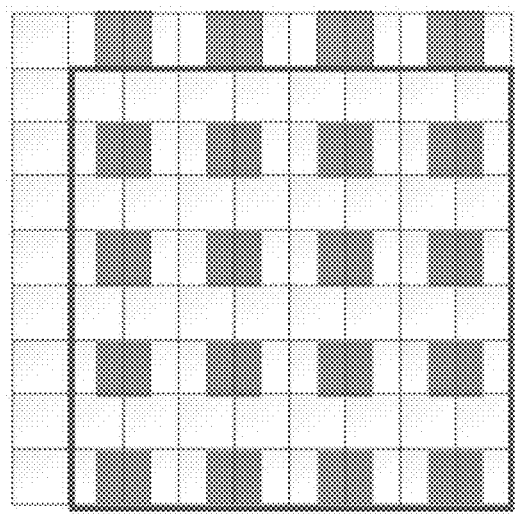
FIGS. 7A-7D show examples of CCLM only requiring neighboring luma samples used in normal intra-prediction.
Figure 7B:
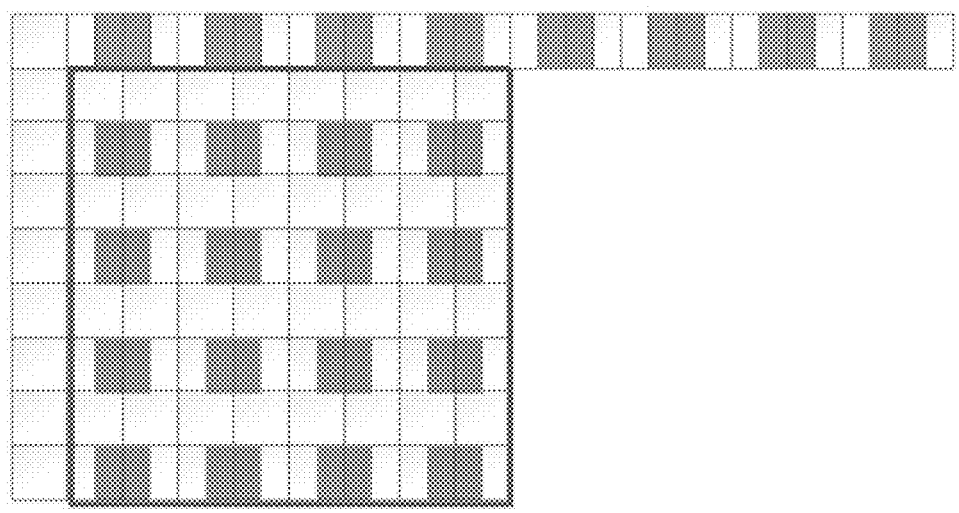
Figure 7C:
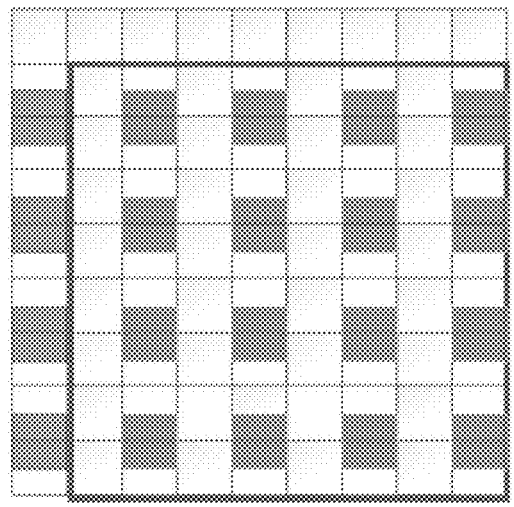
Figure 7D:
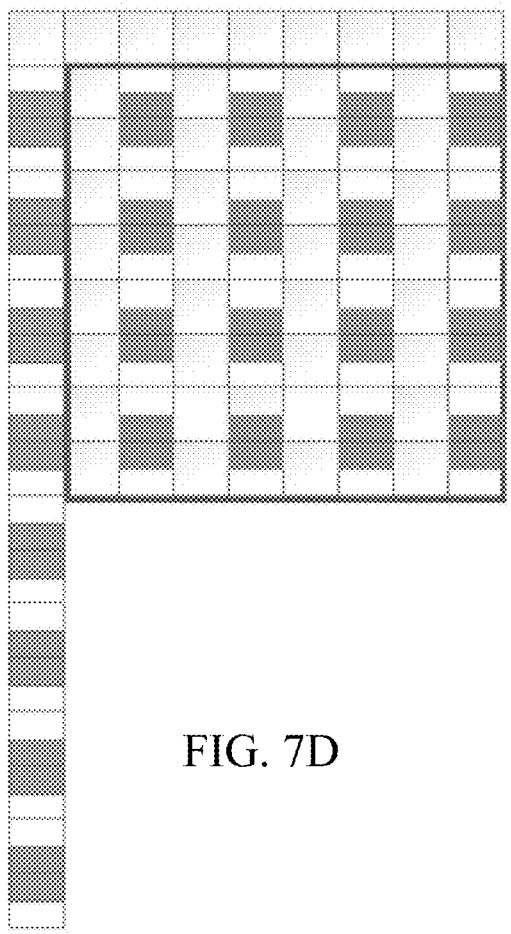

In one example, it is proposed that CCLM only requires neighboring luma samples which are used in normal intra-prediction process, that is, other neighboring luma samples are disallowed to be used in the CCLM process. In one example, CCLM is done with 2-tap filtering on luma samples. FIGS. 7A-7D show examples on an 8×8 luma block corresponding to a 4×4 chroma block.
- (a) In one example as shown in FIG. 7A, luma sample at position "C" and position "D" in FIG. 4 are filtered as F(C, D) to be used to correspond to the chroma sample. The above neighboring samples are used in the training process to derive the linear model.
- (b) In one example as shown in FIG. 7B, luma sample at position "C" and position "D" in FIG. 4 are filtered as F(C, D) to be used to correspond to the chroma sample. The above neighboring samples and above-right neighboring samples are used in the training process to derive the linear model.
- (c) In one example as shown in FIG. 7C, luma sample at position "B" and position "D" in FIG. 4 are filtered as F(B, D) to be used to correspond to the chroma sample. The left neighboring samples are used in the training process to derive the linear model.
- (d) In one example as shown in FIG. 7D, luma sample at position "B" and position "D" in FIG. 4 are filtered as F(B, D) to be used to correspond to the chroma sample.

The left neighboring samples and left-bottom neighboring samples are used in the training process to derive the linear model.
(e) In one example, F is defined as F(X,Y)=(X+Y)>>1. Alternatively, F(X,Y)=(X+Y+1)>>1.

Example 3

In one example, the previously proposed CCLM methods (e.g., Examples 1 and 2 in this Section) can be applied in a selective way. That is, different block within a region, a slice, a picture or a sequence may choose different kinds of previously proposed CCLM methods.
(a) In one embodiment, the encoder selects one kind of previously proposed CCLM method from a predefined candidate set and signals it to the decoder.
  (i) For example, the encoder can select between Example 1(a) and Example 1(e). Alternatively, it can select between Example 1(b) and Example 1(f). Alternatively, it can select between Example 1(c) and Example 1(g). Alternatively, it can select between Example 1(d) and Example 1(h). Alternatively, it can select between Example 2(a) and Example 2(c). Alternatively, it can select between Example 2(b) and Example 2(d).
  (ii) The candidate set to be selected from and the signaling may depend on the shape or size of the block. Suppose W and H represent the width and height of the chroma block, T1, and T2 are integers.
    (1) In one example, if W<=T1 and H<=T2, there is no candidate, e.g., CCLM is disabled. For example, T1=T2=2.
    (2) In one example, if W<=T1 or H<=T2, there is no candidate, e.g., CCLM is disabled. For example, T1=T2=2.
    (3) In one example, if W×H<=T1, there is no candidate, e.g., CCLM is disabled. For example, T1=4.
    (4) In one example, if W<=T1 and H<=T2, there is only one candidate such as Example 1(i). No CCLM method selection information is signaled. For example, T1=T2=4.
    (5) In one example, if W<=T1 or H<=T2, there is only one candidate such as Example 1(i). No CCLM method selection information is signaled. For example, T1=T2=4.
    (6) In one example, if W×H<=T1, there is only one candidate such as Example 1(i). No CCLM method selection information is signaled. For example, T1=16.
    (7) In one example, if W>H, there is only one candidate such as Example 1(a). No CCLM method selection information is signaled. Alternatively, if W>H (or W>N*H wherein N is a positive integer), only candidates (or some candidates) using above or/and above-right neighboring reconstructed samples in deriving CCLM parameters are included in the candidate set.
    (8) In one example, if W<H, there is only one candidate such as Example 1(e). No CCLM method selection information is signaled. Alternatively, if W<H (or N*W<H), only candidates (or some candidates) using left or/and left-bottom neighboring reconstructed samples in deriving CCLM parameters are included in the candidate set.

(b) In one embodiment, both the encoder and decoder select a previously proposed CCLM method based the same rule. The encoder does not signal it to the decoder. For example, the selection may depend on the shape or size of the block. In one example, if the width is larger than the height, Example 1(a) is selected, otherwise, Example 1(e) is selected.
(c) One or multiple sets of previously proposed CCLM candidates may be signaled in sequence parameter set/picture parameter set/slice header/CTUs/CTBs/groups of CTUs.

Example 4

In one example, it is proposed that multiple CCLM methods (e.g., Examples 1 and 2) may be applied to the same chroma block. That is, one block within a region/slice/picture/sequence may choose different kinds of previously proposed CCLM methods to derive multiple intermediate chroma prediction blocks and the final chroma prediction block is derived from the multiple intermediate chroma prediction blocks.
(a) Alternatively, multiple sets of CCLM parameters (e.g., α and β) may be firstly derived from multiple selected CCLM methods. One final set of CCLM parameters may be derived from the multiple sets and utilized for chroma prediction block generation process.
(b) The selection of multiple CCLM methods may be signaled (implicitly or explicitly) in a similar way as described in Example 3.
(c) Indication of the usage of the proposed method may be signaled in sequence parameter set/picture parameter set/slice header/groups of CTUs/CTUs/coding blocks.

Example 5

Figure 8A:
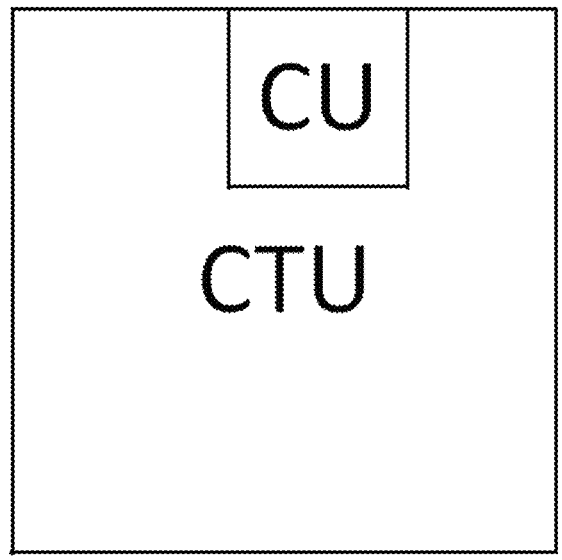
FIGS. 8A and 8B show examples of a coding unit (CU) at a boundary of a coding tree unit (CTU).
Figure 8B:
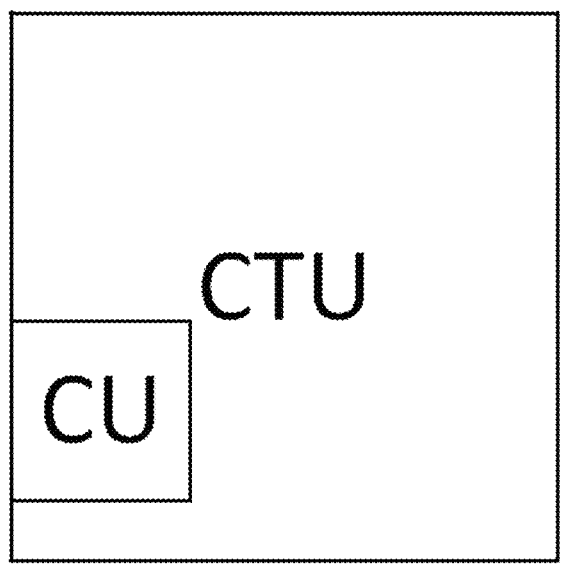

In one example, whether and how to apply the previously proposed CCLM methods may depend on the position of the current block.
(a) In one example, one or more of the proposed methods is applied on CUs that locate at the top boundary of the current CTU as shown in FIG. 8A.
(b) In one example, one or more of the proposed methods is applied on CUs that locate at the left boundary of the current CTU as shown in FIG. 8B.
(c) In one example, one or more of the proposed methods is applied in both the above cases.

1.5 Examples of CCLM in VVC

In some embodiments, CCLM as in JEM is adopted in VTM-2.0, but MM-CCLM in JEM is not adopted in VTM-2.0.

CCLM in VTM-5.0

In VTM-5.0, two additional CCLM modes (LM-A and LM-T) proposed in JVET-L0338 are adopted besides LM mode. LM-A only uses neighboring samples above or right-above the current block and LM-T only uses neighboring samples left or left-below the current block, to derive the CCLM parameters.

Decoding Process of CCLM

In VTM-5.0, the LM derivation process is simplified to a 4-point max-min method proposed in JVET-N0271. The corresponding working draft is shown in below.

Specification of INTRA_LT_CCLM, INTRA_L_CCLM and INTRA_T_CCLM Intra Prediction Mode
Inputs to this process are:
  the intra prediction mode predModeIntra,
  a sample location (xTbC, yTbC) of the top-left sample of the current transform block relative to the top-left sample of the current picture,
  a variable nTbW specifying the transform block width,
  a variable nTbH specifying the transform block height,
  chroma neighboring samples p[x][y], with x=−1, y=0 . . . 2*nTbH−1 and x=0 . . . 2*nTbW−1, y=−1.
Output of this process are predicted samples predSamples [x][y], with
x=0 . . . nTbW−1, y=0 . . . nTbH−1.
The current luma location (xTbY, yTbY) is derived as follows:

$$(xTbY, yTbY) = (xTbC << 1, yTbC << 1) \qquad (8\text{-}156)$$

The variables availL, availT and availTL are derived as follows:
  The availability of left neighboring samples derivation process for a block as specified in clause 6.4.X [Ed. (BB): Neighboring blocks availability checking process tbd] is invoked with the current chroma location (xCurr, yCurr) set equal to (xTbC, yTbC) and the neighboring chroma location (xTbC−1, yTbC) as inputs, and the output is assigned to availL.
  The availability of top neighboring samples derivation process for a block as specified in clause 6.4.X [Ed. (BB): Neighboring blocks availability checking process tbd] is invoked with the current chroma location (xCurr, yCurr) set equal to (xTbC, yTbC) and the neighboring chroma location (xTbC, yTbC−1) as inputs, and the output is assigned to availT.
  The availability of top-left neighboring samples derivation process for a block as specified in clause 6.4.X [Ed. (BB): Neighboring blocks availability checking process tbd] is invoked with the current chroma location (xCurr, yCurr) set equal to (xTbC, yTbC) and the neighboring chroma location (xTbC−1, yTbC−1) as inputs, and the output is assigned to availTL.
  The number of available top-right neighboring chroma samples numTopRight is derived as follows:
    The variable numTopRight is set equal to 0 and availTR is set equal to TRUE.
    When predModeIntra is equal to INTRA_T_CCLM, the following applies for x=nTbW . . . 2*nTbW−1 until availTR is equal to FALSE or x is equal to 2*nTbW−1:
      The availability derivation process for a block as specified in clause 6.4.X [Ed. (BB): Neighboring blocks availability checking process tbd] is invoked with the current chroma location (xCurr, yCurr) set equal to (xTbC, yTbC) and the neighboring chroma location (xTbC+x, yTbC−1) as inputs, and the output is assigned to availableTR
      When availableTR is equal to TRUE, numTopRight is incremented by one.
  The number of available left-below neighboring chroma samples numLeftBelow is derived as follows:
    The variable numLeftBelow is set equal to 0 and availLB is set equal to TRUE.
    When predModeIntra is equal to INTRA_L_CCLM, the following applies for y=nTbH . . . 2*nTbH−1 until availLB is equal to FALSE or y is equal to 2*nTbH−1:
      The availability derivation process for a block as specified in clause 6.4.X [Ed. (BB): Neighboring blocks availability checking process tbd] is invoked with the current chroma location (xCurr, yCurr) set equal to (xTbC, yTbC) and the neighboring chroma location (xTbC−1, yTbC+y) as inputs, and the output is assigned to availableLB
      When availableLB is equal to TRUE, numLeftBelow is incremented by one.
The number of available neighboring chroma samples on the top and top-right numTopSamp and the number of available neighboring chroma samples on the left and left-below nLeftSamp are derived as follows:
  If predModeIntra is equal to INTRA_LT_CCLM, the following applies:

$$numSampT = availT\,?\,nTbW : 0 \qquad (8\text{-}157)$$

$$numSampL = availL\,?\,nTbH : 0 \qquad (8\text{-}158)$$

Otherwise, the following applies:

$$numSampT = (availT\ \&\&\ predModeIntra == INTRA\_T\_CCLM)\,?\,(nTbW + Min(numTopRight, nTbH)) : 0 \qquad (8\text{-}159)$$

$$numSampL = (availL\ \&\&\ predModeIntra == INTRA\_L\_CCLM)\,?\,(nTbH + Min(numLeftBelow, nTbW)) : 0 \qquad (8\text{-}160)$$

The variable bCTUboundary is derived as follows:

$$bCTUboundary = (yTbC\ \&\ (1 << (Ctb\ Log\ 2SizeY-1)-1) == 0)\,?\,TRUE : FALSE. \qquad (8\text{-}161)$$

The variable cntN and array pickPosN with N being replaced by L and T, are derived as follows:
  The variable numIs4N is set equal to ((availT && availL && predModeIntra==INTRA_LT_CCLM)? 0:1).
  The variable startPosN is set equal to numSampN>>(2+numIs4N).
  The variable pickStepN is set equal to Max(1, numSampN>>(1+numIs4N)).
  If availN is equal to TRUE and predModeIntra is equal to INTRA_LT_CCLM or INTRA_N_CCLM, the following assignments are made:
    cntN is set equal to Min(numSampN, (1+numIs4N) <<1)
    pickPosN[pos] is set equal to (startPosN+ pos*pickStepN), with pos=0 . . . cntN−1.
  Otherwise, cntN is set equal to 0.
The prediction samples predSamples[x][y] with x=0 . . . nTbW−1, y=0 . . . nTbH−1 are derived as follows:
  If both numSampL and numSampT are equal to 0, the following applies:

$$predSamples[x][y] = 1 << (BitDepth_C - 1) \qquad (8\text{-}162)$$

Otherwise, the following ordered steps apply:
  1. The collocated luma samples pY[x][y] with x=0 . . . nTbW*2−1, y=0 . . . nTbH*2−1 are set equal to the reconstructed luma samples prior to the deblocking filter process at the locations (xTbY+x, yTbY+y).
  2. The neighboring luma samples pY[x][y] are derived as follows:
    When numSampL is greater than 0, the neighboring left luma samples pY[x][y] with x=−1 . . . −3, y=0 . . . 2*numSampL−1, are set equal to the reconstructed luma samples prior to the deblocking filter process at the locations (xTbY+x, yTbY+y).
    When numSampT is greater than 0, the neighboring top luma samples pY[x][y] with x=0 . . . 2*numSampT−1, y=−1, −2, are set equal to the reconstructed luma samples prior to the deblocking filter process at the locations (xTbY+x, yTbY+y).

When availTL is equal to TRUE, the neighboring top-left luma samples pY[x][y] with x=−1, y=−1, −2, are set equal to the reconstructed luma samples prior to the deblocking filter process at the locations (xTbY+x, yTbY+y).

3. The down-sampled collocated luma samples pDsY[x][y] with x=0 . . . nTbW−1, y=0 . . . nTbH−1 are derived as follows:

If sps_cclm_colocated_chroma_flag is equal to 1, the following applies:
pDsY[x][y] with x=1 . . . nTbW−1, y=1 . . . nTbH−1 is derived as follows:

$$pDsY[x][y]=(pY[2*x][2*y-1]+pY[2*x-1][2*y]+4*pY[2*x][2*y]+pY[2*x+1][2*y]+pY[2*x][2*y+1]+4)>>3 \quad (8\text{-}163)$$

If availL is equal to TRUE, pDsY[0][y] with y=1 . . . nTbH−1 is derived as follows:

$$pDsY[0][y]=(pY[0][2*y-1]+pY[-1][2*y]+4*pY[0][2*y]+pY[1][2*y]+pY[0][2*y+1]+4)>>3 \quad (8\text{-}164)$$

Otherwise, pDsY[0][y] with y=1 . . . nTbH−1 is derived as follows:

$$pDsY[0][y]=(pY[0][2*y-1]+2*pY[0][2*y]+pY[0][2*y+1]+2)>>2 \quad (8\text{-}165)$$

If availT is equal to TRUE, pDsY[x][0] with x=1 . . . nTbW−1 is derived as follows:

$$pDsY[x][0]=(pY[2*x][-1]+pY[2*x-1][0]+4*pY[2*x][0]+pY[2*x+1][0]+pY[2*x][1]+4)>>3 \quad (8\text{-}166)$$

Otherwise, pDsY[x][0] with x=1 . . . nTbW−1 is derived as follows:

$$pDsY[x][0]=(pY[2*x-1][0]+2*pY[2*x][0]+pY[2*x+1][0]+2)>>2 \quad (8\text{-}167)$$

If availL is equal to TRUE and availT is equal to TRUE, pDsY[0][0] is derived as follows:

$$pDsY[0][0]=(pY[0][-1]+pY[-1][0]+4*pY[0][0]+pY[1][0]+pY[0][1]+4)>>3 \quad (8\text{-}168)$$

Otherwise if availL is equal to TRUE and availT is equal to FALSE, pDsY[0][0] is derived as follows:

$$pDsY[0][0]=(pY[-1][0]+2*pY[0][0]+pY[1][0]+2)>>2 \quad (8\text{-}169)$$

Otherwise if availL is equal to FALSE and availT is equal to TRUE, pDsY[0][0] is derived as follows:

$$pDsY[0][0]=(pY[0][-1]+2*pY[0][0]+pY[0][1]+2)>>2 \quad (8\text{-}170)$$

Otherwise (availL is equal to FALSE and availT is equal to FALSE), pDsY[0][0] is derived as follows:

$$pDsY[0][0]=pY[0][0] \quad (8\text{-}171)$$

Otherwise, the following applies:
pDsY[x][y] with x=1 . . . nTbW−1, y=0 . . . nTbH−1 is derived as follows:

$$pDsY[x][y]=(pY[2*x-1][2*y]+pY[2*x-1][2*y+1]+2*pY[2*x][2*y]+2*pY[2*x][2*y+1]+pY[2*x+1][2*y]+pY[2*x+1][2*y+1]+4)>>3 \quad (8\text{-}172)$$

If availL is equal to TRUE, pDsY[0][y] with y=0 . . . nTbH−1 is derived as follows:

$$pDsY[0][y]=(pY[-1][2*y]+pY[-1][2*y+1]+2*pY[0][2*y]+2*pY[0][2*y+1]+pY[1][2*y]+pY[1][2*y+1]+4)>>3 \quad (8\text{-}173)$$

Otherwise, pDsY[0][y] with y=0 . . . nTbH−1 is derived as follows:

$$pDsY[0][y]=(pY[0][2*y]+pY[0][2*y+1]+1)>>1 \quad (8\text{-}174)$$

4. When numSampL is greater than 0, the selected neighboring left chroma samples pSelC[idx] are set equal to p[−1][pickPosL[idx]] with idx=0 . . . cntL−1, and the selected down-sampled neighboring left luma samples pSelDsY[idx] with idx=0 . . . cntL−1 are derived as follows:

The variable y is set equal to pickPosL[idx].
If sps_cclm_colocated_chroma_flag is equal to 1, the following applies:
If y is greater than 0 or availTL is equal to TRUE, pSelDsY[idx] is derived as follows:

$$pSelDsY[idx]=(pY[-2][2*y-1]+pY[-3][2*y]+4*pY[-2][2*y]+pY[-1][2*y]+pY[-2][2*y+1]+4)>>3 \quad (8\text{-}175)$$

Otherwise:

$$pSelDsY[idx]=(pY[-3][0]+2*pY[-2][0]+pY[-1][0]+2)>>2 \quad (8\text{-}177)$$

Otherwise, the following applies:

$$pSelDsY[idx]=(pY[-1][2*y]+pY[-1][2*y+1]+2*pY[-2][2*y]+2*pY[-2][2*y+1]+pY[-3][2*y]+pY[-3][2*y+1]+4)>>3 \quad (8\text{-}178)$$

5. When numSampT is greater than 0, the selected neighboring top chroma samples pSelC[idx] are set equal to p[pickPosT[idx−cntL]][−1] with idx=cntL . . . cntL+cntT−1, and the down-sampled neighboring top luma samples pSelDsY[idx] with idx=0 . . . cntL+cntT−1 are specified as follows:

The variable x is set equal to pickPosT[idx−cntL].
If sps_cclm_colocated_chroma_flag is equal to 1, the following applies:
If x is greater than 0, the following applies:
If bCTUboundary is equal to FALSE, the following applies:

$$pSelDsY[idx]=(pY[2*x][-3]+pY[2*x-1][-2]+4*pY[2*x][-2]+pY[2*x+1][-2]+pY[2*x][-1]+4)>>3 \quad (8\text{-}179)$$

Otherwise (bCTUboundary is equal to TRUE), the following applies:

$$pSelDsY[idx]=(pY[2*x-1][-1]+2*pY[2*x][-1]+pY[2*x+1][-1]+2)>>2 \quad (8\text{-}180)$$

Otherwise:
If availTL is equal to TRUE and bCTUboundary is equal to FALSE, the following applies:

$$pSelDsY[idx]=(pY[0][-3]+pY[-1][-2]+4*pY[0][-2]+pY[1][-2]+pY[0][-1]+4)>>3 \quad (8\text{-}181)$$

Otherwise if availTL is equal to TRUE and bCTUboundary is equal to TRUE, the following applies:

$$pSelDsY[idx]=(pY[-1][-1]+2*pY[0][-1]+pY[1][-1]+2)>>2 \quad (8\text{-}182)$$

Otherwise if availTL is equal to FALSE and bCTUboundary is equal to FALSE, the following applies:

$$pSelDsY[idx]=(pY[0][-3]+2*pY[0][-2]+pY[0][-1]+2)>>2 \quad (8\text{-}183)$$

Otherwise (availTL is equal to FALSE and bCTUboundary is equal to TRUE), the following applies:

$$pSelDsY[idx]=pY[0][-1] \quad (8\text{-}184)$$

Otherwise, the following applies:
If x is greater than 0, the following applies:
If bCTUboundary is equal to FALSE, the following applies:

pSelDsY[idx]=(pY[2*x−1][−2]+pY[2*x−1][−1]+2*pY[2*x][−2]2*pY[2*x][−1]+pY[2*x+1][−2]+pY[2*x+1][−1]+4)>>3     (8-185)

Otherwise (bCTUboundary is equal to TRUE), the following applies:

pSelDsY[idx]=(pY[2*x−1][−1]+2*pY[2*x][−1]+pY[2*x+1][−1]+2)>>2     (8-186)

Otherwise:
  If availTL is equal to TRUE and bCTUboundary is equal to FALSE, the following applies:

pSelDsY[idx]=(pY[−1][−2]+pY[−1][−1]+2*pY[0][2]+2*pY[0][−1]+pY[1][−2]+pY[1][−1]+4)>>3     (8-187)

Otherwise if availTL is equal to TRUE and bCTUboundary is equal to TRUE, the following applies:

pSelDsY[idx]=(pY[−1][−1]+2*pY[0][−1]+pY[1][−1]+2)>>2     (8-188)

Otherwise if availTL is equal to FALSE and bCTUboundary is equal to FALSE, the following applies:

pSelDsY[idx]=(pY[0][−2]+pY[0][−1]+1)>>1     (8-189)

Otherwise (availTL is equal to FALSE and bCTUboundary is equal to TRUE), the following applies:

pSelDsY[idx]=pY[0][−1]     (8-190)

6. When cntT+cntL is not equal to 0, the variables minY, maxY, minC and maxC are derived as follows:
   When cntT+cntL is equal to 2, set pSelComp[3] equal to pSelComp[0], pSelComp[2] equal to pSelComp[1], pSelComp[0] equal to pSelComp[1], and pSelComp[1] equal to pSelComp[3], with Comp being replaced by DsY and C . . . .
   The arrays minGrpIdx and maxGrpIdx are set as follows:
     minGrpIdx[0]=0.
     minGrpIdx[1]=2.
     maxGrpIdx[0]=1.
     maxGrpIdx[1]=3.
   When pSelDsY[minGrpIdx[0]] is greater than pSelDsY[minGrpIdx[1]], minGrpIdx[0] and minGrpIdx[1] are swapped as (minGrpIdx[0], minGrpIdx[1])=Swap(minGrpIdx[0], minGrpIdx[1]).
   When pSelDsY[maxGrpIdx[0]] is greater than pSelDsY[maxGrpIdx[1]], maxGrpIdx[0] and maxGrpIdx[1] are swapped as (maxGrpIdx[0], maxGrpIdx[1])=Swap(maxGrpIdx[0], maxGrpIdx[1]).
   When pSelDsY[minGrpIdx[0]] is greater than pSelDsY[maxGrpIdx[1]], arrays minGrpIdx and maxGrpIdx are swapped as (minGrpIdx, maxGrpIdx)=Swap(minGrpIdx, maxGrpIdx).
   When pSelDsY[minGrpIdx[1]] is greater than pSelDsY[maxGrpIdx[0]], minGrpIdx[1] and maxGrpIdx[0] are swapped as (minGrpIdx[1], maxGrpIdx[0])=Swap(minGrpIdx[1], maxGrpIdx[0]).
   maxY=(pSelDsY[maxGrpIdx[0]]+pSelDsY[maxGrpIdx[1]]+1)>>1.
   maxC=(pSelC[maxGrpIdx[0]]+pSelC[maxGrpIdx[1]]+1)>>1.
   minY=(pSelDsY[minGrpIdx[0]]+pSelDsY[minGrpIdx[1]]+1)>>1.
   minC=(pSelC[minGrpIdx[0]]+pSelC[minGrpIdx[1]]+1)>>1.

7. The variables a, b, and k are derived as follows:
   If numSampL is equal to 0, and numSampT is equal to 0, the following applies:

$k=0$     (8-208)

$a=0$     (8-209)

$b=1<<(BitDepth_C-1)$     (8-210)

Otherwise, the following applies:

$diff=maxY-minY$     (8-211)

If diff is not equal to 0, the following applies:

$diffC=maxC-minC$     (8-212)

$x=Floor(Log\ 2(diff))$     (8-213)

$normDiff=((diff<<4)>>x)\&\ 15$     (8-214)

$x+=(normDiff\ !=0)?1:0$     (8-215)

$y=Floor(Log\ 2(Abs(diffC)))+1$     (8-216)

$a=(diffC*(divSigTable[normDiff]|8)+2^{y-1})>>y$     (8-217)

$k=((3+x-y)<1)?1:3+x-y$     (8-218)

$a=((3+x-y)<1)?Sign(a)*15:\ a$     (8-219)

$b=minC-((a*minY)>>k)$     (8-220)

where divSigTable[ ] is specified as follows:

divSigTable[ ]={0,7,6,5,5,4,4,3,3,2,2,1,1,1,1,0}     (8-221)

Otherwise (diff is equal to 0), the following applies:

$k=0$     (8-222)

$a=0$     (8-223)

$b=minC$     (8-224)

8. The prediction samples predSamples[x][y] with x=0 . . . nTbW−1, y=0 . . . nTbH−1 are derived as follows:

predSamples[x][y]=Clip1C(((pDsY[x][y]*a)>>k)+b)     (8-225)

JVET-L0283

This contribution proposes Multiple Reference Line Intra Prediction (MRLIP) in which the directional intra-prediction can be generated by using more than one reference line of neighboring samples adjacent or non-adjacent to the current block.

1.6 Examples of Intra Prediction in VVC

1.6.1 Intra Mode Coding with 67 Intra Prediction Modes

To capture the arbitrary edge directions presented in natural video, the number of directional intra modes is extended from 33, as used in HEVC, to 65. The additional directional modes are depicted as dotted arrows in FIG. 9, and the planar and direct current (DC) modes remain the same. These denser directional intra prediction modes apply for all block sizes and for both luma and chroma intra predictions.

Figure 9:
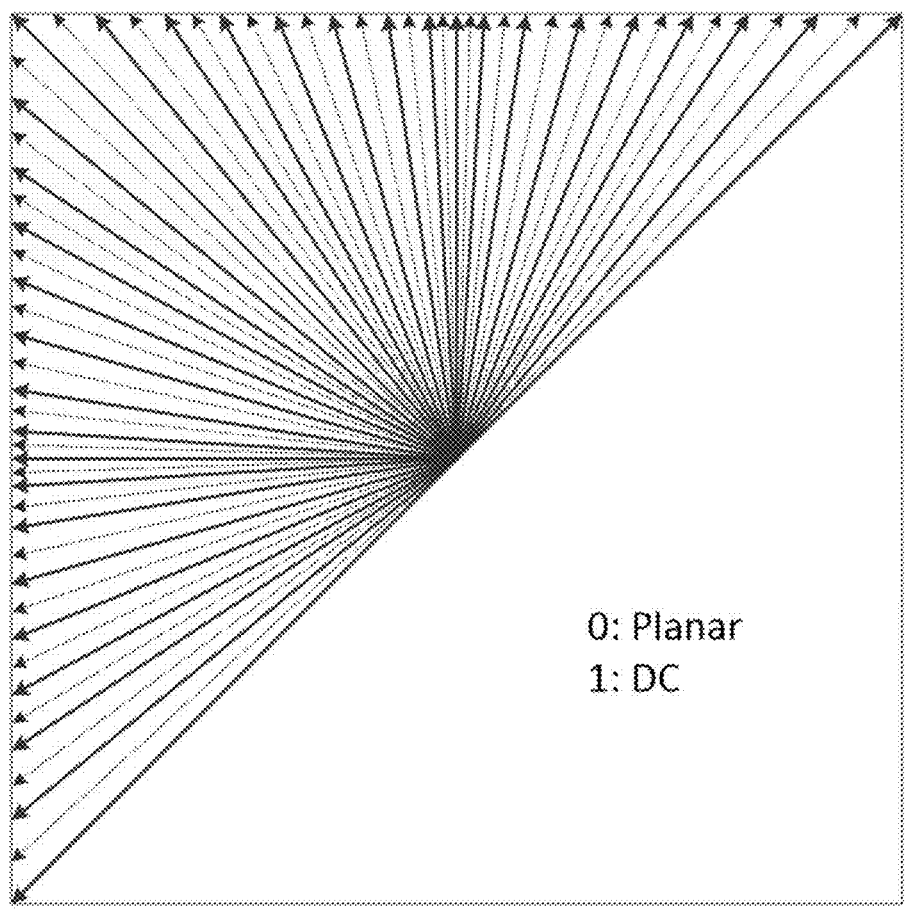
FIG. 9 shows an example of 67 intra prediction modes.

Conventional angular intra prediction directions are defined from 45 degrees to −135 degrees in clockwise direction as shown in FIG. 9. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged (e.g., 67), and the intra mode coding is unchanged.

In HEVC, every intra-coded block has a square shape and the length of each of its side is a power of 2. Thus, no division operations are required to generate an intra-predictor using DC mode. In VTM2, blocks can have a rectangular shape that necessitates the use of a division operation per block in the general case. To avoid division operations for DC prediction, only the longer side is used to compute the average for non-square blocks.

1.6.2 Examples of Intra Mode Coding

In some embodiments, and to keep the complexity of the MPM list generation low, an intra mode coding method with 3 Most Probable Modes (MPMs) is used. The following three aspects are considered to the MPM lists:

Neighbor intra modes;
Derived intra modes; and
Default intra modes.

For neighbor intra modes (A and B), two neighboring blocks, located in left and above are considered. An initial MPM list is formed by performing pruning process for two neighboring intra modes. If two neighboring modes are different each other, one of the default modes (e.g., PLANA (0), DC (1), ANGULAR50 (e.g., 50)) is added to the MPM list after the pruning check with the existing two MPMs. When the two neighboring modes are the same, either the default modes or the derived modes are added to the MPM list after the pruning check. The detailed generation process of three MPM list is derived as follows:

If two neighboring candidate modes (i.e., A==B) are same,
  If A is less than 2, candModeList [3]={0, 1, 50}.
  Otherwise, candModeList[0]={A, 2+((A+61) % 64), 2+((A−1) % 64) }
Otherwise,
  If neither of A and B is equal to 0, candModeList [3]={A, B, 0}.
  Otherwise, if neither of A and B is equal to 1, cand-ModeList [3]={A, B, 1}.
  Otherwise, candModeList [3]={A, B, 50}.

An additional pruning process is used to remove duplicated modes so that only unique modes can be included into the MPM list. For entropy coding of the 64 non-MPM modes, a 6-bit Fixed Length Code (FLC) is used.

1.6.3 Wide-Angle Intra Prediction for Non-Square Blocks

In some embodiments, conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, e.g., 67, and the intra mode coding is unchanged.

Figure 10A:
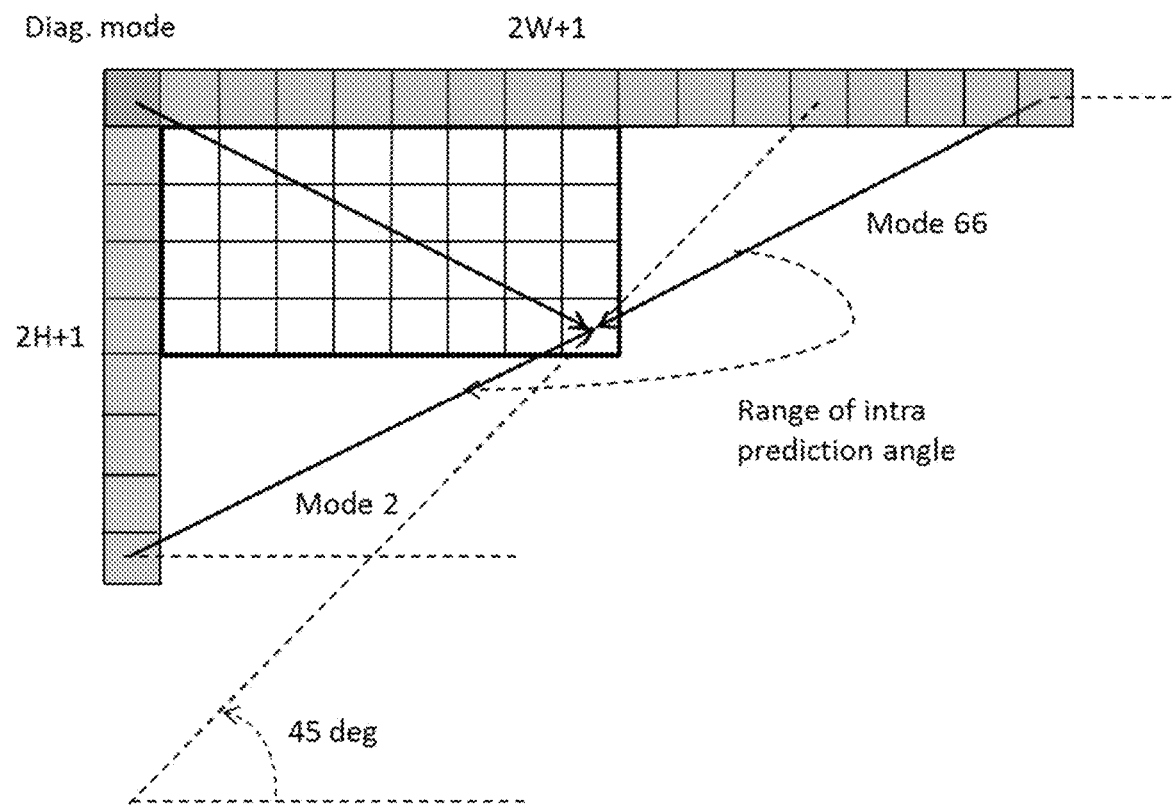
FIGS. 10A and 10B show examples of reference samples for wide-angle intra prediction modes for non-square blocks.
Figure 10B:
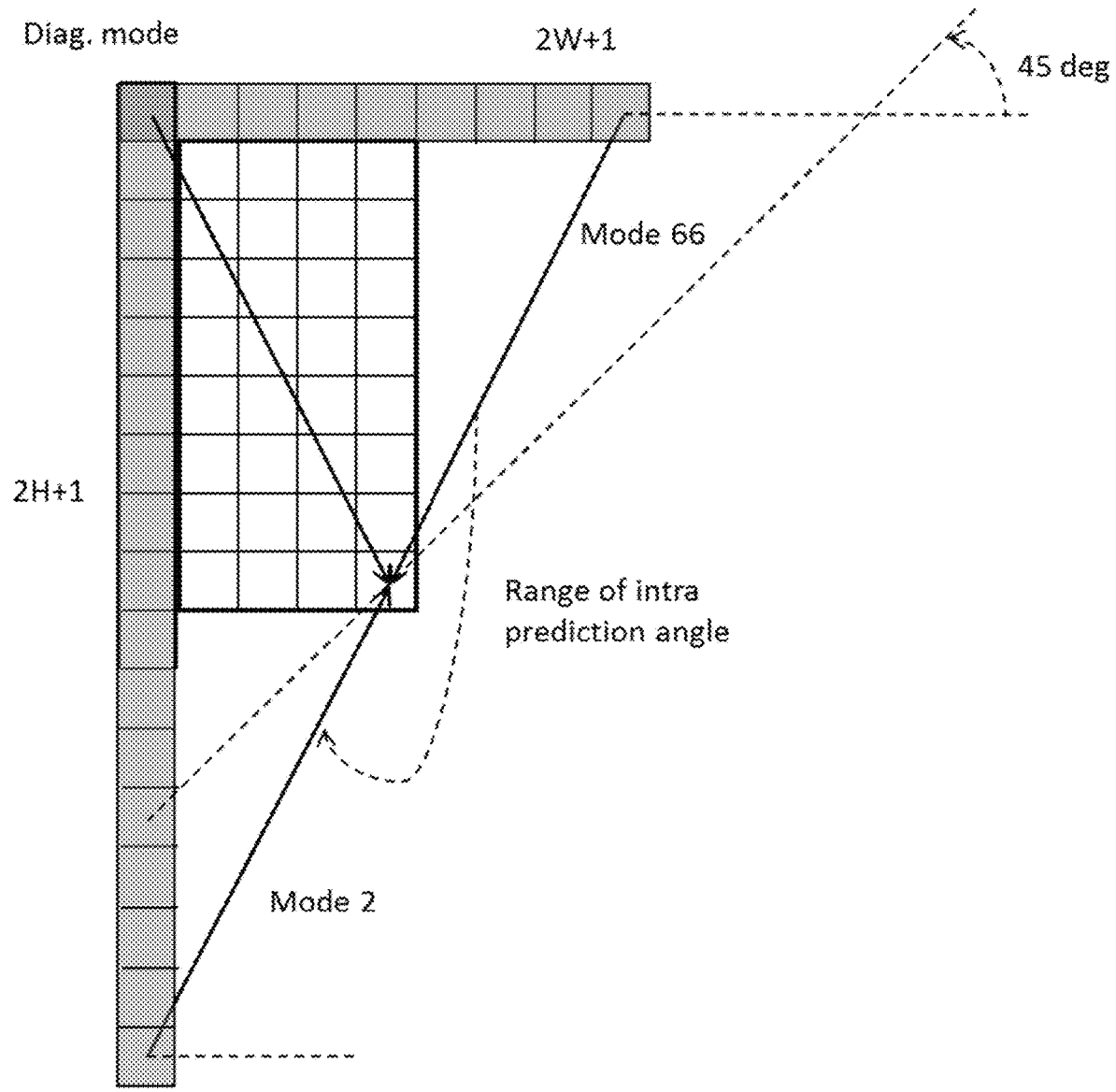

To support these prediction directions, the top reference with length 2 W+1, and the left reference with length 2H+1, are defined as shown in the examples in FIGS. 10A and 10B.

In some embodiments, the mode number of replaced mode in wide-angular direction mode is dependent on the aspect ratio of a block. The replaced intra prediction modes are illustrated in Table 1.

TABLE 1

Intra prediction modes replaced by wide-angle modes

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Figure 11:
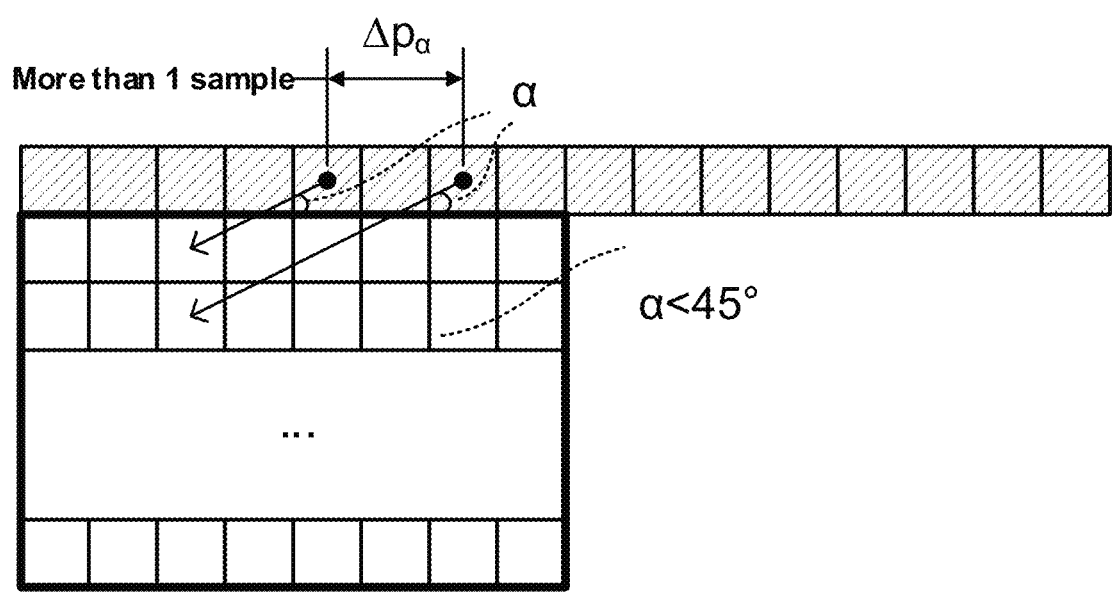
FIG. 11 shows an example of a discontinuity when using wide-angle intra prediction.
Figure 12A:
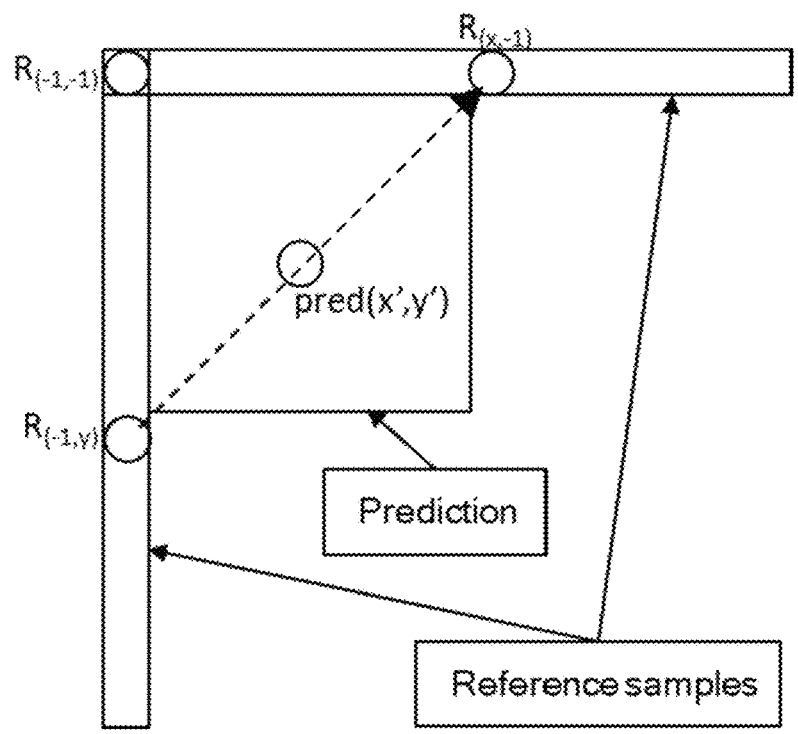
FIGS. 12A-12D show examples of samples used by a position-dependent intra prediction combination (PDPC) method.
Figure 12B:
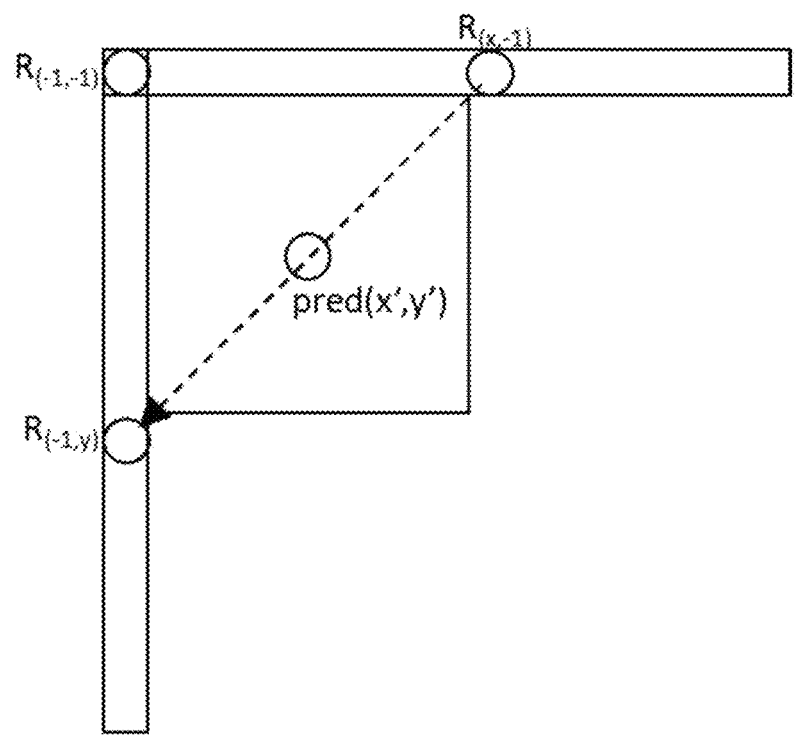
Figure 12C:
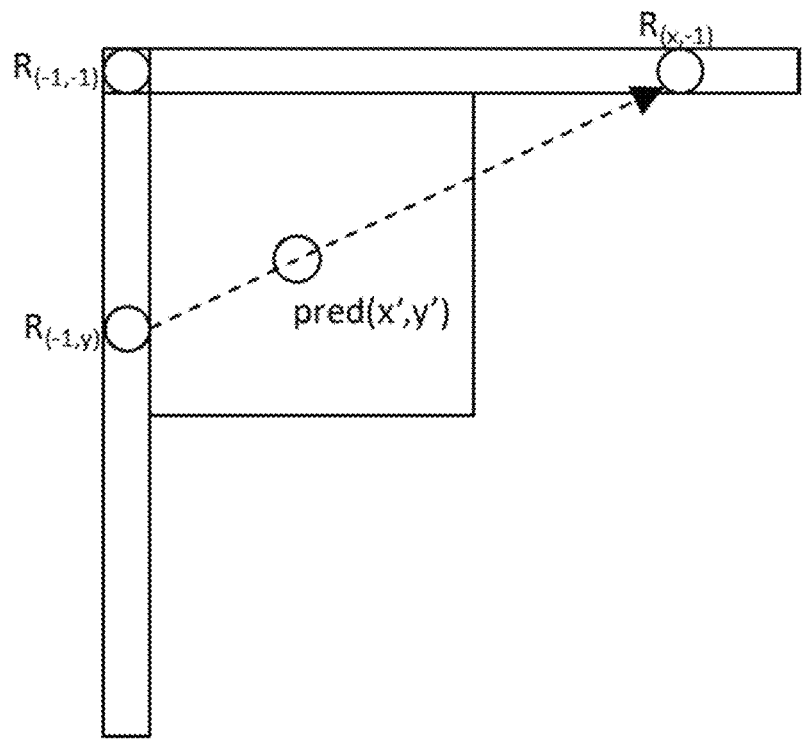
Figure 12D:
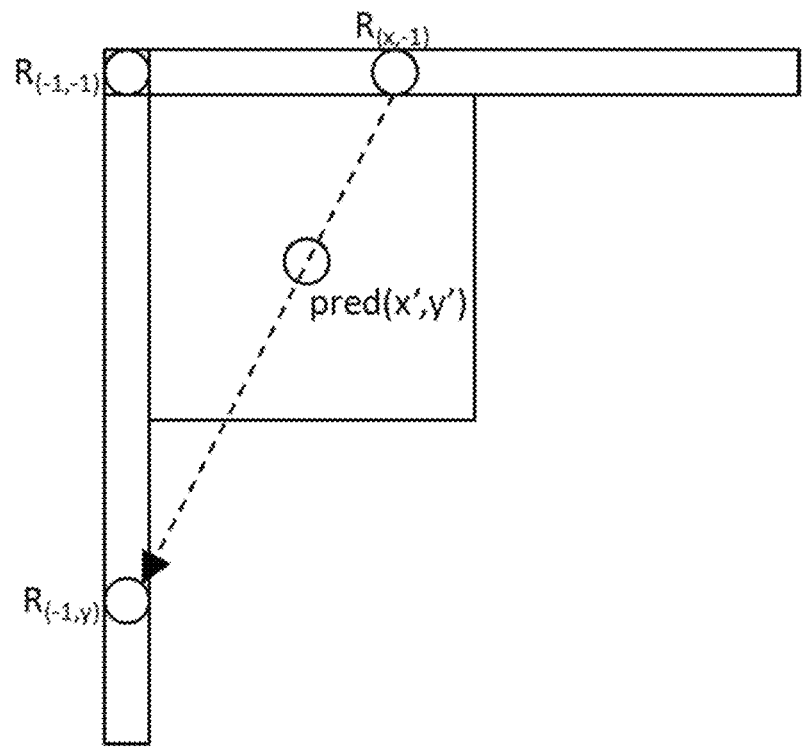

As shown in FIG. 11, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

1.6.4 Examples of Position Dependent Intra Prediction Combination (PDPC)

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

$$\text{pred}(x,y)=(wL \times R_{-1,y}+wT \times R_{x,-1}-wT \times R_{-1,-1}+(64-wL-wT+wTL)\times \text{pred}(x,y)+32)>>\text{shift}$$

Herein, $R_{x,-1}$, $R_{-1,y}$ represent the reference samples located at the top and left of current sample (x, y), respectively, and $R_{-1,-1}$ represents the reference sample located at the top-left corner of the current block.

In some embodiments, and if PDPC is applied to DC, planar, horizontal, and vertical intra modes, additional boundary filters are not needed, as required in the case of HEVC DC mode boundary filter or horizontal/vertical mode edge filters.

FIGS. 12A-12D illustrate the definition of reference samples ($R_{x,-1}$, $R_{-1,y}$ and $R_{-1,-1}$) for PDPC applied over various prediction modes. The prediction sample pred (x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

In some embodiments, the PDPC weights are dependent on prediction modes and are shown in Table 2, where S=shift.

TABLE 2

Examples of PDPC weights according to prediction modes

| Prediction modes | wT | wL | wTL |
|---|---|---|---|
| Diagonal top-right | 16 >> ((y' << 1) >> S) | 16 >> ((x' << 1) >> S) | 0 |
| Diagonal bottom-left | 16 >> ((y' << 1) >> S) | 16 >> ((x' << 1) >> S) | 0 |
| Adjacent diag. top-right | 32 >> ((y' << 1) >> S) | 0 | 0 |
| Adjacent diag. bottom-left | 0 | 32 >> ((x' << 1) >> S) | 0 |

2. Examples of Drawbacks in Existing Implementations Solved by Described Techniques The current CCLM implementations in either JEM or VTM exhibit at least the following issues:

In the current CCLM design of JEM, it requires more neighboring luma samples than what are used in normal intra-prediction. CCLM requires two above neighboring rows of luma samples and three left neighboring columns of luma samples. MM-CCLM requires four above neighboring rows of luma samples and four left neighboring columns of luma samples. This is undesirable in hardware design.

Other related methods use only one line of neighboring luma samples, but they bring some coding performance loss.

The neighboring chroma samples are only used to derive LM parameters. When generating the prediction block of a chroma block, only luma samples and derived LM parameters are utilized. Therefore, the spatial correlation between current chroma block and its neighboring chroma blocks are not utilized.

In VTM-5.0, CCLM (including LM, LM-L, LM-T modes) may find only two available neighboring chroma samples (and their corresponding luma samples which may be down-sampled). That is a special case in the 4-point max-min CCLM parameter derivation process, which is not desirable.

3 Exemplary Methods for Cross-Component Prediction in Video Coding

Embodiments of the presently disclosed technology overcome drawbacks of existing implementations, thereby providing video coding with higher coding efficiencies but lower computational complexity. Cross-component prediction, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In the following examples and methods, the term "LM method" includes, but is not limited to, the LM mode in JEM or VTM, and MMLM mode in JEM, left-LM mode which only uses left neighboring samples to derive the linear model, the above-LM mode which only uses above neighboring samples to derive the linear model or other kinds of methods which utilize luma reconstruction samples to derive chroma prediction blocks.

Example 1

In one example, consider methods for how to down-sample luma samples depends on whether the luma samples are inside the current block or outside the current block.
(a) The down-sampled luma samples may be used to derive LM parameters. Here, the luma block is the corresponding luma block of one chroma block.
(b) The down-sampled luma samples may be used to derive other kinds of chroma prediction blocks. Here, the luma block is the corresponding luma block of one chroma block.
(c) For example, luma samples inside the current block are down-sampled with the same method as that in JEM, but luma samples outside the current block are down-sampled with a different method.

Example 2

Figure 13A:
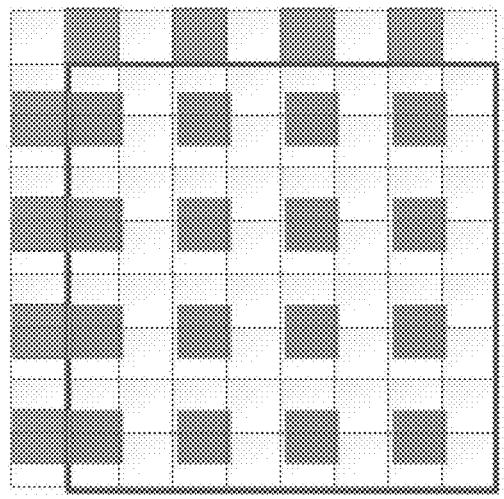
FIGS. 13A and 13B show examples of down-sampled luma sample positions inside and outside the current block.
Figure 13B:
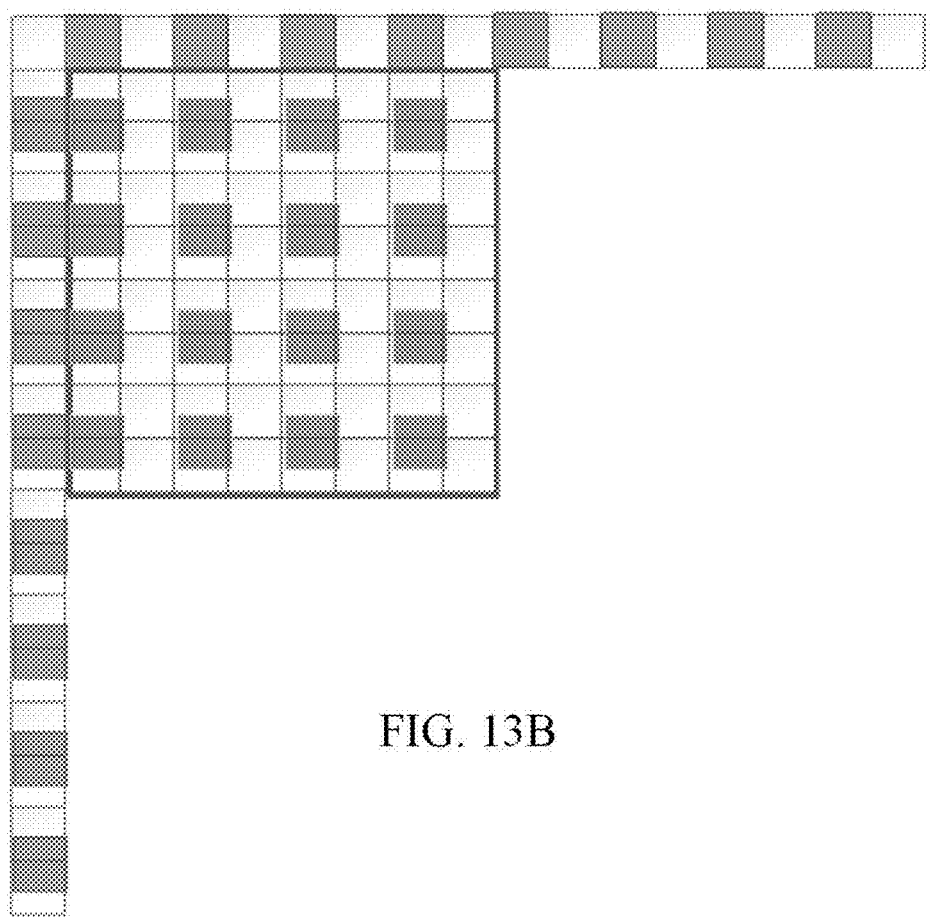

In one example, consider methods for how to down-sample outside luma samples that depend on their positions.
(a) In one example, the down-sampled luma samples may be used to derive prediction blocks. Here, the outside luma samples could be neighboring luma samples or non-adjacent luma samples relative to the current luma block to be coded.
(b) The down-sampled luma samples may be used to derive LM parameters. Here, outside luma samples are those which not located in the corresponding luma block of the current chroma block.
(c) In one example, luma samples left to the current block or above to the current block are down-sampled in different ways.
(d) In one example, luma samples are down-sampled as specified below as shown in FIGS. 13A and 13B.
  (i) Luma samples inside the current block are down-sampled in the same way as in JEM.
  (ii) Luma samples outside the current block and above to the current block are down-sampled to position C or D in FIG. 4. Alternatively, Luma samples are down-sampled to position C in FIG. 4 with a filter. Suppose the above luma samples adjacent to the current block are denoted as a[i], then d[i]=(a[2i−1]+2*a[2i]+a[2i+1]+2)>>2, where d[i] represents the down-sampled luma samples.
    (1) If the sample a[2i−1] is unavailable, d[i]=(3*a[2i]+a[2i+1]+2)>>2
    (2) If the sample a[2i+1] is unavailable, d[i]=(a[2i−1]+3*a[2i]+2)>>2
  (iii) Luma samples outside the current block and left to the current block are down-sampled to position B or D in FIG. 4. Alternatively, Luma samples are down-sampled to the half position between B and D. Suppose the luma samples left adjacent to the current block are denoted as a[j], then d[j]=(a[2j]+a[2j+1]+1)>>1, where d[j] represents the down-sampled luma samples.
  (iv) In one example, W luma down-sampled samples are generated, where W is the width of the current chroma block as shown in FIG. 13A.
    (1) Alternatively, N×W luma down-sampled samples are generated from the above adjacent luma samples, where N is an integer such as 2, as shown in FIG. 13B.
    (2) Alternatively, W+K luma down-sampled samples are generated from the above adjacent luma samples, wherein K is a positive integer.
    (3) Alternatively, WIN luma down-sampled samples are generated from the above adjacent luma samples, where N is an integer such as 2.

(v) In one example, H luma down-sampled samples are generated from the left adjacent luma samples, where H is the height of the current chroma block as shown in FIG. 13A.
  (1) Alternatively, N×H luma down-sampled samples are generated, where N is an integer such as 2, as shown in FIG. 13B.
  (2) Alternatively, H+K luma down-sampled samples are generated, wherein K is a positive integer.
  (3) Alternatively, H/N luma down-sampled samples are generated, where N is an integer such as 2.

Example 3

In one example, consider methods for how to select and how many samples to be down-sampled for outside luma/inside luma samples may depend on the block size/block shape.

Example 4

In one example, the prediction block generated from LM methods may be further refined before being used as the predictor of chroma block.
  (a) In one example, the reconstructed chroma samples (neighboring or non-adjacent chroma samples) may be further utilized together with the prediction block from LM methods.
    (i) In one example, a linear function may be applied with the neighboring reconstructed chroma samples and the prediction block from LM methods as input and refined prediction samples as output.
    (ii) In one example, for certain positions, the prediction block from LM methods may be refined and for the remaining positions, the prediction block from LM methods may be directly inherited without being refined.
  (b) In one example, two prediction blocks may be generated (e.g., one from LM methods and the other one from chroma intra prediction block). However, the final prediction block may be generated from the two prediction blocks for certain positions and directly copied from the prediction block from LM for the remaining positions.
    (i) In one example, the chroma intra prediction mode may be signaled or derived from luma intra prediction modes.
    (ii) In one example, 'the certain positions' where two prediction blocks may be jointly used includes the top several rows and/or left several columns.
  (c) For example, boundary filtering can be applied to LM mode, MMLM mode, left-LM mode or above-LM mode, no matter what kind of down-sampling filter is applied.
  (d) In one example, a function of prediction block from LM methods and reconstructed chroma samples above current block may be utilized together to refine the prediction block from LM methods.
    (i) Suppose the reconstructed chroma samples above adjacent to the current block are denoted as $a[-1][j]$, the LM predicted sample at the ith row and jth column is $a[i][j]$, then the prediction sample after boundary filtering is calculated as a function of $a[-1][j]$ and $a[i][j]$. In one example, the final prediction for the (i,j) position is defined as $a'[i][j]=(w1*a[i][j]+w2*a[-1][i]+2^{N-1})>>N$, where $w1+w2=2^N$.
    (ii) The boundary filtering can only be applied when above neighboring samples are available.
    (iii) In one example, the boundary filtering is only applied if $i<=K$. K is an integer such as 0 or 1. For example, K=0, w1=w2=1. In another example, K=0, w1=3, w2=1.
    (iv) In one example, w1 and w2 depend on the row index (i). For example, K=1, w1=w2=1 for samples $a[0][j]$, but w1=3 and w2=1 for samples $a[1][j]$.
  (e) In one example, a function of prediction block from LM methods and reconstructed chroma samples left to the current block may be utilized together to refine the prediction block from LM methods.
    (i) Suppose the reconstructed chroma samples left adjacent to the current block are denoted as $a[i][-1]$, the LM predicted sample at the ith row and jth column is $a[i][j]$, then the prediction sample after boundary filtering is calculated as a function of $a[i][-1]$ and $a[i][j]$. In one example, the final prediction for the (i,j) position is defined as $a'[i][j]=(w1*a[i][j]+w2*a[i][-1]+2^{N-1})>>N$, where $w1+w2=2^N$.
    (ii) In one example, the boundary filtering can only be applied when left neighboring samples are available.
    (iii) In one example, the boundary filtering is only applied if $j<=K$. K is an integer such as 0 or 1. For example, K=0, w1=w2=1. In another example, K=0, w1=3, w2=1.
    (iv) In one example, w1 and w2 depend on the column index (i). For example, K=1, w1=w2=1 for samples $a[0][j]$, but w1=3 and w2=1 for samples $a[1][j]$.
  (f) In one example, a function of prediction block from LM methods and reconstructed chroma samples left to and above the current block may be utilized together to refine the prediction block from LM methods.
    (i) Suppose the reconstructed chroma samples above adjacent to the current block are denoted as $a[-1][j]$, the reconstructed chroma samples left adjacent to the current block are denoted as $a[i][-1]$, and the LM predicted sample at the ith row and jth column is $a[i][j]$, then the prediction sample after boundary filtering is calculated as $a'[i][j]=(w1*a[i][j]+w2*a[i][-1]+w3*a[-1][j]+2^{N-1})>>N$, where $w1+w2+w3=2^N$.
    (ii) In one example, the boundary filtering can only be applied when both left and above neighboring samples are available.
    (iii) In one example, this boundary filtering is only applied when $i<=K$ and $j<=P$. In another example, it is only applied when $i<=K$ or $J<=P$.
    (iv) In one example, this boundary filtering is only applied to $a[0][0]$ with w1=2, w2=w3=1.

Example 5

In one example, consider whether to apply and how to apply LM methods may depend on the size or shape of the current block. Assume W and H represent the width and height of the current chroma block, respectively, and T1 and T2 are thresholds.
  (a) In one example, LM mode (or MMLM mode, or Left-LM mode, or Above-LM mode) is not applicable when $W<=T1$ and $H<=T2$. For example, T1=T2=4.
  (b) In one example, LM mode (or MMLM mode, or Left-LM mode, or Above-LM mode) is not applicable when $W<=T1$ or $H<=T2$. For example, T1=T2=2.

(c) In one example, LM mode (or MMLM mode, or Left-LM mode, or Above-LM mode) is not applicable when W<=T1 or H<=T2. For example, T1=T2=4.
(d) In one example, LM (or MMLM mode, or Left-LM mode, or Above-LM mode) mode is not applicable when W+H<=T1. For example, T1=6.
(e) In one example, LM mode (or MMLM mode, or Left-LM mode, or Above-LM mode) is not applicable when W×H<=T1. For example, T1=16.
(f) In one example, Left-LM mode is not applicable when H<=T1. For example, T1=4.
(g) In one example, Above-LM mode is not applicable when WC=T1. For example, T1=4.
(h) T1 and/or T2 may be pre-defined or signaled in an SPS, a sequence header, a PPS, a picture header, a VPS, a slice header, a CTU, a CU or a group of CTUs.

Example 6

In one example, consider whether and how to apply the proposed single-line LM methods may depend on the position of the current block.
(a) In one example, one or more of the proposed methods is applied on CUs that locate at the top boundary of the current CTU as shown in FIG. 8A.
(b) In one example, one or more of the proposed methods is applied on CUs that locate at the left boundary of the current CTU as shown in FIG. 8B.
(c) In one example, one or more of the proposed methods is applied in both the above cases.
(d) In one example, one or more of the proposed methods is applied on CUs that locate at the top boundary of a region such as a 64×64 block.
(e) In one example, one or more of the proposed methods is applied on CUs that locate at the left boundary of a region such as a 64×64 block.

The examples described above may be incorporated in the context of the methods described below, e.g., method 1400, which may be implemented at a video encoder and/or decoder.

Example 7

Figure 16:
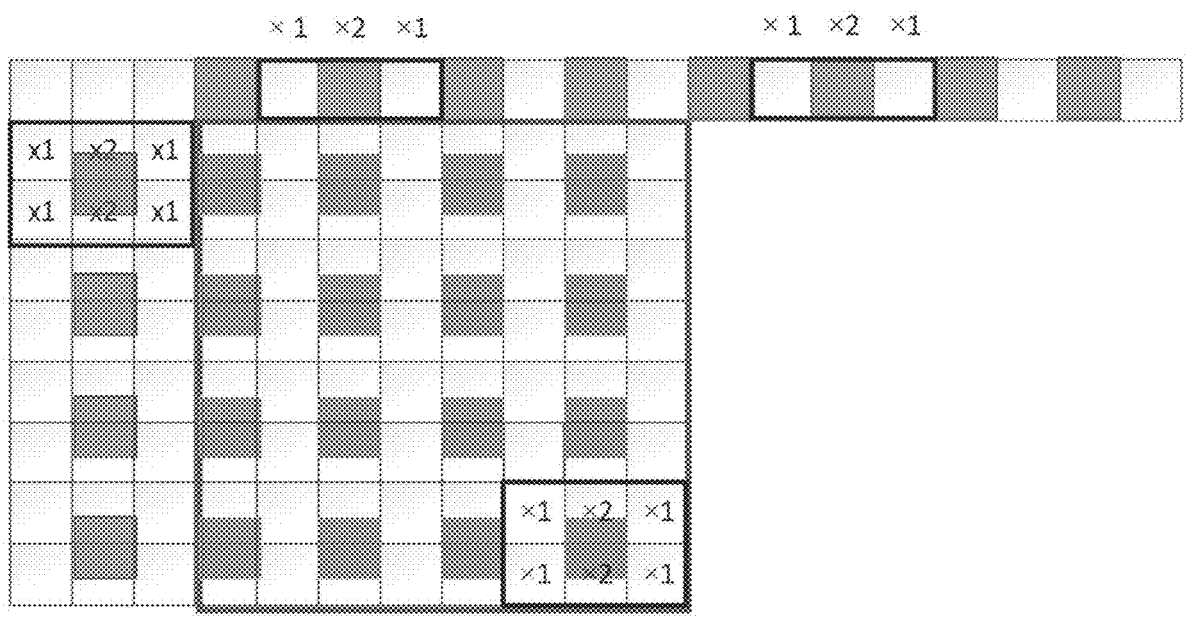
FIG. 16 shows an example of combining different luma down-sampling methods together.

The above LM neighboring samples are down-sampled by one filtering method (e.g., the one defined in bullet 2.d.ii), and those luma samples which may be used for normal intra prediction process (e.g., 2 W samples (above and above right of current block) in VVC) are utilized. While the left LM neighboring samples are down-sampled by a different filtering method (e.g., the one defined in JEM or VTM-2.0).
(a) FIG. 16 shows an example how to combine different down-sampling methods together.

Example 8

In an alternative example to bullet 2.d.ii.1, Luma samples are down-sampled to position C in FIG. 4 with a filter. Suppose the above luma samples adjacent to the current block are denoted as a[i], then d[i]=(a[2i−1]+2*a[2i]+a[2i+1]+offset0)>>2, if i>0; Otherwise (if i==0), d[i]=(3*a[2i]+a[2i+1]+offset1)>>2.
(a) Alternatively, if i==0, d[i]=a[2i].
(b) Alternatively, if i==0, d[i]=(a[2i]+a[2i+1]+offset2)>>1.
(c) In one example, offset0=offset1=2; offset2=1.

Example 9

In some embodiments, the number of down-sampling luma samples above or left to the current block may depend on the dimension of the current block. Suppose the width and height of the current chroma block are denoted as W and H:
(a) For example, W luma samples above the current block are down-sampled and H luma samples left to the current block are down-sampled if W==H;
(b) For example, 2*W luma samples above the current block are down-sampled and 2*H luma samples left to the current block are down-sampled if W==H;
(c) For example, 2*W luma samples above the current block are down-sampled and H luma samples left to the current block are down-sampled if W<H;
(d) For example, 2*W luma samples above the current block are down-sampled and H luma samples left to the current block are down-sampled if W<=H;
(e) For example, 2*W luma samples above the current block are down-sampled and H luma samples left to the current block are down-sampled if W>H;
(f) For example, 2*W luma samples above the current block are down-sampled and H luma samples left to the current block are down-sampled if W>=H;
(g) For example, W luma samples above the current block are down-sampled and 2*H luma samples left to the current block are down-sampled if W<H;
(h) For example, W luma samples above the current block are down-sampled and 2*H luma samples left to the current block are down-sampled if W<=H;
(i) For example, W luma samples above the current block are down-sampled and 2*H luma samples left to the current block are down-sampled if W>H;
(j) For example, W luma samples above the current block are down-sampled and 2*H luma samples left to the current block are down-sampled if W>=H;
(k) For example, 2*W luma samples above the current block are down-sampled only if both the above neighboring blocks and right-above neighboring blocks are all available. Otherwise, W luma samples above the current block are down-sampled.
(l) For example, 2*H luma samples left to the current block are down-sampled only if both the left neighboring blocks and left-bottom neighboring blocks are all available. Otherwise, H luma samples above the current block are down-sampled.
(m) Suppose there are W' (W' is equal to W or 2*W) down-sampled luma sample above to the current block, H' (H' is equal to H or 2*H) down-sampled luma sample above to the current block. If W' is not equal to H', then the down-sampled luma sample set with more samples are decimated to match the number of samples in the down-sampled luma sample set with less samples, as defined in JEM or VTM-2.0.
(n) In one example, the number of down-sampled luma samples above and left to the current block is set to max (W, H).
(i) Alternatively, the number of down-sampled luma samples above and left to the current block is set to a value between min(W,H) and max (W, H).
(ii) Alternatively, the number of down-sampled luma samples above and left to the current block is set to a value between min(W,H), max (W, H))*SCALEDVALUE. For example, SCALEDVALUE is set to 2.

Example 10

In some embodiments, the decimation process when W is not equal to H is different from that in JEM or VTM-2.0.

(a) For example, if W>H, the H leftmost above neighboring samples and H left neighboring samples are involved in the training process.
(b) For example, if W>H, the H rightmost above neighboring samples and H left neighboring samples are involved in the training process.
(c) For example, if W>H, and W=H*n, then W above neighboring samples and H left neighboring samples are involved in the training process, and each left neighboring sample appears n times in the training process.
(d) For example, if W<H, the W topmost left neighboring samples and W above neighboring samples are involved in the training process.
(e) For example, if W<H, the W bottommost left neighboring samples and W above neighboring samples are involved in the training process.
(f) For example, if W<H, and H=W*n, then W above neighboring samples and H left neighboring samples are involved in the training process, and each above neighboring sample appears n times in the training process.

Example 11

Whether and/or how a CCLM mode (such as LM, LM-A, LM-T) is applied for a block may depend on the number of available neighboring samples and/or dimensions of the block.
  a. In one example, the block may refer to a chroma coding block.
  b. In one example, if one or multiple specific CCLM modes (such as LM, LM-A, LM-T) is not applicable for a block (e.g., according to the number of available neighboring samples and/or dimensions), the syntax element(s) (such as a flag or a mode representation) to indicate the specific CCLM mode(s) may not be signaled, and the specific CCLM mode(s) are inferred to be not applied.
  c. In one example, if one or multiple specific CCLM modes (such as LM, LM-A, LM-T) is not applicable for a block (e.g., according to the number of available neighboring samples and/or dimensions), the syntax element(s) (such as a flag or a mode representation) to indicate the CCLM mode(s) may be signaled and should indicate that the CCLM mode(s) are not applied in a conformance bit-stream.
  d. In one example, if one or multiple specific CCLM modes (such as LM, LM-A, LM-T) is not applicable for a block (e.g., according to the number of available neighboring samples and/or dimensions), the syntax element(s) (such as a flag or a mode representation) to indicate the CCLM mode(s) may be signaled but the signaling may be ignored by the decoder and the specific CCLM mode(s) are inferred to be not applied.
  e. In one example, the neighboring samples may refer to chroma neighboring samples.
    i. Alternatively, the neighboring samples may refer to corresponding luma neighboring samples, which may be down-sampled (e.g., according to the color format).
  f. In one example, if one or multiple specific CCLM modes (such as LM, LM-A, LM-T) is not applicable for a block (e.g., according to the number of available neighboring samples and/or dimensions) but a specific CCLM mode is signaled, the parameter derivation process for CCLM is done in a specific way.
    i. In one example, the parameter a is set equal to 0 and the parameter b is set equal to a fixed number, such as 1<<(BitDepth−1).
  g. In one example, LM mode and/or LM-A mode and/or LM-T mode are not applicable when the number of available neighboring samples is less than T, where T is an integer such as 4.
  h. In one example, LM mode is not applicable if the width of the block is equal to 2 and the left neighboring block is unavailable.
  i. In one example, LM mode is not applicable if the height of the block is equal to 2 and the above neighboring block is unavailable.
  j. In one example, LM-T mode is not applicable if the width of the block is equal to 2.
    i. Alternatively, LM-T mode is not applicable if the width of the block is equal to 2 and the right-above neighboring block is unavailable.
  k. In one example, LM-L mode is not applicable if the height of the block is equal to 2.
    i. Alternatively, LM-L mode is not applicable if the height of the block is equal to 2 and the left-below neighboring block is unavailable.
  l. In one example, LM-L mode is not applicable if LM mode is not applicable.
  m. In one example, LM-T mode is not applicable if LM mode is not applicable.
  n. In one example, the 'available neighboring samples' may be those from existing above and/or left samples according to the selected reference lines.
  o. In one example, the 'available neighboring samples' may be those from selected positions according to the selected reference lines and the rule of CCLM parameter derivation (e.g., pSelComp[ ]).
  p. The above methods may be also applicable to the local illumination compensation (LIC) process wherein according to the number of available neighboring samples, LIC may be disabled.
    i. Alternatively, according to the number of available neighboring samples, LIC may be enabled but with specific linear model parameters (e.g., a=1, b=0) regardless values of the neighboring samples.

Figure 14:
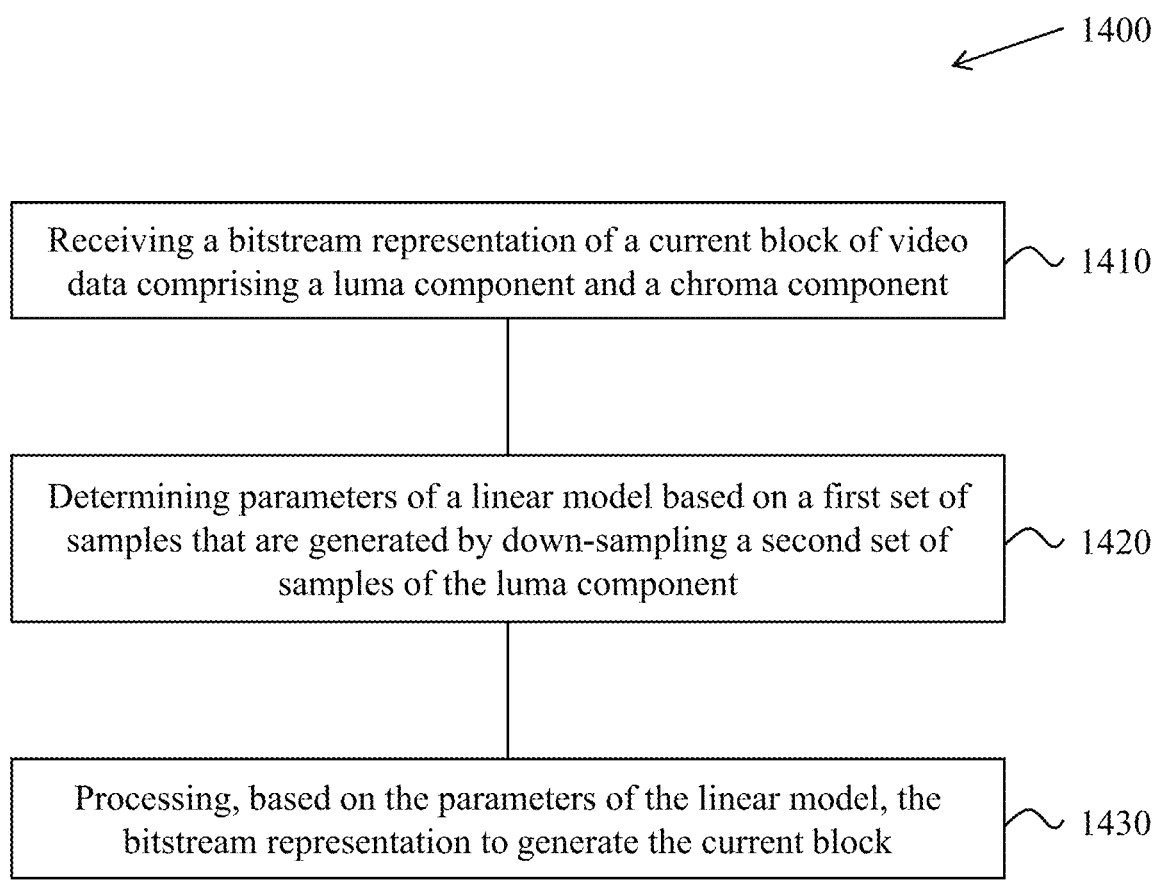
FIG. 14 shows a flowchart of yet another example method for cross-component prediction in accordance with the disclosed technology.

FIG. 14 shows a flowchart of an exemplary method for cross-component prediction. The method 1400 includes, at step 1410, receiving a bitstream representation of a current block of video data comprising a luma component and a chroma component.

In some embodiments, step 1410 includes receiving the bitstream representation from a memory location or buffer in a video encoder or decoder. In other embodiments, step 1410 includes receiving the bitstream representation over a wireless or wired channel at a video decoder. In yet other embodiments, step 1410 include receiving the bitstream representation from a different module, unit or processor, which may implement one or more methods or algorithms as described in, but not limited to, the embodiments in the present disclosure.

The method 1400 includes, at step 1420, determining parameters of a linear model based on a first set of samples that are generated by down-sampling a second set of samples of the luma component. In some embodiments, the second set of samples are positioned inside the current block, and determining the parameters is further based on a third set of samples that are generated by down-sampling a fourth set of samples that are positioned outside the current block.

In some embodiments, and in the context of Example 2 in Section 4, the down-sampling the second set of samples is based on a first down-sampling method, and the down-sampling the fourth set of samples is based on a second down-sampling method that is different from the first down-sampling method.

In some embodiments, the fourth set of samples comprises neighboring luma samples of the current block. In other embodiments, the fourth set of samples comprises non-adjacent luma samples relative to the current block. In some embodiments, the second and/or fourth set of samples is selected based on dimensions of the current block.

The method 1400 includes, at step 1430, processing, based on the parameters of the linear model, the bitstream representation to generate the current block.

In some embodiments, the method 1400 may further include the step of predicting a fifth set of samples of the chroma component based on the parameters of the linear model and the first set of samples, and the processing is further based on the fifth set of samples.

In some embodiments, and in the context of Example 4 in Section 4, the method 1400 may further include the steps of predicting a fifth set of samples of the chroma component based on the parameters of the linear model and the first set of samples, and refining the fifth set of samples to generate a sixth set of samples. In an example, the processing may be further based on the sixth set of samples.

In some embodiments, the refining step described above may include applying a linear function to a set of neighboring reconstructed chroma samples and the fifth set of samples to generate the sixth set of samples. In one example, the set of neighboring reconstructed chroma samples are based on samples to a left of the current block. In another example, the set of neighboring reconstructed chroma samples are further based on samples above the current block.

In some embodiments, and in the context of Example 2 in Section 4, the down-sampling the second set of samples is based on a down-sampling method that is selected based on a position of the first set of samples in the current block, and the first set of samples if part of a 2×2 block of luma samples (e.g., as shown in FIG. 4). In one example, the first set of samples comprises a lower left sample of the block of luma samples. In another example, the first set of samples comprises an upper right sample or a lower right sample of the block of luma samples.

In some embodiments, and in the context of Example 5 in Section 4, a height of the current block is greater than a first threshold, and a width of the current block is greater than a second threshold. In some embodiments, a sum of a height of the current block and a width of the current block is greater than a first threshold. In some embodiments, a multiplication of a height of the current block and a width of the current block is greater than a first threshold. In some embodiments, a height of the current block is greater than a first threshold or a width of the current block is greater than a second threshold. In these embodiments, the first threshold and/or the second threshold may be signaled in a Sequence Parameter Set (SPS), a Picture Parameter Set (PPS), a slice header, a picture header, a coding tree unit (CTU), a coding unit (CU), or a group of CTUs.

In some embodiments, and in the context of Example 6 in Section 4, processing the bitstream representation is further based on a position of the current block in a current CTU. In an example, the position of the current block is at a top boundary of the current CTU. In another example, the position of the current block is at a left boundary of the current CTU.

Some additional techniques may be described using the following clause-based description.

1. A method of video coding, comprising: using, during a conversion between a current block of video and a bitstream representation of the current block, parameters of a linear model based on a first set of samples that are generated by down-sampling a second set of samples of the luma component; and performing, based on the parameters of the linear model, the conversion between the bitstream representation and the current block.

2. The method of clause 1, wherein a number of down-sampled luma samples in the second set from above or left of the current block are dependent on a dimension of the current block.

3. The method of clause 2, wherein the current block is a chroma block having width W and height H samples, where W and H are integers, and where W luma samples above the current block are down-sampled and H luma samples left to the current block are down-sampled for W equal to H.

4. The method of clause 1, wherein two different down-sampling schemes are used for cases when the current block is square and the current block is rectangular.

5. The method of clause 4, wherein the current block has a width W and a height H samples, where W and H are integers, and wherein W>H, and wherein H leftmost above neighboring samples and H left neighboring samples are used for a training process.

6. The method of clause 4, wherein the current block has a width W and a height H samples, where W and H are integers, and wherein W>H, and wherein H rightmost above neighboring samples and H left neighboring samples are involved in the training process.

In the above clauses the conversion may include video decoding or decompression in which pixel values of the current block are generated from its bitstream representation. In the above clauses, the conversion may include video encoding or compression operation in which the bitstream representation is generated from the current block.

In some embodiments, a method of video processing includes performing a conversion between a current video block and a bitstream representation of the current video block using a cross-component linear model in which multiple lines of luma samples, at least one being non-adjacent to the current video block are used for the conversion using the cross-component linear model.

Some Examples of Technical Solutions and Embodiments

Some solutions based on the disclosed techniques may be as follows.

1. A method for video coding, comprising: receiving a bitstream representation of a current block of video data comprising a luma component and a chroma component; determining parameters of a linear model based on a first set of samples that are generated by down-sampling a second set of samples of the luma component; and processing, based on the parameters of the linear model, the bitstream representation to generate the current block.

2. The method of solution 1, wherein the second set of samples are positioned inside the current block, and wherein the determining the parameters is further based on a third set of samples that are generated by down-sampling a fourth set of samples that are positioned outside the current block.

3. The method of solution 2, wherein the down-sampling the second set of samples is based on a first down-sampling method, and wherein the down-sampling the fourth set of samples is based on a second down-sampling method.

4. The method of solution 2 or 3, wherein the fourth set of samples comprises neighboring luma samples of the current block.

5. The method of solution 2 or 3, wherein the fourth set of samples comprises non-adjacent luma samples relative to the current block.

6. The method of solution 2, wherein the fourth set of samples is selected based on dimensions of the current block.

7. The method of solution 1, wherein the down-sampling is based on a filtering operation.

8. The method of solution 1, wherein the second set of samples is selected based on dimensions of the current block.

9. The method of any of solutions 1 to 8, further comprising: predicting a fifth set of samples of the chroma component based on the parameters of the linear model and the first set of samples. The processing is further based on the fifth set of samples.

10. The method of any of solutions 1 to 8, further comprising: predicting a fifth set of samples of the chroma component based on the parameters of the linear model and the first set of samples; and refining the fifth set of samples to generate a sixth set of samples, wherein the processing is further based on the sixth set of samples.

11. The method of solution 10, wherein refining the fifth set of samples comprises: applying a linear function to a set of neighboring reconstructed chroma samples and the fifth set of samples to generate the sixth set of samples.

12. The method of solution 11, wherein the set of neighboring reconstructed chroma samples are based on samples to a left of the current block.

13. The method of solution 12, wherein the set of neighboring reconstructed chroma samples are further based on samples above the current block.

14. The method of solution 1, wherein the down-sampling the second set of samples is based on a down-sampling method that is selected based on a position of the first set of samples in the current block, and wherein a 2×2 block of luma samples comprises the first set of samples.

15. The method of solution 14, wherein the first set of samples comprises a lower left sample of the block of luma samples.

16. The method of solution 14, wherein the first set of samples comprises an upper right sample or a lower right sample of the block of luma samples.

17. The method of solution 1, wherein the first set of samples comprises W samples, and wherein W is a width of the chroma component.

18. The method of solution 1, wherein the first set of samples comprises H samples, wherein the second set of samples are left adjacent luma samples relative to the current block, and wherein H is a height of the chroma component.

19. The method of solution 1, wherein a height of the current block is greater than a first threshold, and wherein a width of the current block is greater than a second threshold.

20. The method of solution 1 wherein a sum of a height of the current block and a width of the current block is greater than a first threshold.

21. The method of solution 1 wherein a multiplication of a height of the current block and a width of the current block is greater than a first threshold.

22. The method of solution 1, wherein a height of the current block is greater than a first threshold or a width of the current block is greater than a second threshold.

23. The method of any of solutions 19 to 22, wherein the first threshold is signaled in a Sequence Parameter Set (SPS), a Picture Parameter Set (PPS), a slice header, a picture header, a coding tree unit (CTU), a coding unit (CU), or a group of CTUs.

24. The method of solution 1, wherein the processing the bitstream representation is further based on a position of the current block in a current coding tree unit (CTU).

25. The method of solution 24, wherein the position of the current block is at a top boundary of the current CTU.

26. The method of solution 24, wherein the position of the current block is at a left boundary of the current CTU.

27. A method of video coding, comprising: using, during a conversion between a current block of video and a bitstream representation of the current block, parameters of a linear model based on a first set of samples that are generated by down-sampling a second set of samples of the luma component; and performing, based on the parameters of the linear model, the conversion between the bitstream representation and the current block.

28. The method of solution 27, wherein a number of down-sampled luma samples in the second set from above or left of the current block are dependent on a dimension of the current block.

29. The method of solution 28, wherein the current block is a chroma block having width W and height H samples, where W and H are integers, and where W luma samples above the current block are down-sampled and H luma samples left to the current block are down-sampled for W equal to H.

30. The method of solution 27, wherein two different downsampling schemes are used for cases when the current block is square and the current block is rectangular.

31. The method of solution 30, wherein the current block has a width W and a height H samples, where W and H are integers, and wherein W>H, and wherein H leftmost above neighboring samples and H left neighboring samples are used for a training process.

32. The method of solution 30, wherein the current block has a width W and a height H samples, where W and H are integers, and wherein W>H, and wherein H rightmost above neighboring samples and H left neighboring samples are involved in the training process.

33. A method of video processing, comprising: performing a conversion between a current video block and a bitstream representation of the current video block using a cross-component linear model in which multiple lines of luma samples, at least one being non-adjacent to the current video block are used for the conversion using the cross-component linear model.

34. The method of solution 33, wherein the conversion uses a cross component linear model mode comprising a multi-directional linear model.

35. The method of any of solutions 33-34, wherein the at least one of the multiple lines excludes lines satisfying an exclusion criterion or includes lines satisfying an inclusion criterion.

36. The method of solution 35, wherein the exclusion criterion comprises excluding luma samples not used for directional intra prediction and multiple reference line intra prediction.

37. The method of solution 35, wherein the inclusion criterion includes two lines above the current video block.

38. An apparatus in a video system comprising a processor and a non-transitory memory with instructions thereon, wherein the instructions upon execution by the processor, cause the processor to implement the method in any one of solutions 1 to 37.

39. A computer program product stored on a non-transitory computer readable media, the computer program product including program code for carrying out the method in any one of solutions 1 to 37.

4. Additional Embodiments for Cross-Component Prediction

Embodiment 1

In some embodiments, luma samples inside the current block are down-sampled in the same way as in JEM.

In some embodiments, luma samples outside the current block and above to the current block are down-sampled to position C in FIG. 4 with a filter. Suppose the luma samples above adjacent to the current block are denoted as a[i], then d[i]=(a[2i−1]+2*a[2i]+a[2i+1]+2)>>2, where d[i] represents the down-sampled luma samples. If the sample a[2i−1] is unavailable, d[i]=(3*a[2i]+a[2i+1]+2)>>2.

In some embodiments, luma samples outside the current block and left to the current block are down-sampled to the half position between B and D, as shown in FIG. 4. Suppose the luma samples left adjacent to the current block are denoted as a[j], then d[j]=(a[2j]+a[2j+1]+1)>>1, where d[j] represents the down-sampled luma samples.

In some embodiments, W luma down-sampled samples from the above adjacent luma samples and H luma down-sampled samples from the left adjacent luma samples are generated, where W and H are the width and height of the current chroma block as shown in FIG. 13A.

In some embodiments, 2 W luma down-sampled samples from the above adjacent luma samples and 2H luma down-sampled samples from the left adjacent luma samples are generated, where W and H are the width and height of the current chroma block as shown in FIG. 13B.

To constrain the neighboring luma samples required by the training process in a single line, down-sampling filters with less taps are applied as shown in FIG. 3A:

For neighboring luma samples above:

$$Rec_L[x,y]=(2\times Rec_L[2x,2y+1]+Rec_L[2x-1,2y+1]+Rec_L[2x+1,2y+1]+2)>>2. \quad (2)$$

For neighboring luma samples left:

$$Rec'_L[x,y]=(Rec_L[2x+1,2y]+Rec_L[2x+1,2y+1]+1)>>1. \quad (3)$$

The luma samples inside the block are still down-sampled with the six-tap filter.

Figure 17A:
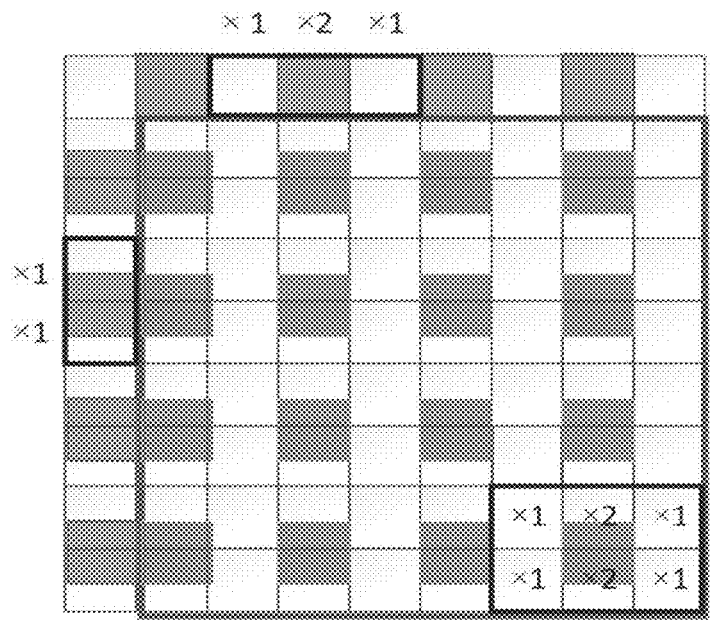
FIGS. 17A and 17B show examples of linear model (LM) prediction with single-line neighboring luma samples.
Figure 17B:
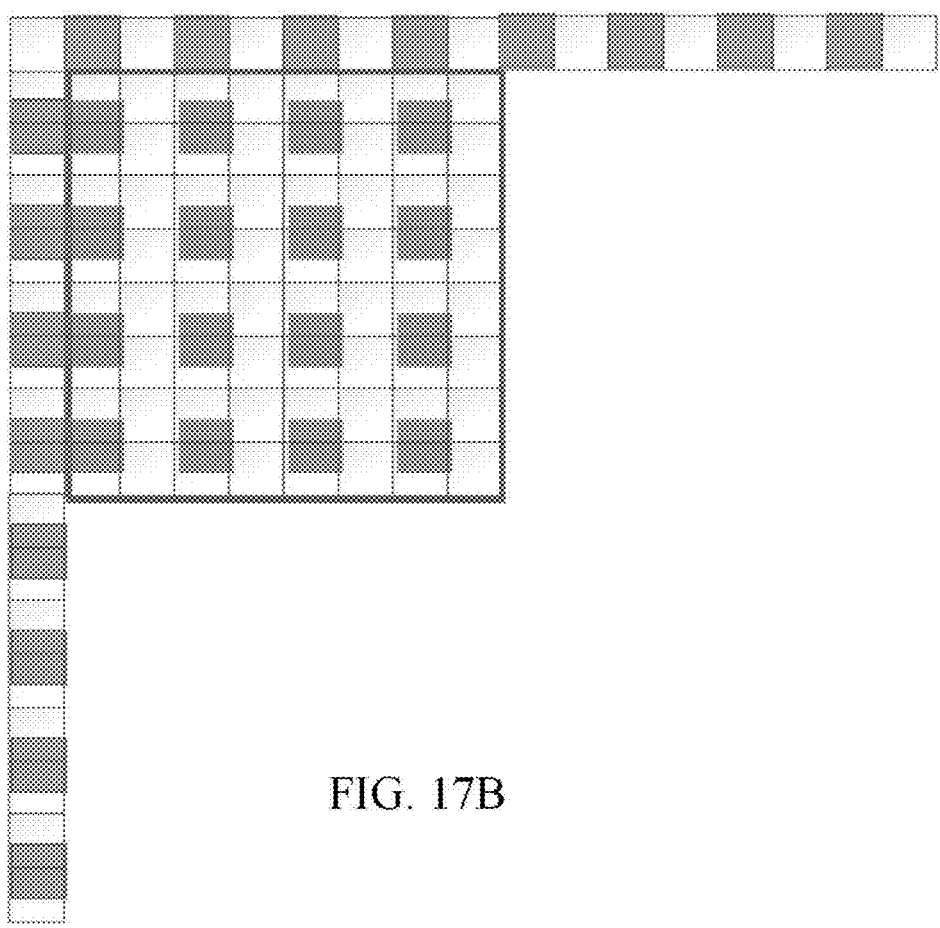

Two solutions are provided in this contribution with usage of different sets of neighboring luma samples. Suppose the width and height of one block is denoted as W and H, respectively. In solution #1, W above neighboring samples and H left neighboring samples are involved in the training process in FIG. 17A. In solution #2, 2 W above neighboring samples and 2H left neighboring samples are involved as shown in FIG. 17B. It should be noted that the extended neighboring samples in solution #2 have already been used by wide angle intra-prediction.

Figure 18A:
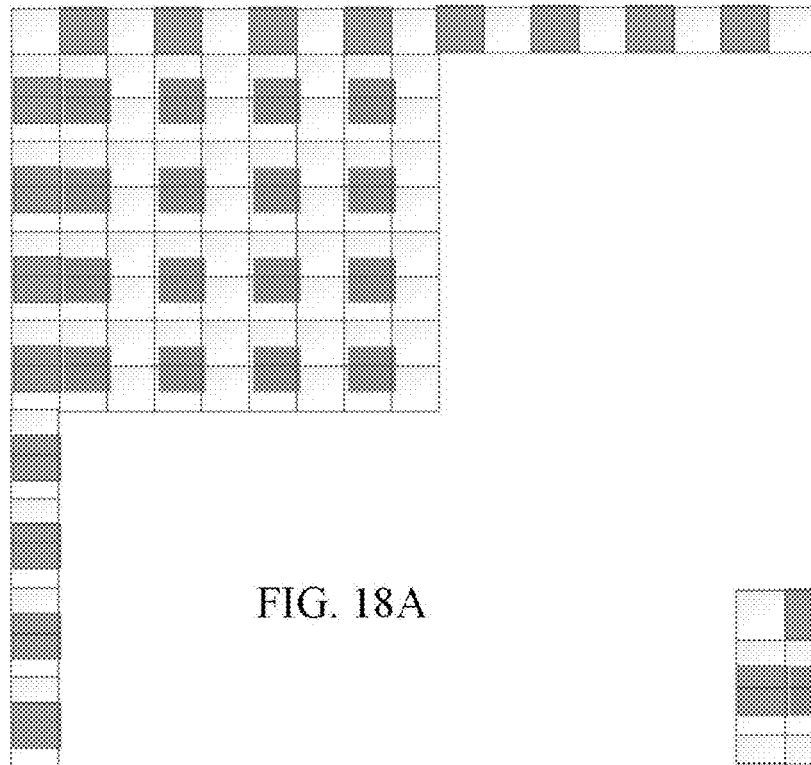
FIGS. 18A-18C show examples of LM prediction with neighboring luma samples.
Figure 18B:
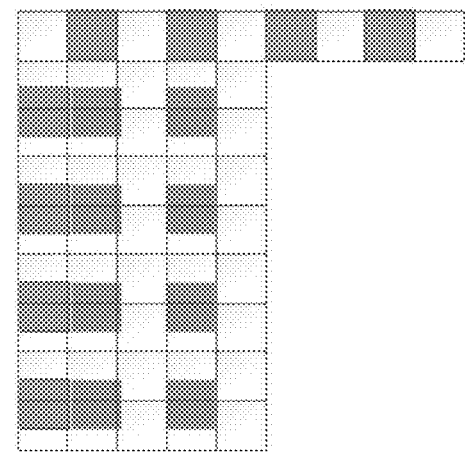
Figure 18C:
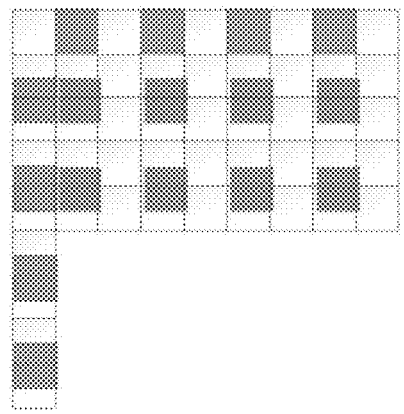

In addition, solution #3 as shown in FIG. 18A-18C is provided based on solution #2. 2 W above neighboring samples are involved if W<=H; Otherwise, W above neighboring samples are involved. And 2H left neighboring samples are involved if HC=W; Otherwise, H left neighboring samples are involved.

As a further investigation, solution #1A, #2A and #3A are provided, which apply the same methods of solution #1, solution #2 and solution #3, respectively, but only on the above neighboring samples. In solution #1A, #2A and #3A, the left neighboring samples are down-sampled as in VTM-2.0, i.e., H left neighboring luma samples are down-sampled by the 6-tap filter.

Embodiment #2

An embodiment on CCLM sample number constrains in Working Draft (example changes are marked—deletions are includes into double parentheses {{ }}.

Specification of INTRA_LT_CCLM, INTRA_L_CCLM and INTRA_T_CCLM Intra Prediction Mode Inputs to this process are:

. . .

Output of this process are predicted samples predSamples [x][y], with x=0 . . . nTbW−1, y=0 . . . nTbH−1.

The current luma location (xTbY, yTbY) is derived as follows:

$$(xTbY,yTbY)=(xTbC<<1,yTbC<<1) \quad (8\text{-}156)$$

The variables availL, availT and availTL are derived as follows:

. . .

The number of available top-right neighboring chroma samples numTopRight is derived as follows:

The variable numTopRight is set equal to 0 and availTR is set equal to TRUE.

When predModeIntra is equal to INTRA_T_CCLM, the following applies for x=nTbW . . . 2*nTbW−1 until availTR is equal to FALSE or x is equal to 2*nTbW−1:

The number of available left-below neighboring chroma samples numLeftBelow is derived as follows:

. . .

The number of available neighboring chroma samples on the top and top-right numTopSamp and the number of available neighboring chroma samples on the left and left-below nLeftSamp are derived as follows:

If predModeIntra is equal to INTRA_LT_CCLM, the following applies:

$$numSampT=availT?nTbW: 0 \quad (8\text{-}157)$$

$$numSampL=availL?nTbH: 0 \quad (8\text{-}158)$$

Otherwise, the following applies:

$$numSampT=(availT\ \&\&\ predModeIntra==INTRA\_T\_CCLM)?(nTbW+Min(numTopRight,nTbH)): 0 \quad (8\text{-}159)$$

$$numSampL=(availL\ \&\&\ predModeIntra==INTRA\_L\_CCLM)?(nTbH+Min(numLeftBelow,nTbW)): 0 \quad (8\text{-}160)$$

The variable bCTUboundary is derived as follows:

$$bCTUboundary=(yTbC\ \&(1<<(Ctb\ Log\ 2SizeY-1)-1)==0)?TRUE: FA LSE. \quad (8\text{-}161)$$

The variable cntN and array pickPosN with N being replaced by L and T, are derived as follows:

The variable numIs4N is set equal to ((availT && availL && predModeIntra==INTRA_LT_CCLM)? 0:1).

The variable startPosN is set equal to numSampN>>(2+numIs4N).

The variable pickStepN is set equal to Max(1, numSampN>>(1+numIs4N)).

If availN is equal to TRUE and predModeIntra is equal to INTRA_LT_CCLM or INTRA_N_CCLM, the following assignments are made:
cntN is set equal to Min(numSampN, (1+numIs4N)<<1)
pickPosN[pos] is set equal to (startPosN+pos*pickStepN), with pos=0 . . . cntN−1.
Otherwise, cntN is set equal to 0.

The prediction samples predSamples[x][y] with x=0 . . . nTbW−1, y=0 . . . nTbH−1 are derived as follows:
If both numSampL and numSampT are equal to 0, the following applies:

$$predSamples[x][y]=1<<(BitDepth_C-1) \qquad (8\text{-}162)$$

Otherwise, the following ordered steps apply:
1. The collocated luma samples pY[x][y] with x=0 . . . nTbW*2−1, y=0 . . . nTbH*2−1 are set equal to the reconstructed luma samples prior to the deblocking filter process at the locations (xTbY+x, yTbY+y).
2. The neighboring luma samples pY[x][y] are derived as follows:
   When numSampL is greater than 0, the neighboring left luma samples pY[x][y] with x=−1 . . . −3, y=0 . . . 2*numSampL−1, are set equal to the reconstructed luma samples prior to the deblocking filter process at the locations (xTbY+x, yTbY+y).
   When numSampT is greater than 0, the neighboring top luma samples pY[x][y] with x=0 . . . 2*numSampT−1, y=−1, −2, are set equal to the reconstructed luma samples prior to the deblocking filter process at the locations (xTbY+x, yTbY+y).
   When availTL is equal to TRUE, the neighboring top-left luma samples pY[x][y] with x=−1, y=−1, −2, are set equal to the reconstructed luma samples prior to the deblocking filter process at the locations (xTbY+x, yTbY+y).
3. The down-sampled collocated luma samples pDsY[x][y] with x=0 . . . nTbW−1, y=0 . . . nTbH−1 are derived as follows:
   . . .
4. When numSampL is greater than 0, the selected neighboring left chroma samples pSelC[idx] are set equal to p[−1][pickPosL[idx]] with idx=0 . . . cntL−1, and the selected down-sampled neighboring left luma samples pSelDsY[idx] with idx=0 . . . cntL−1 are derived as follows:
   The variable y is set equal to pickPosL[idx].
   If sps_cclm_colocated_chroma_flag is equal to 1, the following applies:
   . . .
   Otherwise, the following applies:

$$pSelDsY[idx]=(pY[-1][2*y]+pY[-1][2*y+1]+2*pY[-2][2*y]+2*pY[-2][2*y+1]+pY[-3][2*y]+pY[-3][2*y+1]+4)>>3 \qquad (8\text{-}178)$$

5. When numSampT is greater than 0, the selected neighboring top chroma samples pSelC[idx] are set equal to p[pickPosT[idx−cntL]][−1] with idx=cntL . . . cntL+cntT−1, and the down-sampled neighboring top luma samples pSelDsY[idx] with idx=0 . . . cntL+cntT−1 are specified as follows:
   The variable x is set equal to pickPosT[idx−cntL].
   If sps_cclm_colocated_chroma_flag is equal to 1, the following applies:
6. When cntT+cntL is not {{equal to 0}} smaller than Threshold1, the variables minY, maxY, minC and maxC are derived as follows:

{{When cntT+cntL is equal to 2, set pSelComp[3] equal to pSelComp[0], pSelComp[2] equal to pSelComp[1], pSelComp[0] equal to pSelComp[1], and pSelComp[1] equal to pSelComp[3], with Comp being replaced by DsY and C . . . }}
The arrays minGrpIdx and maxGrpIdx are set as follows:
minGrpIdx[0]=0.
minGrpIdx[1]=2.
maxGrpIdx[0]=1.
maxGrpIdx[1]=3.
When pSelDsY[minGrpIdx[0]] is greater than pSelDsY[minGrpIdx[1]], minGrpIdx[0] and minGrpIdx[1] are swapped as (minGrpIdx[0], minGrpIdx[1])=Swap(minGrpIdx[0], minGrpIdx[1]).
When pSelDsY[maxGrpIdx[0]] is greater than pSelDsY[maxGrpIdx[1]], maxGrpIdx[0] and maxGrpIdx[1] are swapped as (maxGrpIdx[0], maxGrpIdx[1])=Swap(maxGrpIdx[0], maxGrpIdx[1]).
When pSelDsY[minGrpIdx[0]] is greater than pSelDsY[maxGrpIdx[1]], arrays minGrpIdx and maxGrpIdx are swapped as (minGrpIdx, maxGrpIdx)=Swap(minGrpIdx, maxGrpIdx).
When pSelDsY[minGrpIdx[1]] is greater than pSelDsY[maxGrpIdx[0]], minGrpIdx[1] and maxGrpIdx[0] are swapped as (minGrpIdx[1], maxGrpIdx[0])=Swap(minGrpIdx[1], maxGrpIdx[0]).
maxY=(pSelDsY[maxGrpIdx[0]]+pSelDsY[maxGrpIdx[1]]+1)>>1.
maxC=(pSelC[maxGrpIdx[0]]+pSelC[maxGrpIdx[1]]+1)>>1.
minY=(pSelDsY[minGrpIdx[0]]+pSelDsY[minGrpIdx[1]]+1)>>1.
minC=(pSelC[minGrpIdx[0]]+pSelC[minGrpIdx[1]]+1)>>1.
7. The variables a, b, and k are derived as follows:
If {{numSampL is equal to 0, and numSampT is equal to 0}} cntT+cntL is smaller than Threshold1, the following applies:

$$k=0 \qquad (8\text{-}208)$$

$$a=0 \qquad (8\text{-}209)$$

$$b=1<<(BitDepth_C-1) \qquad (8\text{-}210)$$

Otherwise, the following applies:
8. The prediction samples predSamples[x][y] with x=0 . . . nTbW−1, y=0 . . . nTbH−1 are derived as follows:

$$predSamples[x][y]=Clip1C(((pDsY[x][y]*a)>>k)+b) \qquad (8\text{-}225)$$

Figure 21:
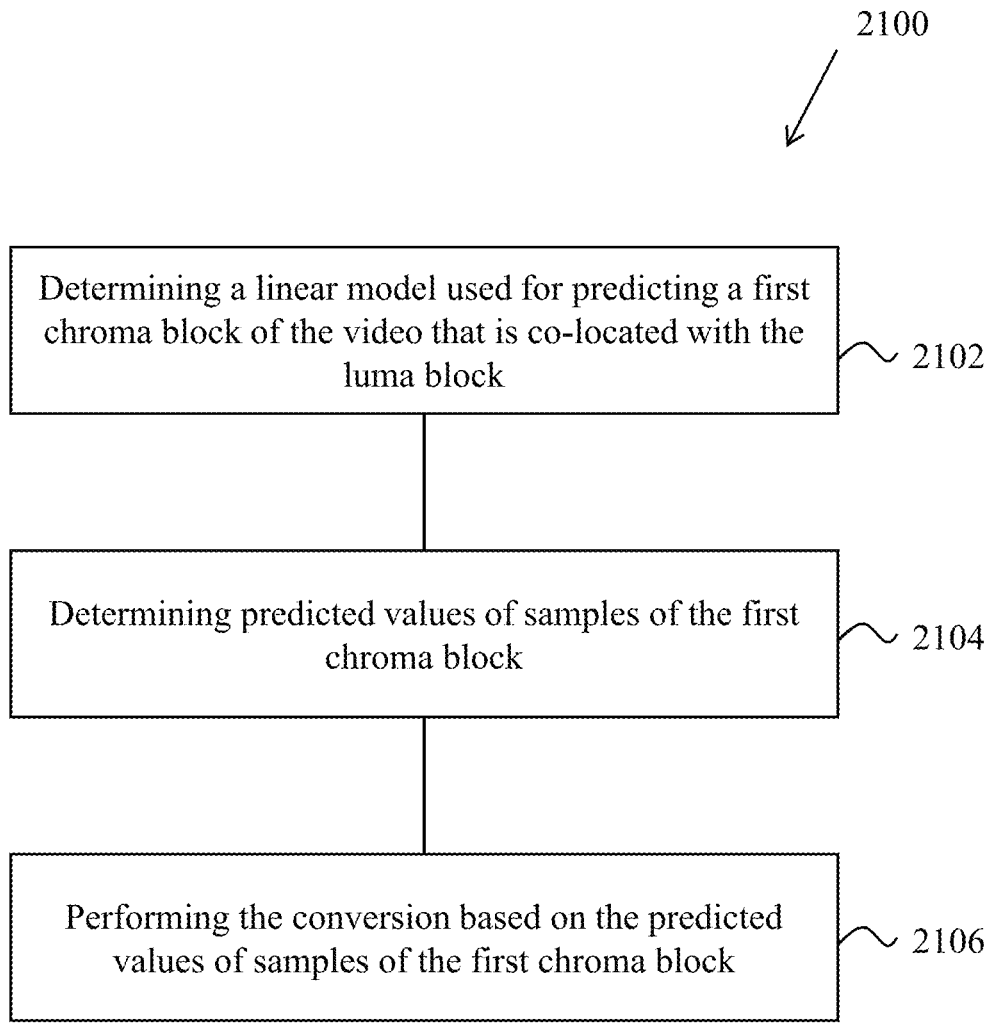
FIG. 21 is a flowchart for an example method of video processing.

In one example, Threshold1 is set to 4.
In some embodiments, the following technical solutions may be implemented:
1. A method of video processing (e.g., method 2100 depicted in FIG. 21), comprising: determining (2102), for a conversion between a video and a coded representation of the video, at least using down-sampled luma samples outside a luma block, a linear model used for predicting a first chroma block of the video that is co-located with the luma block, determining (2104), using down-sampled luma samples inside the luma block and the linear model, predicted values of samples of the first chroma block, and performing (2106) the conversion based on the predicted values of samples of the first chroma block; wherein the down-sampled luma samples outside the luma block are obtained by applying an outside filter to luma samples outside the luma block; and wherein the down-sampled luma samples inside the luma block are obtained by applying an inside filter to luma samples inside the luma block.

2. The method of solution 1, wherein the down-sampled luma samples inside the luma block are at positions corresponding to chroma sample positions of the first chroma block.

3. The method of any of solutions 1-2, wherein the down-sampled luma samples inside the luma block and the down-sampled luma samples outside the luma block are further used for a second prediction of the first chroma block.

4. The method of any of solutions 1-3, wherein the inside filter corresponds to a legacy filter.

5. The method of any of solutions 1-3, wherein the outside filter is different from the inside filter.

6. The method of any of solutions 1 to 5, wherein the luma samples outside the luma block include neighboring luma samples or non-adjacent luma samples.

7. The method of solution 6, wherein the down-sampled luma samples outside the luma block are also used to determine the predicted values of samples of the first chroma block.

8. The method of any of solutions 1 to 7 wherein filter taps or filter coefficients of the outside filter are dependent on whether the outside filter is applied to left or above the luma block.

9. The method of any of solutions 1-8, wherein a length of the inside filter or a length of the outside filter are dependent on a shape or a size of the first chroma block or the luma block.

10. The method of any of solutions 1-9, wherein positions of the luma samples outside the luma block or inside the luma block are a function of a size or a shape of the first chroma block or the luma block.

11. The method of any of solution 1-10, wherein the determining samples of the first chroma block comprises predicting samples of the first chroma block using a refined prediction block that is a refinement of an intermediate prediction block generated by applying the linear model to the down-sampled luma samples inside the luma block.

12. The method of solution 11, wherein the refinement of the intermediate prediction block uses reconstructed chroma samples that are neighboring to the first chroma block.

13. The method of solution 11, wherein the refinement of the intermediate prediction block uses reconstructed chroma samples that are non-adjacent to the first chroma block.

14. The method of any of solutions 11-13, wherein the refined prediction block is determined as a linear function of the intermediate prediction block and neighboring or non-adjacent reconstructed chroma samples.

15. The method of any of solutions 11-14, wherein the refinement includes copying samples of the intermediate prediction block as the refined prediction block in certain positions of the first chroma block.

16. The method of solution 11, wherein the refined prediction block is generated from the intermediate prediction block and another chroma prediction block that is generated from previously reconstructed chroma blocks.

17. The method of solution 16, wherein the another chroma prediction block is an intra predicted chroma block.

18. The method of any of solutions 16-17, wherein the samples of the first chroma block are determined as a linear weighting of the intermediate prediction block and the another chroma prediction block.

19. The method of solution 18, wherein, at some pixel positions of the first chroma block, the another chroma prediction block is given 0% weight and the intermediate prediction block is given 100% weight.

20. The method of solutions 17-19, wherein the intra predicted chroma block uses an intra prediction mode of the luma block.

21. The method of solution 21, wherein the some pixel positions includes top k rows of the first chroma block or left m columns of the first chroma block, where k and m are integers.

22. The method of any of solutions 1 to 21, wherein the conversion further includes performing boundary filtering to the luma block and/or the first chroma block.

23. The method of solution 22, wherein the boundary filtering is applied only in case that above or left neighboring samples or both above and left samples are available.

24. The method of solution 12, wherein the reconstructed chroma samples that are neighboring to the first chroma block comprises above, left or above and left chroma samples.

25. The method of solution 24, wherein the above chroma samples are represented as $a[-1][j]$ and wherein a sample in ith row and jth column of the intermediate prediction block is $a[i][j]$, then a sample at (i,j)th position in the first chroma block is computed as $a'[i][j]=(w1*a[i][j]+w2*a[-1][j]+2N-1)>>N$, where $w1+w2=2N$ where N is an integer.

26. The method of solution 22, wherein the boundary filtering is applied only for rows $i<=K$, where K is an integer equal to zero or 1.

27. The method of solutions 25-26, wherein $K=0$, $w1=3$ and $w2=1$.

28. The method of solution 25, wherein w1 and w2 are a function of row index i.

29. The method of solution 28, wherein $K=1$, $w1=w2=1$ for $i=0$ and $K=1$, $w1=3$, $w2=1$ for $i=1$.

30. The method of solution 40, wherein the left chroma samples are represented as $a[i][-1]$ and wherein a sample in ith row and jth column of the intermediate prediction block is $a[i][j]$, then a sample at (i,j)th position in the first chroma block is computed as $a'[i][j]=(w1*a[i][j]+w2*a[i][-1]+2N-1)>>N$, where $w1+w2=2N$ where N is an integer.

31. The method of solution 22, wherein the boundary filtering is applied only for columns $j<=K$, where K is an integer equal to zero or 1.

32. The method of solutions 25-26, wherein $K=0$, $w1=3$ and $w2=1$.

33. The method of solution 25, wherein w1 and w2 are a function of column index j.

34. The method of solution 28, wherein $K=1$, $w1=w2=1$ for $j=0$ and $K=1$, $w1=3$, $w2=1$ for $j=1$.

35. The method of solution 24, wherein the left chroma samples are represented as $a[i][-1]$, above samples are represented as $a[-1][j]$ and wherein a sample in ith row and jth column of the intermediate prediction block is $a[i][j]$, then a sample at (i,j)th position in the first chroma block is computed as $a'[i][j]=(w1*a[i][j]+w2*a[i][-1]+w3*a[-1][j]+2N-1)>>N$, where $w1+w2+w3=2N$ where N is an integer.

36. The method of solution 22, wherein the boundary filtering is applied only for columns $i<=K$, columns $j<=P$, where K and P an integer equal to zero or 1.

37. The method of solutions 25-27, wherein $K=0$, $w1=3$ and $w2=1$.

38. The method of solution 25, wherein w1 and w2 are a function of column index j.

39. The method of solution 28, wherein boundary filtering is applied to $a[0][0]$ with $w1=2$ and $w2=w3=1$.

Figure 22:
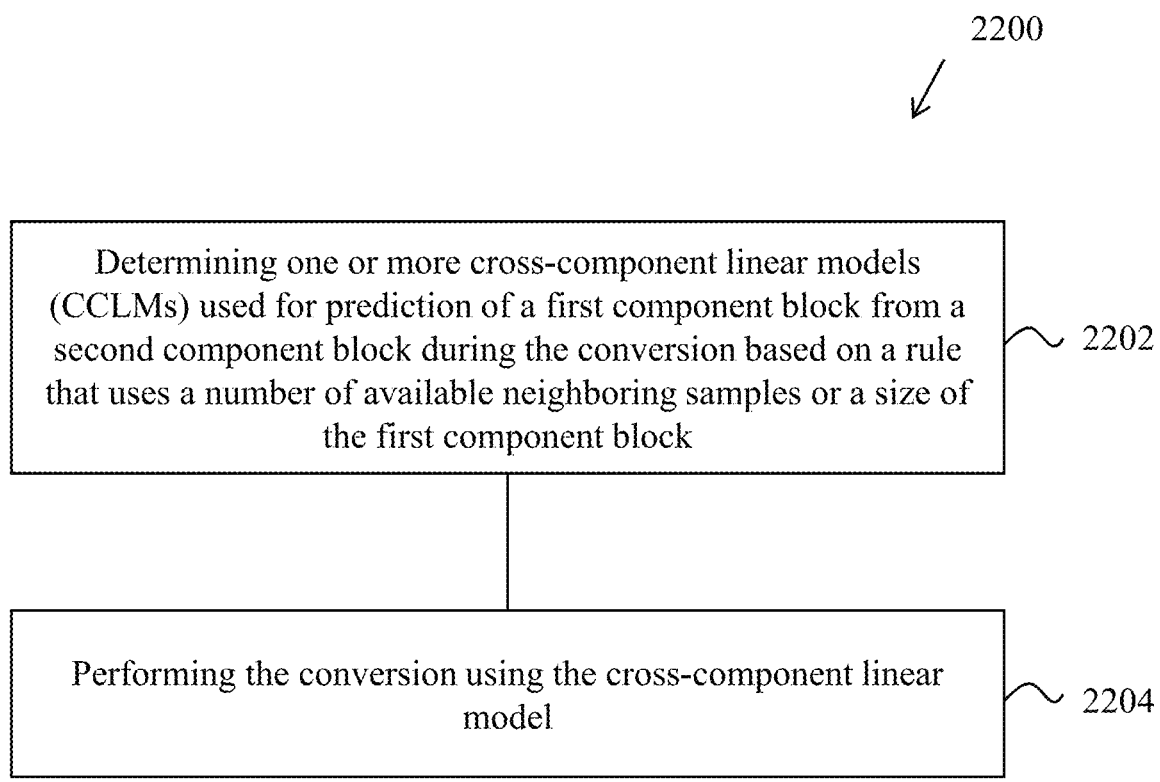
FIG. 22 is a flowchart for an example method of video processing.

40. A method of video processing (e.g., method 2200 depicted in FIG. 22), comprising: determining (2202), for a conversion between a video and a coded representation of the video, one or more cross-component linear models (CCLMs) used for prediction of a first component block from a second component block during the conversion based on a rule that uses a number of available neighboring samples or a size of the first component block; and performing (2204) the conversion using the cross-component linear model, wherein the cross-component linear model is one of: a CCLM derived from above and/or right-above neighboring values of the first component block (CCLM-A); a CCLM derived from left and/or left-below neighboring values of the first component block (CCLM-T); or a CCLM derived from only left and top neighboring values of the first component block (CCLM-TL).

41. The method of solution 40, wherein the first component block corresponds to a chroma block.

42. The method of any of solutions 40-41, wherein the second component block corresponds to a luma block.

43. The method of any of solutions 40-42, wherein, in case that the rule disables use of a CCLM, then the coded representation omits signaling the CCLM using a syntax element.

44. The method of any of solutions 40-42, wherein, in case that the rule disables use of a CCLM, then the coded representation signals via a syntax element in the coded representation that the CCLM is disabled.

45. The method of any of solutions 40-42, wherein, in case that the rule disables use of a CCLM, and the coded representation signals includes a syntax element for the CCLM, wherein a decoder is expected to ignore the syntax element.

46. The method of any of solutions 40-45, wherein the available neighboring samples comprising chroma neighboring samples.

47. The method of any of solutions 40-46, wherein the available neighboring samples comprising luma neighboring samples.

48. The method of any of solutions 40-46, wherein the available neighboring samples comprising down-sampled luma neighboring samples.

49. The method of any of solutions 40-48, wherein the coded representation signals a specific CCLM, wherein the specific CCLM uses a linear model in which a slope alpha is zero and an intercept beta is a fixed number.

50. The method of solution 49, wherein the fixed number is a function of bit depth.

51. The method of any of solutions 40-50, wherein the rule disables use of CCLM or CCLM-A or CCLM-T due to a number of available neighboring samples is less than a threshold.

52. The method of any of solutions 40-50, wherein the rule disables use of CCLM due to a width of the chroma block being two or unavailability of left neighboring samples.

53. The method of any of solutions 40-50, wherein the rule disables use of CCLM due to a width of the chroma block being two or unavailability of above neighboring samples.

54. The method of any of solutions 40-50, wherein the rule disables use of CCLM-T due to a width of the chroma block being two.

55. The method of any of solutions 40-50, wherein the rule disables use of CCLM-T due to a width of the chroma block being two and a right-above neighboring block is unavailable.

56. The method of any of solutions 40-50, wherein the rule disables use of CCLM-L due to a height of the chroma block being two.

57. The method of any of solutions 40-50, wherein the rule disables use of CCLM-L due to a height of the chroma block being two and a right-above neighboring block is unavailable.

58. The method of any of solutions 40-57, wherein the rule specifies to disable CCLM-L due to CCLM not being available.

59. The method of any of solutions 40-57, wherein the rule specifies to disable CCLM-T due to CCLM not being available.

60. The method of any of solutions 40-59, wherein the available neighboring samples are left or above samples with respect one or more reference lines selected for the chroma block.

61. The method of any of solutions 40-59, wherein the available neighboring samples are left or above samples with respect to one or more reference lines selected for the chroma block and a rule of parameter derivation for the CCLM.

62. The method of any of solutions 40-61, wherein the conversion further includes decoding to selectively disabling or constraining local illumination compensation during the conversion of the first component block based on the number of available neighboring samples.

63. The method of any of solutions 40-61, wherein the selectively constraining the local illumination compensation includes forcing specific linear parameter values for use with the CCLM.

64. The method of any of solutions 1-63, wherein the conversion comprises generating the video from the coded representation.

65. The method of any of solutions 1-63, wherein the conversion comprises generating the coded representation from the video.

66. A video processing apparatus comprising a processor configured to implement a method recited in any one or more of solutions 1-65.

67. A computer-readable program medium having code stored thereupon, the code, when executed by a processor, causing the processor to implement a method recited in any one or more of solutions 1-65.

In addition to the above solutions, in some embodiments, the following solutions may be implemented.

Figure 19:
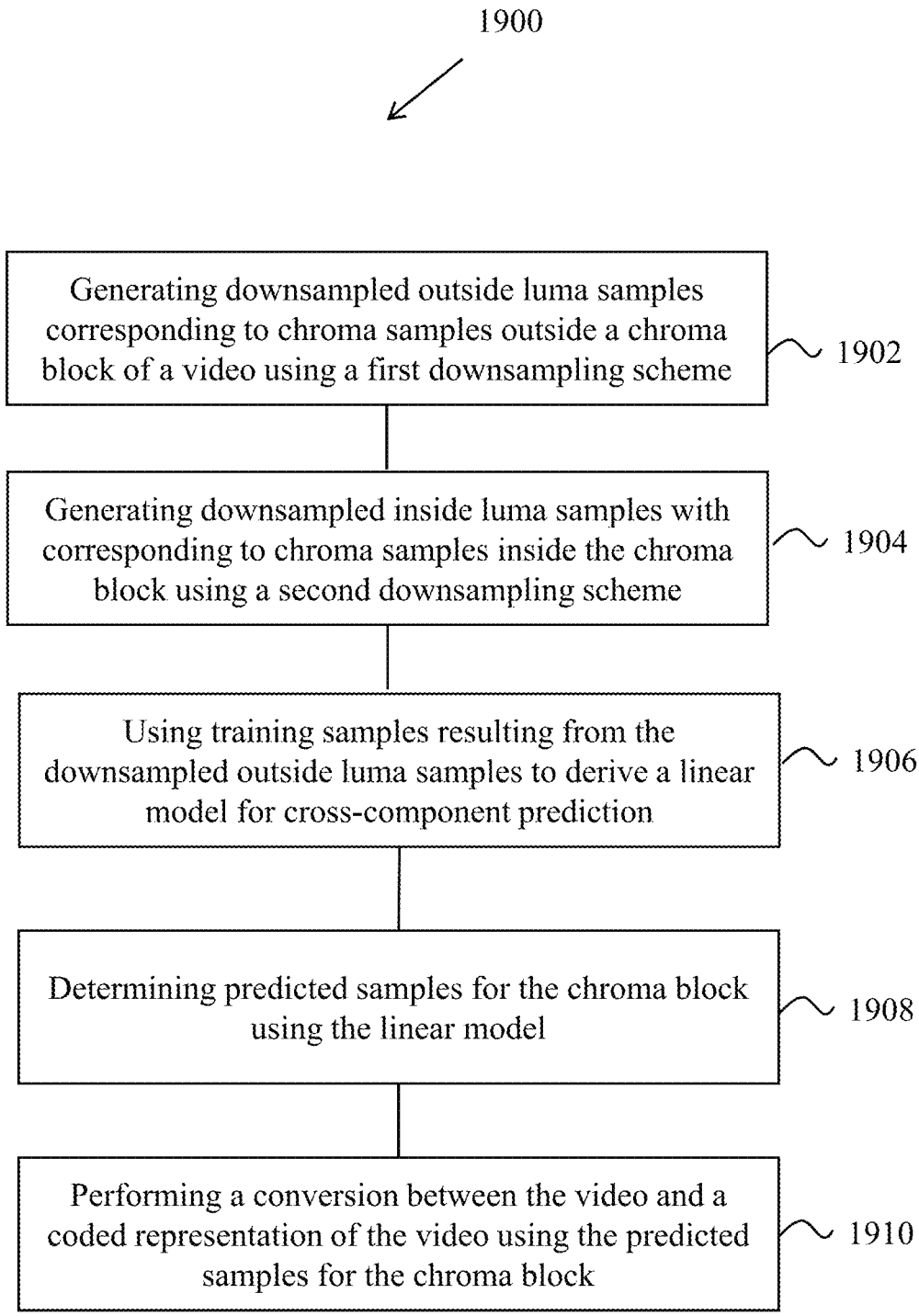
FIG. 19 is a flowchart for an example method of video processing.

1. A method of video processing (e.g., method 1900 depicted in FIG. 19), comprising: generating (1902) downsampled outside luma samples corresponding to chroma samples outside a chroma block of a video using a first downsampling scheme; generating (1904) downsampled inside luma samples with corresponding to chroma samples inside the chroma block using a second downsampling scheme; at least using (1906) the downsampled outside luma samples to derive a linear model for cross-component prediction; determining (1908) predicted samples for the chroma block using the linear model and the downsampled inside luma samples; and performing (1910) a conversion between the video and a coded representation of the video using the predicted samples for the chroma block.

2. The method of solution 1, wherein the first downsampling scheme corresponds to downsampling outside above luma samples to lower left and/or lower right positions.

3. The method of solutions 1 or 2, wherein the first downsampling scheme corresponds to downsampling outside luma samples to lower left positions.

4. The method of solution 3, wherein the first downsampling scheme calculates downsampled luma samples d[i] from above adjacent luma samples a[i] as $d[i]=(a[2i-1]+2*a[2i]+a[2i+1]+2)>>2$ in a case that all a samples are available, or $d[i]=(3*a[2i]+a[2i+1]+2)>>2$ in a case that $a[2i-1]$ is unavailable, or $d[i]=(3*a[2i]+a[2i-1]+2)>>2$ in a case that $a[2i+1]$ is unavailable.

5. The method of solution 3, wherein the first downsampling scheme calculates downsampled luma samples d[i] from above adjacent luma samples a[i] as $d[i]=(a[2i-1]+2*a[2i]+a[2i+1]+\text{offset0})>>2$, for $i>0$ and one of $d[i]=(3*a[2i]+a[2i+1]+\text{offset1})>>2$, or $d[i]=a[2i]$, or $d[i]=(a[2i]+a[2i+1]+\text{offset2})>>1$, for $i=0$, where offset0, offset1 and offset2 are fractions.

6. The method of solution 5, wherein offset0=offset1=2 and offset2=1.

7. The method of solution 1, wherein the first downsampling scheme corresponds to downsampling outside left luma samples to lower right and/or upper right positions.

8. The method of solution 1, wherein the first downsampling scheme corresponds to downsampling outside left luma samples to halfway between lower right and upper right positions.

9. The method of solution 8, wherein a downsampled luma samples d[i] is calculated as:

$d[j]=(a[2j]+a[2j+1]+1)>>2$.

10. The method of solution 1, wherein the chroma block has a width W and a height of H pixels, and wherein the first downsampling scheme generates N*W luma samples, where N is an integer.

11. The method of solution 10, wherein N=2, and wherein the first downsampling scheme generates luma samples from above adjacent luma samples.

12. The method of solution 1, wherein the chroma block has a width W and a height of H pixels, and wherein the first downsampling scheme generates W+K luma downsampled samples from above adjacent luma samples, where K is a positive integer.

13. The method of solution 1, wherein the chroma block has a width W and a height of H pixels, and wherein the first downsampling scheme generates W/N luma downsampled samples from above adjacent samples, where N is a positive integer.

14. The method of solution 1, wherein the chroma block has a width W and a height of H pixels, and wherein the first downsampling scheme generates W*N luma downsampled samples from left adjacent luma samples, where N is a positive integer.

15. The method of solution 1, wherein the chroma block has a width W and a height of H pixels, and wherein the first downsampling scheme generates W+K luma downsampled samples from left adjacent luma samples, where K is a positive integer.

16. The method of solution 1, wherein the chroma block has a width W and a height of H pixels, and wherein the first downsampling scheme generates W/N luma downsampled samples from left adjacent luma samples, where N is a positive integer.

17. The method of solution 1, wherein the first downsampling scheme or the second downsampling scheme is determined based on a position of a chroma block of a video meeting a position criterion.

18. The method of any of solutions 1-16, wherein the position criterion specifies to use the method for only video blocks at a top boundary of a coding tree unit of the video.

19. The method of any of solutions 1-16, wherein the position criterion specifies to use the method for only video blocks at a left boundary of a coding tree unit of the video.

20. The method of any of solutions 1-16, wherein the position criterion specifies to use the method for only video blocks at a top boundary of a coding tree unit of the video or video blocks at a left boundary of a coding tree unit of the video.

21. The method of any of solutions 1-20, wherein the first downsampling scheme uses only one above neighboring luma samples row to derive the downsampled outside luma samples.

22. The method of solution 21, wherein the one above neighboring luma samples row comprises above neighboring samples and above-right neighboring samples.

Figure 20:
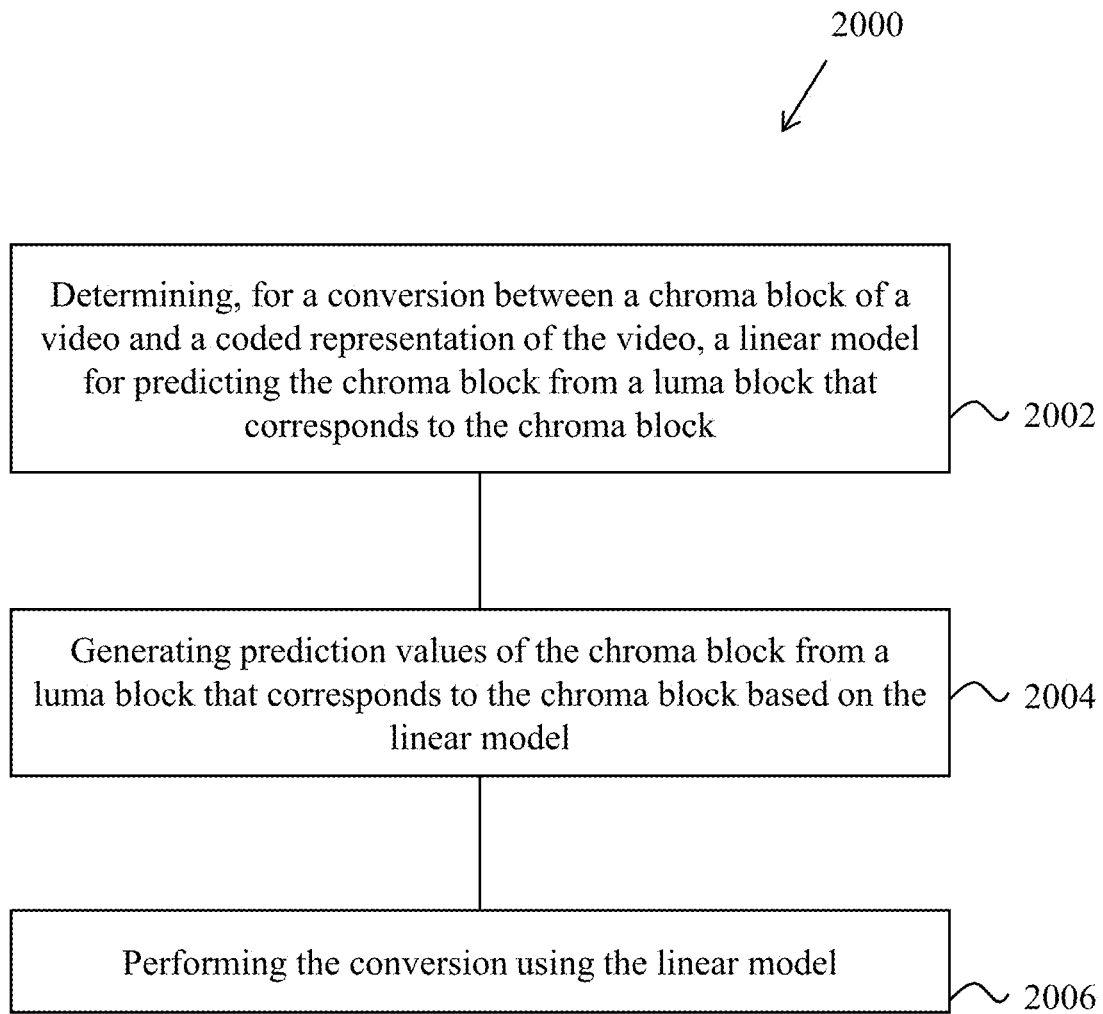
FIG. 20 is a flowchart for an example method of video processing.

23. A method for video processing (e.g., method 2000 depicted in FIG. 20), comprising: determining (2002), for a conversion between a chroma block of a video and a coded representation of the video, a linear model; generating (2004) prediction values of the chroma block from a luma block that corresponds to the chroma block based on the linear model; and performing (2006) the conversion using the linear model; wherein the predicting the chroma block from the luma block includes downsampling luma samples above the luma block by a first filtering method and downsampling luma samples to left of the luma block by a second filtering method, and wherein the linear model is determined at least based on the downsampled luma samples.

24. The method of solution 23, wherein the first filtering method uses only luma samples of a single above neighboring luma row during the conversion of the video.

25. The method of solution 23, wherein the first filtering method is different than the second filtering method.

26. The method of any of solutions 23-25, wherein the first filtering method uses a horizontal three-tap filter.

27. The method of any of solutions 23-26, wherein the second filtering method uses a 2-d 6 tap filter.

28. The method of any of solutions 1-27, wherein the conversion comprises generating the video from the coded representation.

29. The method of any of solutions 1-27, wherein the conversion comprises generating the coded representation from the video.

30. A video processing apparatus comprising a processor configured to implement a method recited in any one or more of solutions 1-29.

31. A computer-readable program medium having code stored thereupon, the code, when executed by a processor, causing the processor to implement a method recited in any one or more of solutions 1-29.

The various video processing solutions described herein may be implemented during video encoding or compression, video decoding or decompression, and video transcoding, or converting video representation from one coded format to another.

Furthermore, while reciting for the first chroma block belonging to a first chroma component of the video, similar techniques may also be used for a second chroma block that belongs to a second chroma component of the video (e.g., Cr and Cb or U or V or another type of chroma representation).

In addition to the above solutions, in some embodiments, the following solutions may be implemented.

Figure 23:
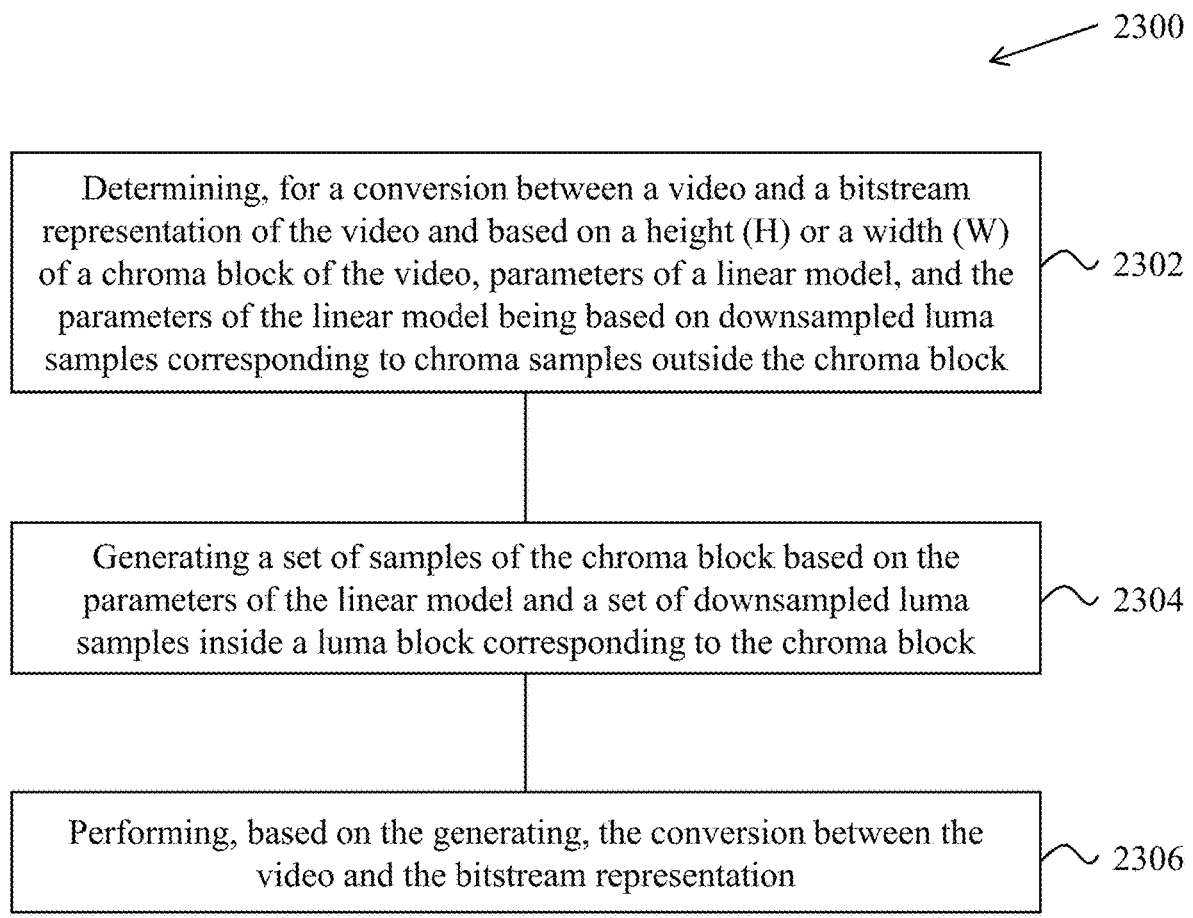
FIG. 23 is a flowchart for an example method of video processing.

1. A method for video processing (e.g., method 2300 depicted in FIG. 23), comprising: determining (2302), for a conversion between a video and a bitstream representation of the video and based on a height (H) or a width (W) of a chroma block of the video, parameters of a linear model, wherein the parameters of the linear model are based on downsampled luma samples corresponding to chroma samples outside the chroma block, and wherein H and W are positive integers; generating (2304) a set of samples of the chroma block based on the parameters of the linear model and a set of downsampled luma samples inside a luma block corresponding to the chroma block; and performing (2306), based on the generating, the conversion between the video and the bitstream representation.

2. The method of solution 1, further comprising: applying a first downsampling scheme to generate the downsampled luma samples outside the luma block.

3. The method of solution 2, further comprising: applying a second downsampling scheme, different from the first downsampling scheme, to generate the downsampled samples inside the luma block.

4. The method of any of solutions 1 to 3, wherein W>T1 or H>T2, and wherein T1 and T2 are integers.

5. The method of solution 4, wherein T1=T2=4.

6. The method of solution 4, wherein T1=T2=2.

7. The method of any of solutions 1 to 3, wherein H+W>T1, and wherein T1 is an integer.

8. The method of solution 7, wherein T1=6.

9. The method of any of solutions 1 to 3, wherein W×H>T1, and wherein T1 is an integer.

10. The method of solution 9, wherein T1=16.

11. The method of any of solutions 4 to 10, wherein T1 is predefined or signaled in a sequence parameter set (SPS), a sequence header, a picture parameter set (PPS), a picture header, a video parameter set (VPS), a slice header, a coding tree unit (CTU), a coding unit (CU) or a group of CTUs.

12. The method of any of solutions 1 to 11, wherein the linear model comprises a multiple model linear mode (MMLM) or a single model linear model (LM).

13. The method of solution 12, wherein the downsampled luma samples outside the luma block consists of either only left neighboring samples or only above neighboring samples.

14. The method of solution 13, wherein the linear model using the only left neighboring samples (Left-LM) is applied upon a determination that H>T1, and wherein T1 is an integer.

15. The method of solution 13, wherein the linear model using the only above neighboring samples (Above-LM) is applied upon a determination that W>T1, and wherein T1 is an integer.

16. The method of solution 14 or 15, wherein T1=4.

Figure 24:
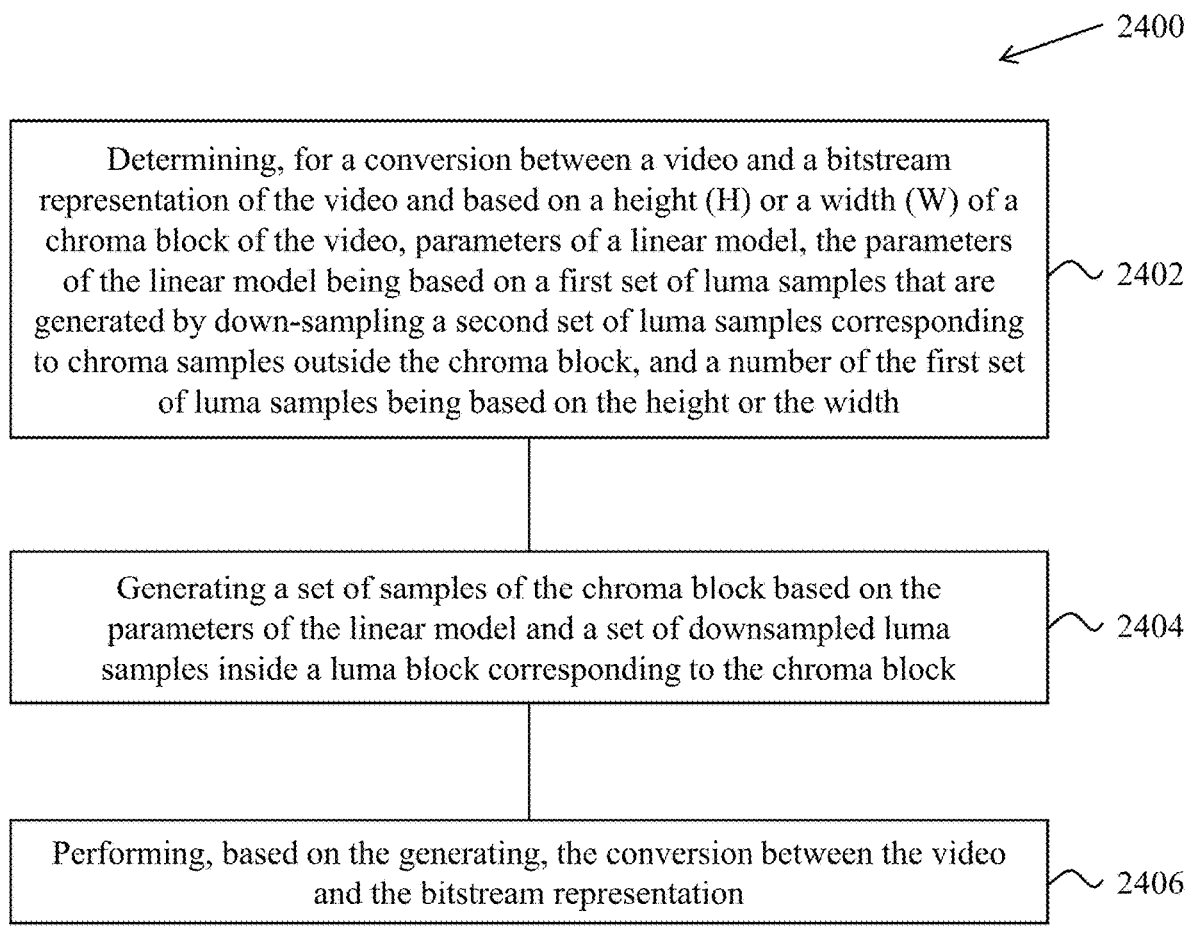
FIG. 24 is a flowchart for an example method of video processing.

17. A method for video processing (e.g., method 2400 depicted in FIG. 24), comprising: determining (2402), for a conversion between a video and a bitstream representation of the video and based on a height (H) or a width (W) of a chroma block of the video, parameters of a linear model, wherein the parameters of the linear model are based on a first set of luma samples that are generated by down-sampling a second set of luma samples corresponding to chroma samples outside the chroma block, and wherein a number of the first set of luma samples is based on the height or the width, and wherein H and W are positive integers; generating (2404) a set of samples of the chroma block based on the parameters of the linear model and a set of downsampled luma samples inside a luma block corresponding to the chroma block; and performing (2406), based on the generating, the conversion between the video and the bitstream representation.

18. The method of solution 17, wherein the first set of luma samples comprises m×W samples above the luma block and m×H luma samples to a left of the luma block upon a determination that W is equal to H, and wherein m is a positive integer.

19. The method of solution 17, wherein the first set of luma samples comprises 2×W luma samples above the luma block and H luma samples to a left of the luma block upon a determination that W≤H.

20. The method of solution 17, wherein the first set of luma samples comprises 2×W luma samples above the luma block and H luma samples to a left of the luma block upon a determination that W≥H.

21. The method of solution 17, wherein the first set of luma samples comprises W luma samples above the luma block and 2×H luma samples to a left of the luma block upon a determination that W≤H.

22. The method of solution 17, wherein the first set of luma samples comprises W luma samples above the luma block and 2×H samples to a left of the luma block upon a determination that W>H.

23. The method of solution 17, wherein the first set of luma samples comprises 2×W luma samples above the luma block upon a determination that an above neighboring block and an above-right neighboring block are both available, otherwise the second set of luma samples comprises W luma samples above the luma block.

24. The method of solution 17, wherein the first set of luma samples comprises 2×H luma samples above the luma block upon a determination that a left neighboring block and a left-bottom neighboring block are both available, otherwise the first set of luma samples comprises H luma samples above the luma block.

25. The method of solution 17, wherein the first set of luma samples consist of samples above the current video block, and wherein the parameters of the linear model are further based on a third set of luma samples that are generated by down-sampling a fourth set of luma samples to a left of the luma block.

26. The method of solution 25, wherein the third set of luma samples is decimated upon a determination that a number of the third set of luma samples is greater than a number of the first set of luma samples.

27. The method of solution 25, wherein the first set of luma samples is decimated upon a determination that a number of the first set of luma samples is greater than a number of the third set of luma samples.

28. The method of solution 17, wherein a number of the first set of luma samples is less than a predetermined value or in a range of values.

29. The method of solution 28, wherein the predetermined value is max(W, H).

30. The method of solution 28, wherein the range of values is from min(W, H) to s×max(W, H), and wherein s is a positive integer.

31. The method of solution 30, wherein s=1 or s=2.

32. The method of solution 17, wherein the parameters of the linear model are further based on training samples of the luma block corresponding to the chroma block.

33. The method of solution 32, wherein the training samples comprise a top-most predetermined number of left neighboring samples and a left-most predetermined number of above neighboring samples.

34. The method of solution 33, wherein the predetermined number is min(W, H).

35. The method of solution 32, wherein the second set of luma samples outside the luma block comprise W above neighboring samples and H left neighboring samples, and wherein the above neighboring samples are repeated n times upon a determination that H=n×W.

36. The method of solution 32, wherein the second set of luma samples outside the luma block comprise W above neighboring samples and H left neighboring samples, and wherein the left neighboring samples are repeated n times upon a determination that W=n×H.

37. The method of any of solutions 1 to 36, wherein performing the conversion comprises generating the bitstream representation from the current video block.

38. The method of any of solutions 1 to 36, wherein performing the conversion comprises generating the current video block from the bitstream representation.

5 Example Implementations of the Disclosed Technology

Figure 15:
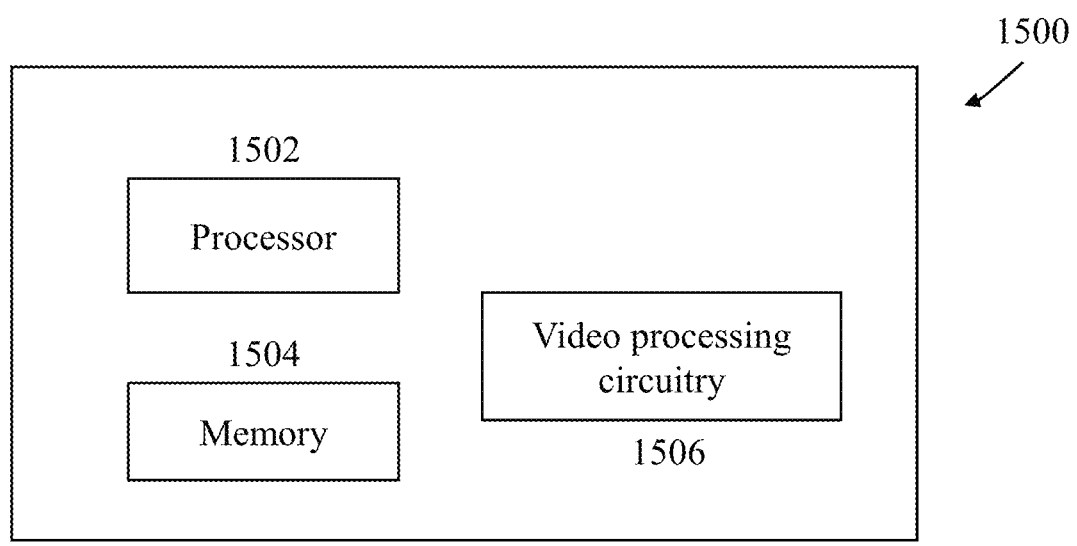
FIG. 15 is a block diagram of an example of a hardware platform for implementing a visual media decoding or a visual media encoding technique described in the present disclosure.

FIG. 15 is a block diagram of a video processing apparatus 1500. The apparatus 1500 may be used to implement one or more of the methods described herein. The apparatus 1500 may be embodied in a smartphone, tablet, computer, Internet of Things (IoT) receiver, and so on. The apparatus 1500 may include one or more processors 1502, one or more memories 1504 and video processing hardware 1506. The processor(s) 1502 may be configured to implement one or more methods (including, but not limited to, method 1400) described in the present disclosure. The memory (memories) 1504 may be used for storing data and code used for implementing the methods and techniques described herein. The video processing hardware 1506 may be used to implement, in hardware circuitry, some techniques described in the present disclosure.

In some embodiments, the video coding methods may be implemented using an apparatus that is implemented on a hardware platform as described with respect to FIG. 15.

Figure 25:
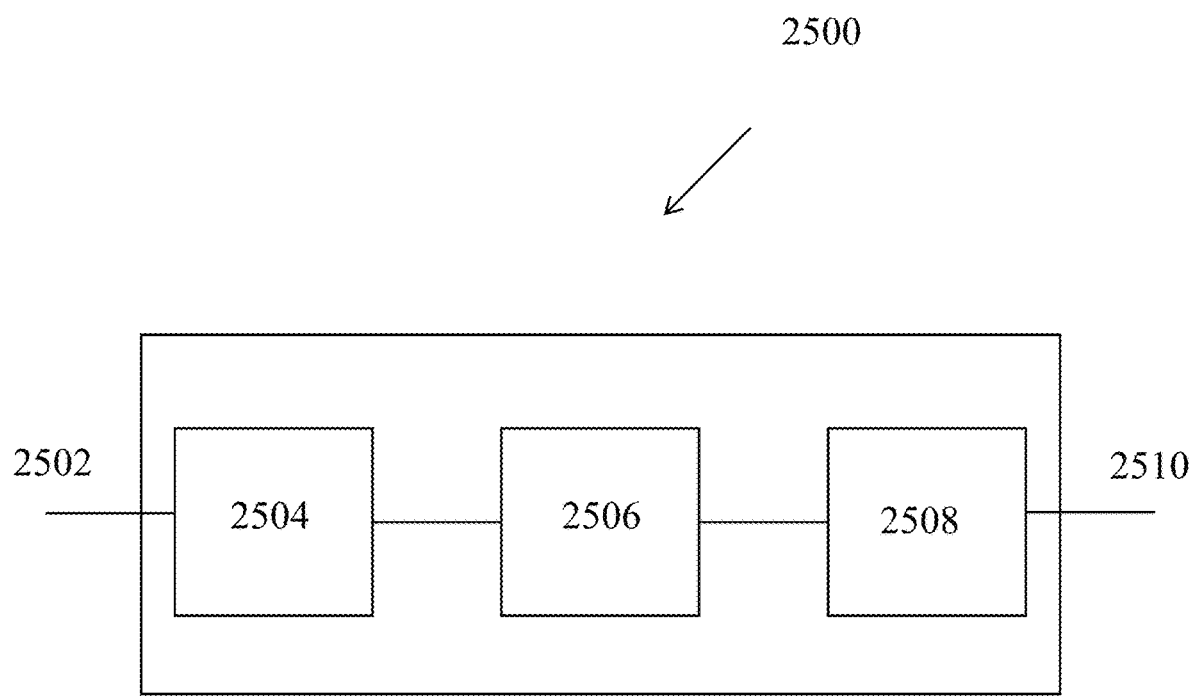
FIG. 25 is a block diagram of an example video processing system in which disclosed techniques may be implemented.

FIG. 25 is a block diagram showing an example video processing system 2500 in which various techniques disclosed herein may be implemented. Various implementations may include some or all of the components of the system 2500. The system 2500 may include input 2502 for receiving video content. The video content may be received in a raw or uncompressed format, e.g., 8- or 10-bit multi-component pixel values, or may be in a compressed or encoded format. The input 2502 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 2500 may include a coding component 2504 that may implement the various coding or encoding methods described in the present disclosure. The coding component 2504 may reduce the average bitrate of video from the input 2502 to the output of the coding component 2504 to produce a coded representation of the video. The coding techniques are therefore sometimes called video compression or video transcoding techniques. The output of the coding component 2504 may be either stored, or transmitted via a communication connected, as represented by the component 2506. The stored or communicated bitstream (or coded) representation of the video received at the input 2502 may be used by the component 2508 for generating pixel values or displayable video that is sent to a display interface 2510. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any disclosure or of what may be claimed, but rather as descriptions of features that may be specific to particular embodiments of particular disclosures. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:
    determining, for a conversion between a current video block of a video that is a chroma block and a bitstream of the video, a corresponding luma block for the current video block, wherein a color format for the current video block and the corresponding luma block is 4:2:0, and a cross component linear model is applied for the current video block;
    generating down-sampled inside luma samples of the corresponding luma block;
    generating down-sampled above neighboring luma samples of the corresponding luma block, wherein different down-sampled filtering schemes are used to generate the down-sampled above neighboring luma samples based on a position of the corresponding luma block, and wherein in response to the position of the corresponding luma block meeting a first position rule, a first down-sampled filtering scheme is used to generate the down-sampled above neighboring luma samples, and wherein the first position rule is that a top boundary of the corresponding luma block is overlapping with a top boundary of a current luma coding tree block (CTB) including the corresponding luma block, and wherein only one above luma sample row and a horizontal 3-tap filter are used to generate the down-sampled above neighboring luma samples in the first down-sampled filtering scheme;
    deriving parameters of the cross component linear model at least based on the down-sampled above neighboring luma samples;
    generating predicted chroma samples of the current video block based on the parameters of the cross component linear model and the down-sampled inside luma samples; and
    performing the conversion based on the predicted chroma samples.

2. The method of claim 1, wherein the only one above luma sample row is adjacent to the corresponding luma block.

3. The method of claim 2, wherein the only one above luma sample row comprises above adjacent luma samples and above-right adjacent luma samples.

4. The method of claim 2, wherein the first down-sampled filtering scheme calculates down-sampled above neighboring luma sample d[i] from luma sample a[i] of the only one above luma sample row as:

$$d[i]=(a[2i-1]+2*a[2i]+a[2i+1]+2)>>2.$$

5. The method of claim 4, wherein in a case that the luma sample a [i] is unavailable, apply a padding process.

6. The method of claim 5, wherein in a case that a [2$i$-1] is unavailable, down-sampled above neighboring luma samples d[i] are derived as:

$$d[i]=(3*a[2i]+a[2i+1]+2)>>2.$$

7. The method of claim 1, wherein in response to the position of the corresponding luma block not meeting the first position rule, a second down-sampled filtering scheme is used to generate the down-sampled above neighboring luma samples.

8. The method of claim 7, wherein multiple above luma sample rows and a filter with taps more than 3 are used to generate the down-sampled above neighboring luma samples in the second down-sampled filtering scheme.

9. The method of claim 8, wherein at least one of multiple above luma sample rows is not adjacent to a block corresponding to the at least one of multiple above luma sample rows.

10. The method of claim 7, further comprising:
applying a third down-sampled filtering scheme to generate the down-sampled inside luma samples of the corresponding luma block, wherein the third down-sampled filtering scheme uses same filtering taps and filtering coefficients with the second down-sampled filtering scheme.

11. The method of claim 7, further comprising:
applying a fourth down-sampled filtering scheme to generate down-sampled left neighboring luma samples of the corresponding luma block, wherein the fourth down-sampled filtering scheme uses same filtering taps and filtering coefficients with the second down-sampled filtering scheme;
and the parameters of the cross component linear model are further derived based on the down-sampled left neighboring luma samples.

12. The method of claim 1, wherein the first down-sampled filtering scheme corresponds to down-sampling above neighboring luma samples to lower left positions.

13. The method of claim 1, wherein the conversion includes encoding the current video block into the bitstream.

14. The method of claim 1, wherein the conversion includes decoding the current video block from the bitstream.

15. An apparatus for processing video data comprising a processor and a non-transitory memory with instructions thereon, wherein the instructions upon execution by the processor, cause the processor to:
determine, for a conversion between a current video block of a video that is a chroma block and a bitstream of the video, a corresponding luma block for the current video block, wherein a color format for the current video block and the corresponding luma block is 4:2:0, and a cross component linear model is applied for the current video block;
generate down-sampled inside luma samples of the corresponding luma block;
generate down-sampled above neighboring luma samples of the corresponding luma block, wherein different down-sampled filtering schemes are used to generate the down-sampled above neighboring luma samples based on a position of the corresponding luma block, and wherein in response to the position of the corresponding luma block meeting a first position rule, a first down-sampled filtering scheme is used to generate the down-sampled above neighboring luma samples, and wherein the first position rule is that a top boundary of the corresponding luma block is overlapping with a top boundary of a current luma coding tree block (CTB) including the corresponding luma block, and wherein only one above luma sample row and a horizontal 3-tap filter are used to generate the down-sampled above neighboring luma samples in the first down-sampled filtering scheme;
derive parameters of the cross component linear model at least based on the down-sampled above neighboring luma samples;
generate predicted chroma samples of the current video block based on the parameters of the cross component linear model and the down-sampled inside luma samples; and
perform the conversion based on the predicted chroma samples.

16. The apparatus of claim 15, wherein the only one above luma sample row is adjacent to the corresponding luma block.

17. The apparatus of claim 16, wherein the only one above luma sample row comprises above neighboring luma samples and above-right neighboring luma samples.

18. A non-transitory computer-readable storage medium storing instructions that cause a processor to:
determine, for a conversion between a current video block of a video that is a chroma block and a bitstream of the video, a corresponding luma block for the current video block, wherein a color format for the current video block and the corresponding luma block is 4:2:0, and a cross component linear model is applied for the current video block;
generate down-sampled inside luma samples of the corresponding luma block;
generate down-sampled above neighboring luma samples of the corresponding luma block, wherein different down-sampled filtering schemes are used to generate the down-sampled above neighboring luma samples based on a position of the corresponding luma block, and wherein in response to the position of the corresponding luma block meeting a first position rule, a first down-sampled filtering scheme is used to generate the down-sampled above neighboring luma samples, and wherein the first position rule is that a top boundary of the corresponding luma block is overlapping with a top boundary of a current luma coding tree block (CTB) including the corresponding luma block, and wherein only one above luma sample row and a horizontal 3-tap filter are used to generate the down-sampled above neighboring luma samples in the first down-sampled filtering scheme;
derive parameters of the cross component linear model at least based on the down-sampled above neighboring luma samples;
generate predicted chroma samples of the current video block based on the parameters of the cross component linear model and the down-sampled inside luma samples; and
perform the conversion based on the predicted chroma samples.

19. The non-transitory computer-readable storage medium of claim 18, wherein the only one above luma sample row is adjacent to the corresponding luma block.

20. A non-transitory computer-readable recording medium storing a bitstream which is generated by a method performed by a video processing apparatus, wherein the method comprises:
determining, for a current video block of a video that is a chroma block, a corresponding luma block for the current video block, wherein a color format for the current video block and the corresponding luma block is 4:2:0, and a cross component linear model is applied for the current video block;
generating down-sampled inside luma samples of the corresponding luma block;
generating down-sampled above neighboring luma samples of the corresponding luma block, wherein different down-sampled filtering schemes are used to generate the down-sampled above neighboring luma samples based on a position of the corresponding luma block, and wherein in response to the position of the corresponding luma block meeting a first position rule, a first down-sampled filtering scheme is used to generate the down-sampled above neighboring luma samples, wherein the first position rule is that a top boundary of the corresponding luma block is overlapping with a top boundary of a current luma coding tree block (CTB) including the corresponding luma block, and wherein only one above luma sample row and a horizontal 3-tap filter are used to generate the down-sampled above neighboring luma samples in the first down-sampled filtering scheme;

deriving parameters of the cross component linear model at least based on the down-sampled above neighboring luma samples;

generating predicted chroma samples of the current video block based on the parameters of the cross component linear model and the down-sampled inside luma samples; and generating the bitstream based on the predicted chroma samples.

\* \* \* \* \*